(12) United States Patent
Conrad et al.

(10) Patent No.: US 9,164,277 B2
(45) Date of Patent: Oct. 20, 2015

(54) MICROMECHANICAL DEVICE

(71) Applicant: Fraunhofer-Gesellschaft zur Foerderung der angewandten Forschung e.V., Munich (DE)

(72) Inventors: Holger Conrad, Dresden (DE); Harald Schenk, Dresden (DE); Christian Schirrmann, Dresden (DE); Thilo Sandner, Dresden (DE); Fabian Zimmer, Dresden (DE); Jan-Uwe Schmidt, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 300 days.

(21) Appl. No.: 13/938,276

(22) Filed: Jul. 10, 2013

(65) Prior Publication Data
US 2013/0301101 A1 Nov. 14, 2013

Related U.S. Application Data

(63) Continuation of application No. PCT/EP2011/050483, filed on Jan. 14, 2011.

(51) Int. Cl.
*G02B 26/08* (2006.01)
*H02N 1/00* (2006.01)
(Continued)

(52) U.S. Cl.
CPC ........ *G02B 26/0825* (2013.01); *G02B 26/0841* (2013.01); *H01G 5/16* (2013.01); *H02N 1/006* (2013.01); *H04N 1/08* (2013.01)

(58) Field of Classification Search
CPC .. G02B 26/101; G02B 26/085; G02B 26/105; G02B 26/0833; G02B 26/0841
USPC .......... 359/198.1, 199.1, 199.3, 200.7, 212.1, 359/213.1, 233.1, 224.1
See application file for complete search history.

(56) References Cited

U.S. PATENT DOCUMENTS

| 5,290,400 A | 3/1994 | Bobbio |
| 6,906,849 B1 | 6/2005 | Mi et al. |

(Continued)

FOREIGN PATENT DOCUMENTS

| DE | 10 2008 049 647 B4 | 4/2010 |
| EP | 1 526 399 A1 | 4/2005 |

(Continued)

OTHER PUBLICATIONS

Official Communication issued in International Patent Application No. PCT/EP2011/050483, mailed on Oct. 28, 2011.
(Continued)

*Primary Examiner* — Euncha Cherry
(74) *Attorney, Agent, or Firm* — Keating & Bennett, LLP

(57) ABSTRACT

The force on the electrodes of an electrostatic field is used so that lateral tensile or compressive forces result which can deform a deformable element or can strongly deflect a deflectable structure. For this, a micromechanical device includes, apart from an electrode and a deformable element, an insulating spacer layer via which the electrode is fixed to the deformable element, wherein the insulating spacer layer is structured into several spaced-apart segments along a lateral direction, so that by applying an electric voltage between the electrode and the deformable element lateral tensile or compressive forces bending the deformable element along the lateral direction result. Thereby, the problem that normally accompanies electrostatic drives, namely the problem of the pull-in effect, is overcome. The deflection of the deformable element can be much larger than the gaps of the two electrodes, i.e. the above-mentioned electrode and the deformable element. A usage as a sensor is also possible.

34 Claims, 36 Drawing Sheets

(51) Int. Cl.
*H04N 1/08* (2006.01)
*H01G 5/16* (2006.01)

(56) References Cited

U.S. PATENT DOCUMENTS

| | | |
|---|---|---|
| 2002/0122238 A1* | 9/2002 | Knipe .......................... 359/291 |
| 2004/0160118 A1 | 8/2004 | Knollenberg et al. |
| 2005/0040654 A1 | 2/2005 | Tanaka et al. |
| 2007/0017994 A1 | 1/2007 | Wolter et al. |
| 2007/0103029 A1 | 5/2007 | Fedder et al. |
| 2007/0247018 A1 | 10/2007 | Flores et al. |
| 2010/0097681 A1 | 4/2010 | Klose et al. |

FOREIGN PATENT DOCUMENTS

| | | |
|---|---|---|
| JP | 10-109284 A | 4/1998 |
| JP | 2005-326620 A | 11/2005 |
| JP | 2007-259691 A | 10/2007 |
| JP | 2008-36774 A | 2/2008 |
| WO | 02/49199 A1 | 6/2002 |

OTHER PUBLICATIONS

Official Communication issued in corresponding Japanese Patent Application No. 2013-548757, mailed on Jul. 29, 2014.

* cited by examiner

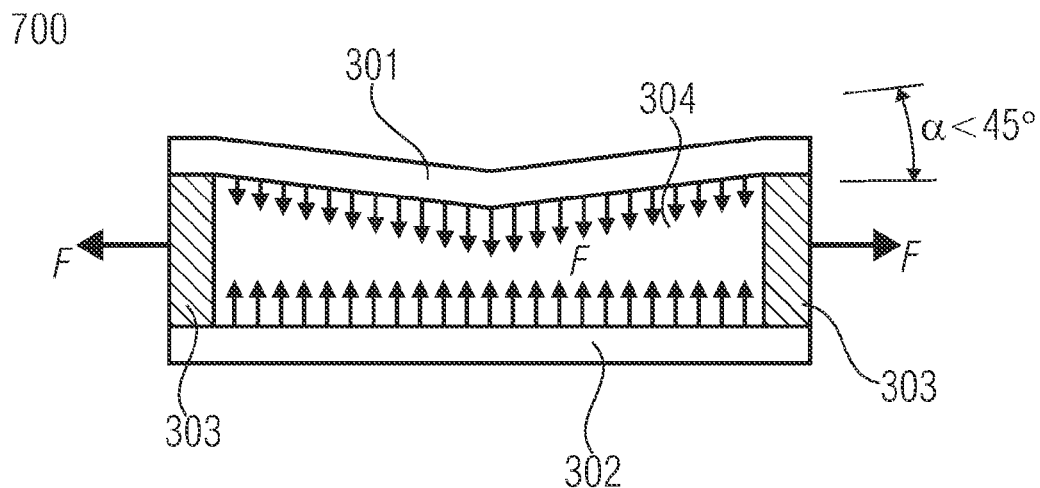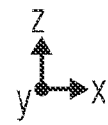
FIGURE 3A
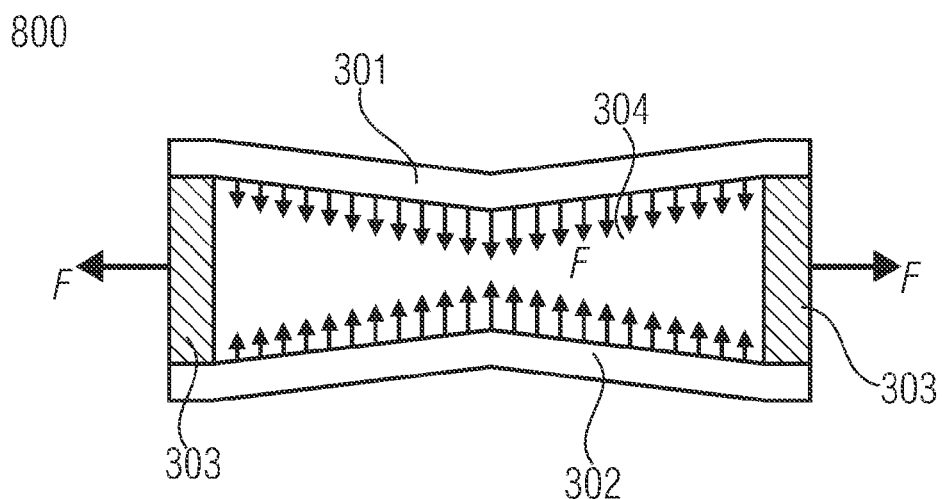
FIGURE 3B

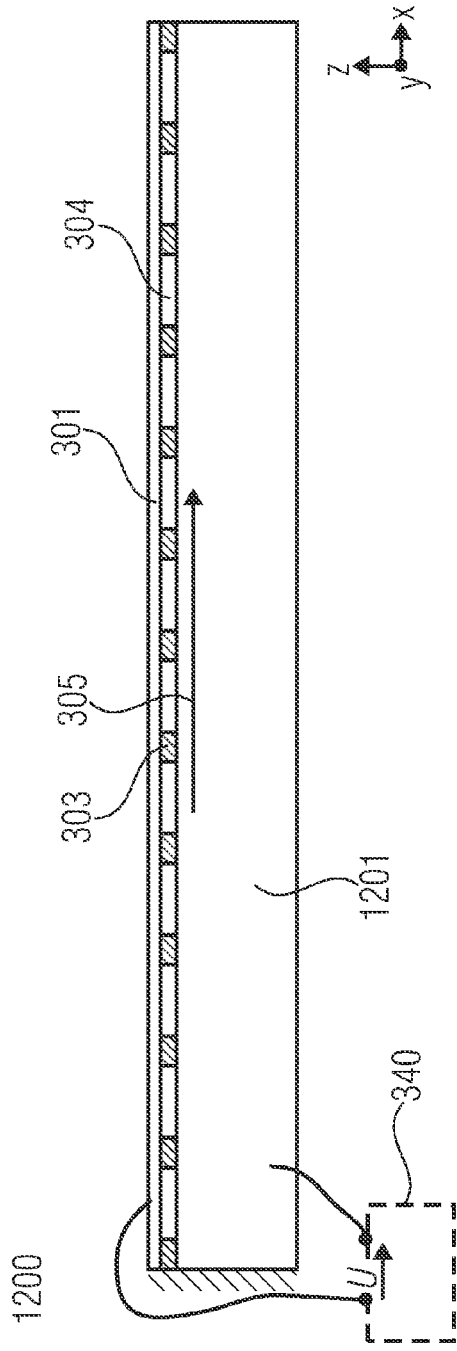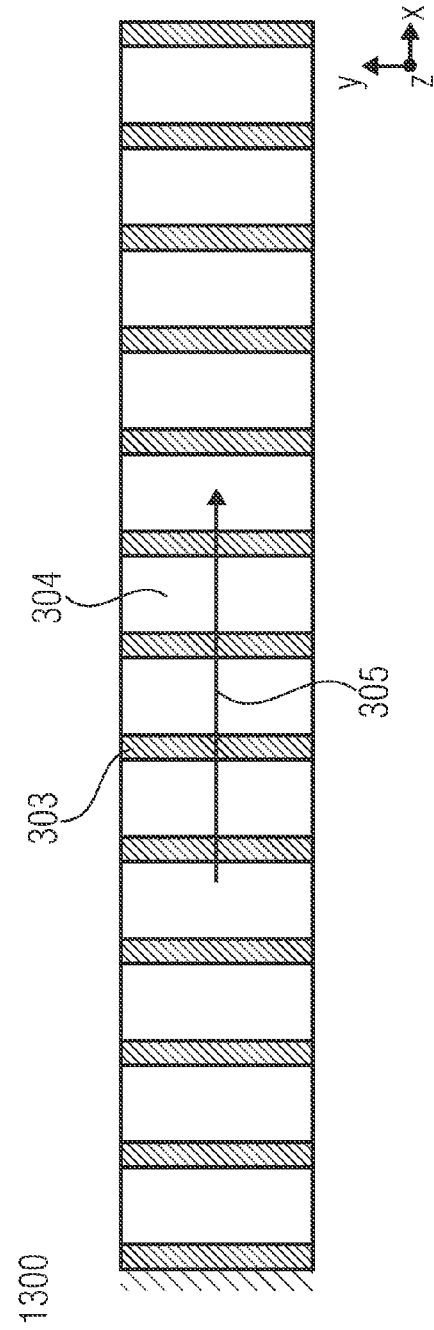

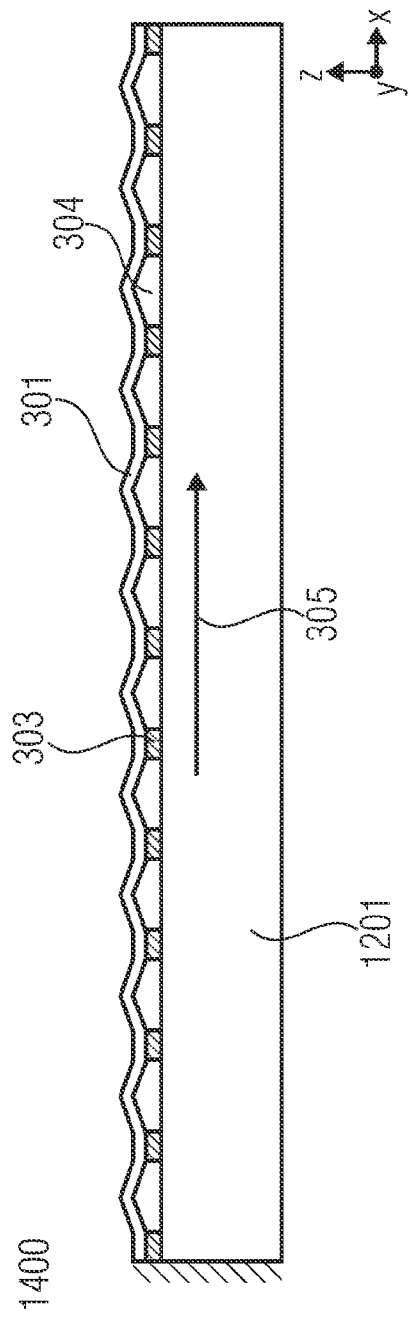
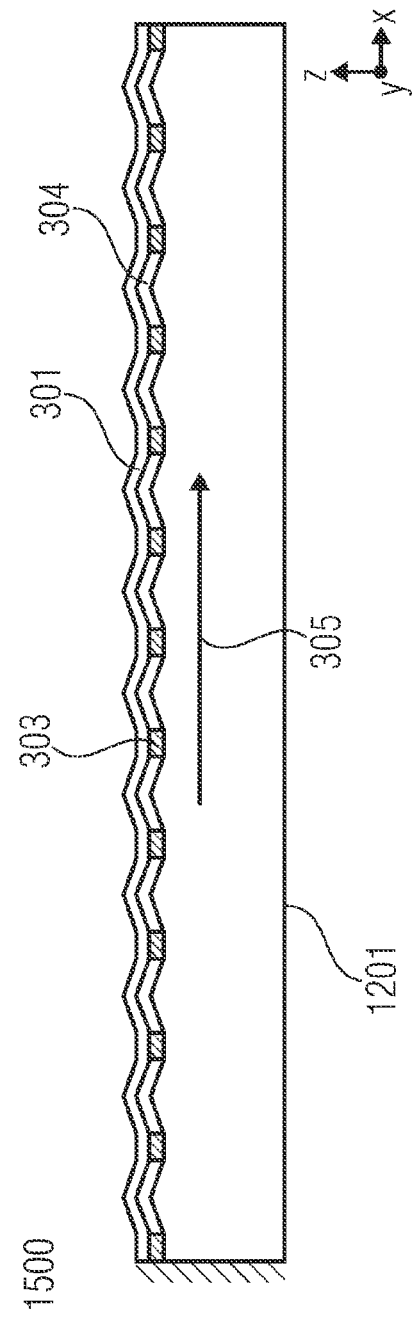

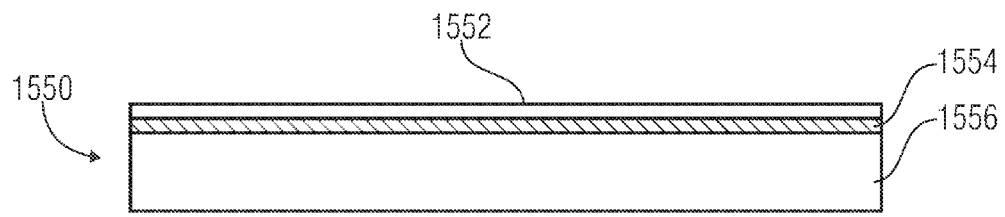
FIGURE 14A
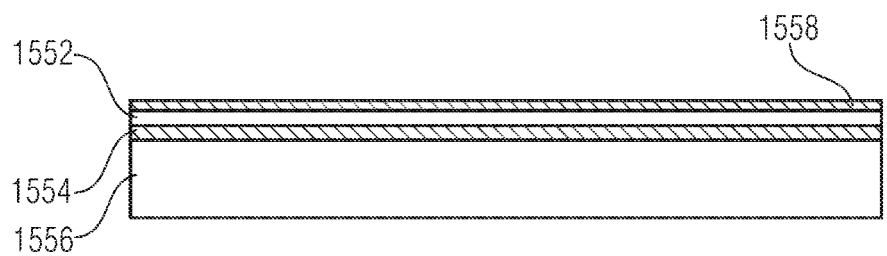
FIGURE 14B
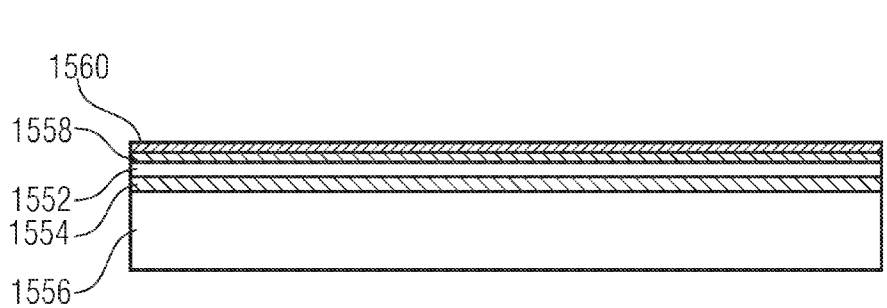
FIGURE 14C
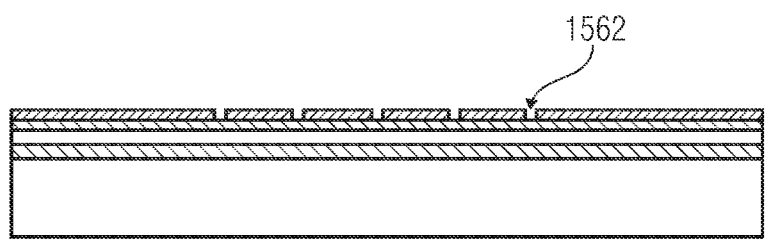
FIGURE 14D

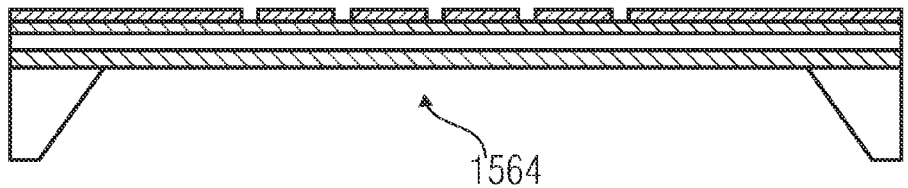
FIGURE 14E
FIGURE 14F
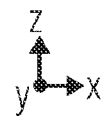
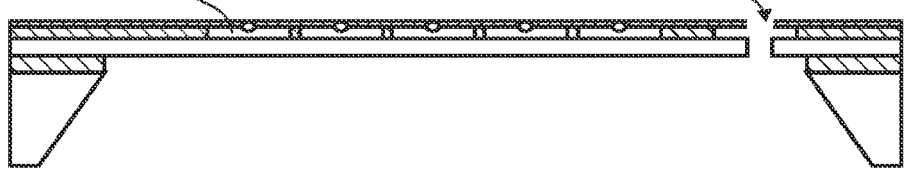
FIGURE 14G
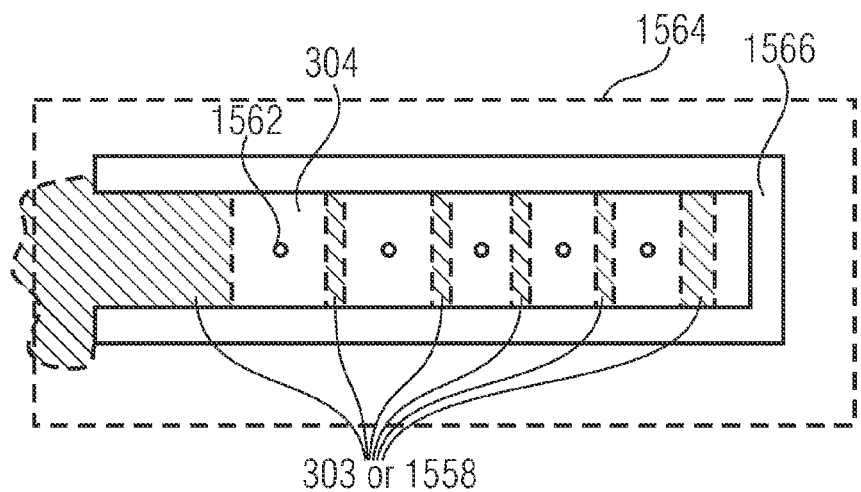
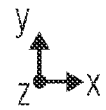
FIGURE 14H

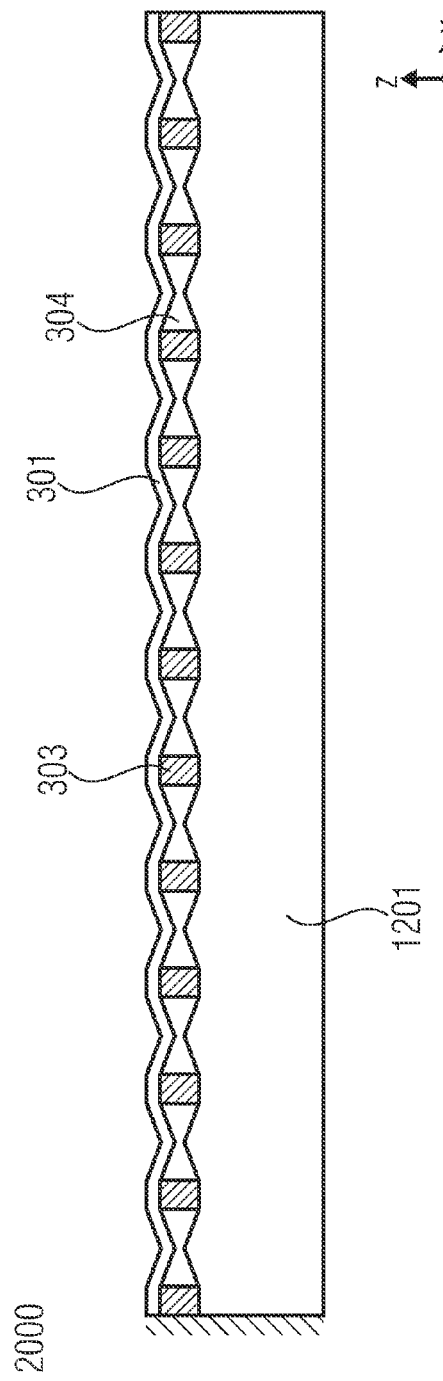
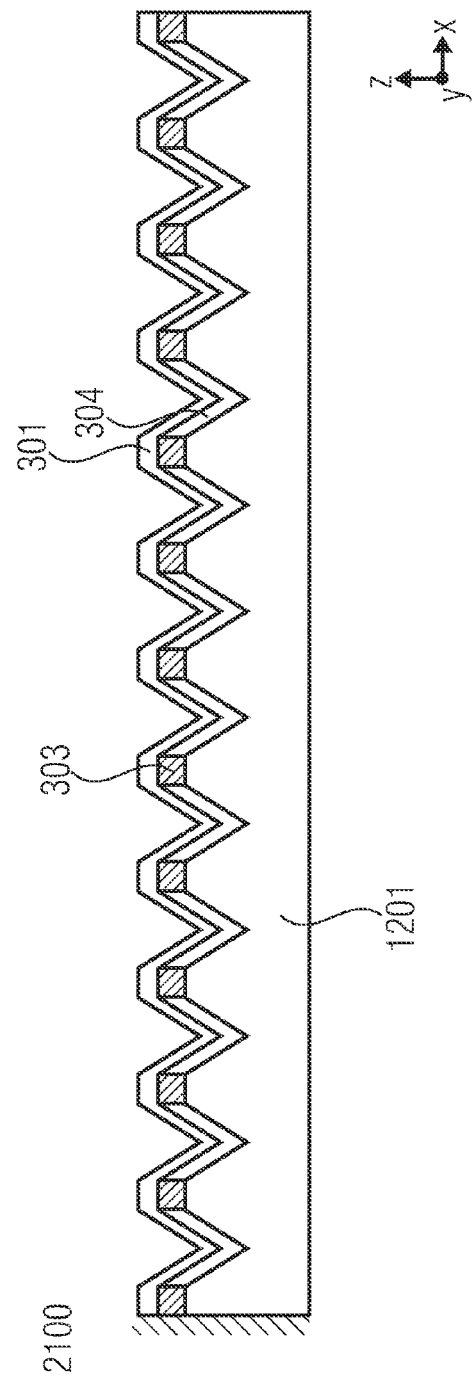
FIGURE 19
FIGURE 20

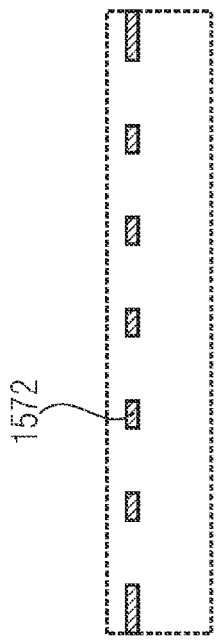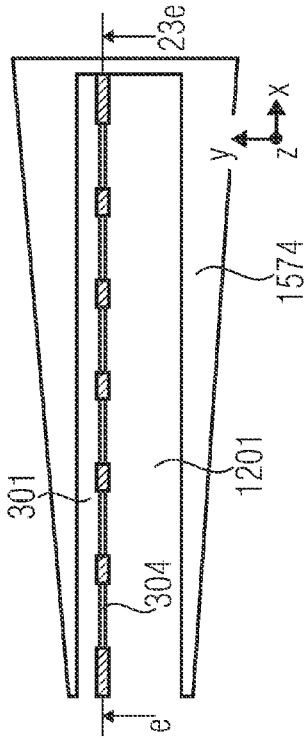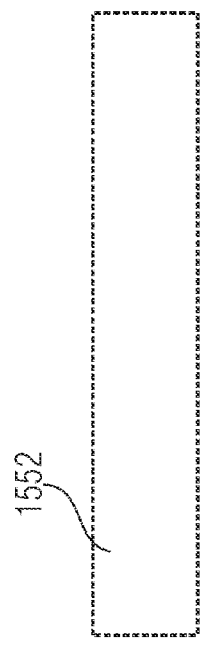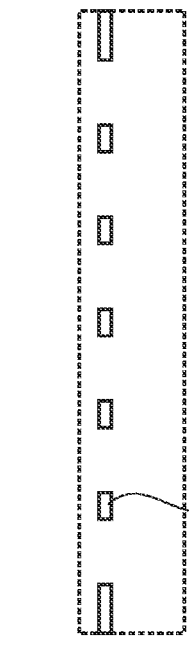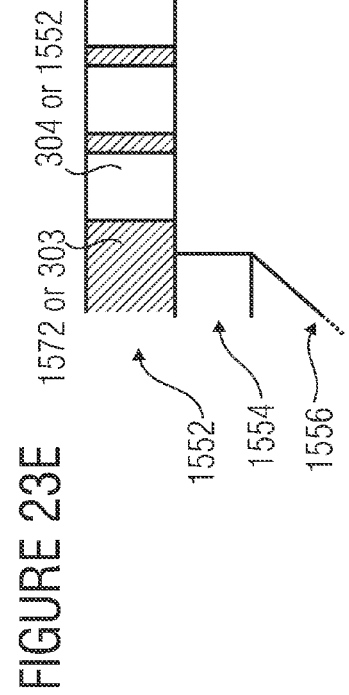

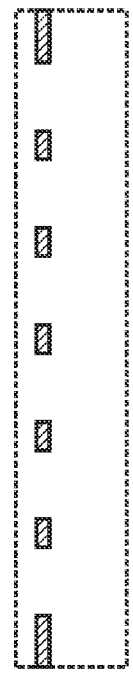
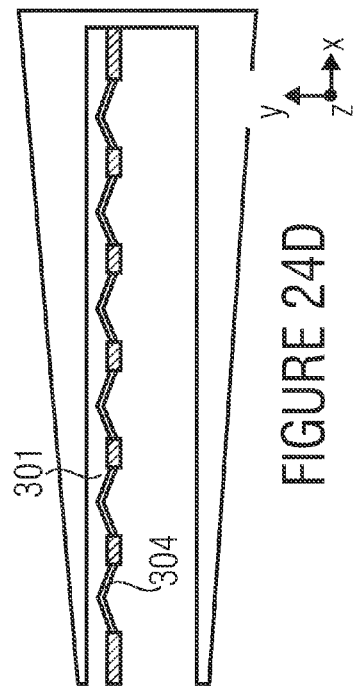
FIGURE 24C
FIGURE 24D
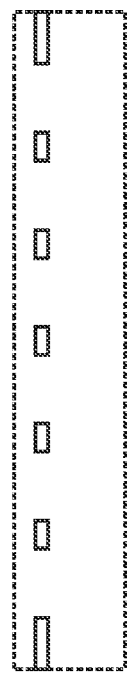
FIGURE 24A
FIGURE 24B
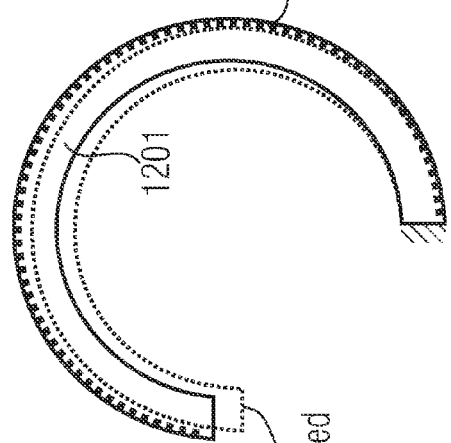
FIGURE 24E tilting due to change of the electric voltage between 301 and 1201

MICROMECHANICAL DEVICE

CROSS-REFERENCE TO RELATED APPLICATIONS

This application is a continuation of copending International Application No. PCT/EP2011/050483, which was filed on Jan. 14, 2011, and which is incorporated herein by reference in its entirety.

BACKGROUND OF THE INVENTION

The present invention relates to a micromechanical device, such as a micromechanical actuator or a micromechanical sensor.

Micromechanically produced and actively deflectable beam and plate structures are used for a large number and variety of applications. The deflectable plates are frequently also referred to as membranes due to their low thickness. For the actively deflectable beams, the term cantilever is frequently used. Table 1 lists some examples of microsystems and the functional principle of the actively deflectable microstructures is explained.

TABLE 1

Examples of microsystems and a description of possible functional principles of the deflectable microstructures

| Microsystem | Functional principle of the actively deflectable microstructures | Example/reference |
|---|---|---|
| Actively bendable mirror for focus variation of light beams or for specific correction of the phase of the wave front of light | Thin mirror plates firmly clamped at the edge are bent using an electrostatic field. Here, the forces from the electrostatic field are effective vertically at the bottom of the plate. | 0, [2], [3], [8], [9] |
| | Thin mirror plates are bent using an actively adjustable lateral material strain within a material layer (bimorph or monomorph principle). The actively amendable lateral material strain can have a thermomechanical, piezoelectric, piezomagnetic, electrostrictive or magnetostrictive origin. | 0, [4], [5], [11] |
| Actively bendable focusing mirror array for transmissive displays | Thin annular mirror plates firmly clamped at the edge are bent using an electrostatic field. Here, the forces from the electrostatic field are effective vertically at the bottom of the plate | [21] |
| Actively tiltable mirrors for spatial deviation of light beams | The mirror plates are connected to a stationary frame via spring elements and are tilted using an electrostatic field. Here, the forces from the electrostatic field are effective vertically at the bottom of the plate. This principle is also used for micro tilting mirror arrays. | [6], [7] |
| | The mirror plates are connected to a stationary frame via thin bimorph or monomorph beam structures. Tilting the mirror plate is performed via an actively adjustable layer stress and the associated bending of the beam structures. The active amendable lateral material strain can have a thermomechanical, piezoelectric, piezomagnetic, electrostrictive or magnetostrictive origin. | [10], [12], [13] |
| Actively adjustable lifting or lowering mirror for the phase variation of light (e.g. in FTIR spectrometers) | The mirror plates are connected to a stationary frame via spring elements and are moved orthogonally to the mirror area using an electrostatic field. Here, the forces from the electrostatic field are effective vertically at the bottom of the plate. This principle is also used for lowering mirror arrays for adaptive optics. | [15] |
| | The mirror plates are connected to a stationary frame via thin bimorph or monomorph beam structures. Deflection of the mirror plate is performed via an actively adjustable layer stress and the associated bending of the beam structures. The actively amendable lateral material strain can have a thermomechanical, piezoelectric, piezomagnetic, electrostrictive or magneto-strictive origin. | [14] |
| Atomic Force Microscopy (AFM) in measurement modes with dynamic excitation | A beam (=leaf spring or cantilever) is deflected either via an electrostatic field between the measurement probe and the tip of the beam or via piezoelectrically induced strain within the beam. | |

Basically, the functional principles of the actively deflectable microstructures presented here can be divided into two classes:

In the first class, a force acts orthogonally to the structure 100 (=beam or plate) to be deflected.

FIG. 43 exemplarily shows a micromechanical actuator of this type. FIG. 43 shows a micromechanical device having a deflectable plate or a deflectable beam 100, which is cantilevered in the present case and where an externally effected force F is effective, which brings the plate or the beam 100 perpendicular to the extension direction out of its resting position, as is indicated by an arrow 100a between the resting position on the left and the deflected position on the right in FIG. 43. Here, it should be noted that in the overall document of the present application the included drawings and sketches include schematical coordinate symbols marked by x, y and z, and that here it has been consistently taken care that the x-y plane is parallel to the substrate plane or the chip plane, in the case that the shown devices are integrated in a chip, and that accordingly the z direction is orthogonally to the substrate plane in the case that chip integration exists.

Frequently, the vertically attacking force F is the force from an electrostatic field. Here, the electrostatic field E is generated using an electric voltage U between the beam (or plate) to be deflected and a stationary electrode 101 (also referred to as counter-electrode).

FIG. 44 shows a micromechanical actuator wherein the structure 100 to be deflected is deflected in that a voltage U is applied between the structure 100 to be deflected and an electrode 101 opposing the same, which has the effect that the structure 100 to be deflected and the electrode 101 are attracted toward each other. Thus, in the case of FIG. 44, the structure to be deflected, here a cantilevered beam or plate, is deflected by the force of an electrostatic field.

The reason for the dominance of the electrostatic drive in microsystem technology is the good scaling behavior of the forces (acting on the electrodes of an electrostatic field) in the dimensions common for microsystems. For simple, plane parallel electrode assemblies performing no or only very little movement, the force is inversely proportional to the square of the electrode gap ($F \sim 1/d^2$). Thus, small electrode gaps result in a high force effect on the electrodes.

The deflection w of the microstructures (beams or plates) depends in an approximately square manner on the applied electric voltage U (for plane parallel electrode assemblies $F \sim 1/d^2$). The basic curve is shown in FIG. 45.

The first region of this characteristic curve is characterized by a stable equilibrium between the forces of the electrostatic field and the restoring forces of the clamp. The second region is characterized by an unstable equilibrium. A small change of the electric voltage has the effect that the forces of the electrostatic field become larger than the mechanical restoring forces of the clamp (=holder of the microstructure). The beam (or the plate) 100 thus reaches an unstable area and is accelerated up to the counter-electrode 101. This behavior is known to a person skilled in the art as "pull-in effect":

The pull-in effect occurs in all electrostatically deflectable microstructures.

The maximum possible deflection $w_{pull-in}$ is limited (depending on the mechanical characteristics of the clamp) to a maximum of approx. ⅓ of the electrode gap d by the pull-in effect.

Large deflections can only be enabled by large gaps d of the electrodes. Large gaps, however, significantly increase the necessitated electric drive voltages (due to: $F \sim 1/d^2$).

Due to the pull-in effect and the ratio $F \sim 1/d^2$, a large deflection of electrostatically deflectable microstructures is combined with high electric voltages. Voltages in the range of 100 V are frequently common for deflections in the μm range (e.g.: [2] and [3]).

In a second class of microstructures, a lateral force acts within one or several layers of the structure 200 to be deflected.

FIG. 46 shows a structure 200 to be deflected composed of a layer stack of two or more layers 201 and 202. A lateral strain is generated in at least one of the layers, by the force of which the structure 200 to be deflected, here again for example a beam or a plate, is deflected, as is indicated by 200*a*.

This form of deflectable structures is known to a person skilled in the art as monomorph- or bimorph-deflectable cantilevers or membranes (beams or plates). The lateral force F (more accurately: lateral strain caused by the physical effect) can be caused by different physical effects:

Thermomechanical excitation (thermomechanical bimorph): Here, two materials 201 and 202 having different coefficients of linear expansion are firmly connected to one another. When this structure is heated (for example by an integrated electrothermal micro heating=usage of the resistive power), a lateral strain results and hence a lateral force of different intensities in both layers. Due to this, the microstructure is bent.

Piezoelectric and electrostrictive excitation (electroactive monomorphs, bimorphs and multimorphs using the transversal effect): Here, a lateral strain or force is generated within at least one layer 201 by an electrostatic field and by using an electroactive material. This material strain can be actively changed using the electric voltage or the electric field. As a result of this, the microstructure is bent.

Piezomagnetic and magnetostrictive excitation (magnetoactive monomorphs, bimorphs and multimorphs using the transversal effect): Here, a magnetic field and the usage of a magnetoactive material generate a lateral strain within at least one layer 201. As a result, the microstructure is bent.

For appropriate ratios of maximum deflection w to beam or plate thickness t (w<t), a spherical deformation profile results. This results in the fact that the maximum deflection w is proportional to the square of the length l of the microstructures ($w \sim l^2$).

The advantage of the bimorph- or monomorph-deflectable microstructures is that with relatively small actively adjustable material strains large deflections result with sufficiently large structure lengths l. The maximum possible deflections are not limited (as in the above case) by the characteristics of the drive principle.

A problem associated with thermomechanical excitation is that basically sufficiently high material strains for bending micromechanical cantilevers and plates can be generated by the thermomechanical effect and a suitable material selection (for 201 and 202) [1], but the generation of the temperatures necessitated for this is problematic for three different reasons:

The height of the temperatures that can be generated with a given power coupling depends on the thermal insulation (more accurately, heat flow balance) of the microstructures to be deflected with regard to their environment. Depending on the size of the beam or plate area to be heated, high thermal insulation of the structures to be deflected might not be realized. Thus, a relatively high power consumption of the microsystem is needed for generating the temperatures necessitated for deflection.

If a resistive micro heating (=usage of ohmic "power loss") is used, the operating range of the temperatures to be used for the target movement of the cantilever or the plate will have to be above the maximum environmental temperature of the target application. The reason for this is that a resistive micro heating can only increase temperatures. Thus, the microsystem has high power consumption even at low target deflections [5]. Basically, the temperatures could be both increased and reduced by using the Peltier effect, but due to the low efficiency a microsystem having low power consumption is not possible here either.

The amount of heat capacity (e.g. of the surrounding air) associated with the thermal insulation of the microstructures to be deflected limits the maximum possible velocity of the movement of the deflection. Due to the relatively high heat capacities, the thermal cut-off frequency is in the bottom Hz range [5], [16] even for the low dimensions of microsystems. This has the following consequences:

If bimorph beams or plates having higher frequencies are to be moved in a quasi-static manner, a significant reduction of the deflection has to be accepted due to the low-pass behavior of temperature generation.

With step-like changes of the target deflection, the microstructure to be deflected reacts in a very slow manner (due to the low thermal cut-off frequency) and hence necessitates a lot of time until the target deflection is reached.

Due to the above-stated limitations (large power consumption, "constant preheating" and low cut-off frequency of deflection), the thermomechanical effect is used very rarely for actively deflecting plates or beams. A commercial microsystem using the thermomechanical effect for actively deflecting microstructures is not known on our part.

Problems accompanying excitation using electroactive or magnetoactive materials are, for example, the following. In microsystem technology, for example, primarily the usage of the inverse piezoelectric effect is common (see also [4]). A problem, however, is the usage of the common electroactive or magnetoactive materials within semiconductor-compatible production plants (frequently called "CMOS-compatible materials"): materials having a high electromechanical or magnetomechanical material coupling (such as the piezoelectric materials PZT, $BaTiO_3$ or $LiNbO_3$) cannot be used in semiconductor-compatible production plants or processes due to the possible contamination of the production plants or processes. Basically, there are semiconductor-compatible electroactive materials such as aluminum nitride or PVDF. However, either the electromechanical material coupling is very low (such as for aluminum nitride or gallium nitride) or these materials have no temperature or long-term stable behavior (such as zinc oxide). Optimizing the deposition conditions for high electroactive material coupling is very expensive, and in some case the materials have to be actively polarized afterwards. Magnetoactive materials basically have the problem of high power consumption of the microcomponent (similar to the thermomechanical principle), since a magnetic field having an alterable field strength has to be generated for actively deflecting the material. Generating a variable magnetic field can only be performed by a variable current flow of a coil assembly having sufficient current strength. Usage of permanent magnets is not possible here, since the same generate a "stationary magnetic field".

In summary, it would therefore be desirable to have an alternative drive principle for a micromechanical device uniting at least some of the advantages of the different drive principles briefly sketched above, and without having to accept all the accompanying disadvantages.

SUMMARY

According to an embodiment, a micromechanical device may have: an electrode; a deformable element; and an insulating spacer layer, wherein the electrode is fixed to the deformable element via the insulating spacer layer, and wherein the insulating spacer layer is structured into several spaced-apart segments along a lateral direction, so that by applying an electric voltage between the electrode and the deformable element an area force acting in a thickness direction is applied to the electrode and the deformable element, as a consequence of which lateral tensile or compressive forces result that bend the deformable element along the lateral direction according to the bimorph principle.

Another embodiment may have a sensor having an inventive micromechanical device, further having a detector circuit for detecting the capacitance between the electrode and the deformable element of the micromechanical device.

Another embodiment may have an energy generator comprising an inventive micromechanical device, further having a voltage source for applying a constant voltage between the electrode and the deformable element, so that due to an externally induced bending of the deformable element a current flow is generated between the electrode and the deformable element.

The basic principle underlying the present invention is the finding that it is possible to combine the different advantages of the different known drive principles so as to reach a more effective drive mechanism. In particular, the finding is that it is basically very profitable to use the bimorph or monomorph principle for deflecting beams or plates or other deflectable structures or deformable elements since a small lateral material strain can result in a large deflection due to the context already presented above, according to which the deflection w is proportional to the square of the length of the structure to be deflected or the deformable element, i.e. $w \sim l^2$. The inventors have recognized that it is possible to generate the necessitated material strain or contraction without the thermomechanical, electroactive or magnetoactive effects involving the problems discussed in the introductory part of the description. In particular, it is a finding of the present invention that it is possible to effect deformation of a deformable element according to the bimorph or monomorph principle by electrostatic forces. Since the forces on the electrodes of an electrostatic field in the plate capacitor assembly scale very well in the micrometer and even considerably more so in the nanometer range, due to the correlation $F \sim 1/d^2$, it is extremely advantageous to generate lateral strain or mechanical stress on or within a deformable element or a structure to be deflected using electrostatic forces. Thus, the present invention is also based on the finding that it is possible to use the force on the electrodes of an electrostatic field such that lateral tensile or compressive forces result which can deform a deformable element or deflect a deflectable structure. According to the invention, this is enabled by the fact that a micromechanical device comprises, apart from an electrode and a deformable element, an insulating spacing layer, via which the electrode is fixed to the deformable element, wherein the insulating spacer layer is structured into several spaced-apart segments along a lateral direction, such that by applying an electric voltage between the electrode and the deformable element lateral tensile or compressive forces result that bend the deformable element along the lateral direction. Due to the inventive structure, the problem normally occurring with electrostatic drives, namely the problem of the pull-in effect, is overcome. Thus, according to the invention, deflection of the deformable element can be much larger than the gaps of the two electrodes, i.e. the above-mentioned electrode and the deformable element.

Alternatively or additionally, it is also possible, in the above-mentioned manner, to use a micromechanical device having an electrode, a deformable element and an insulating spacer layer via which the electrode is fixed to the deformable element as a sensor by structuring the insulating spacer layer along a lateral direction into several spaced-apart segments such that a capacitance between the electrode and the deformable element changes by deformation of the deformable element in the lateral direction.

BRIEF DESCRIPTION OF THE DRAWINGS

Embodiments of the present invention will be detailed subsequently referring to the appended drawings, in which:

FIGS. 3a and 3b is a schematic cross-section of further plate capacitor assemblies having tilted electrodes indicating the acting forces for positive lateral contraction;

FIG. 6a is a schematic cross-section of a micromechanical device in the form of an electrostatically bimorph-deflectable and one-side clamped cantilever;

FIG. 6b is a schematic top view of the cross-sectional view of FIG. 6a;

FIG. 8 is a schematic cross-section of a micromechanical device in the form of an electrostatically bimorph-deflectable and one-side clamped cantilever according to a further embodiment;

FIG. 9 is a schematic cross-section of a micromechanical device in the form of an electrostatically bimorph-deflectable and one-side clamped cantilever according to a further embodiment;

FIGS. 14a to 14g are simplified schematic cross-sections of a micromechanical device in subsequent stages of the production of the same according to an embodiment;

FIG. 14h is a top view of the final state of FIG. 14g;

FIG. 19 is a schematic cross-section of a micromechanical device in the form of an electrostatic bimorph-deflectable and one-side clamped cantilever according to a further embodiment;

FIG. 20 is a schematic cross-section of a micromechanical device in the form of an electrostatic bimorph-deflectable and one-side clamped cantilever according to a further embodiment;

FIG. 22b is a schematic top view of the side view of FIG. 22a;

FIGS. 23a to 23d are simplified schematic top views of a micromechanical device at different stages of the production of the same according to an embodiment;

FIG. 23e is a schematic side sectional view of the top view of FIG. 23d;

FIGS. 24a to 24d are simplified schematic top views of a micromechanical device at different stages of the production of the same according to an embodiment;

FIG. 24e is a schematic top view of an electrostatically bimorph-deflectable and one-side clamped annular cantilever for deflection within a plane;

FIG. 36b is a schematic side sectional view along the sectional plane A-A of FIG. 36a;

DETAILED DESCRIPTION OF THE INVENTION

Before embodiments of the present invention will be discussed in more detail below, at first, the basic principle or the basic effect underlying the subsequently described embodiments will be discussed or justified in more detail. At first, geometries for positive lateral contraction will be presented.

Figure 1:
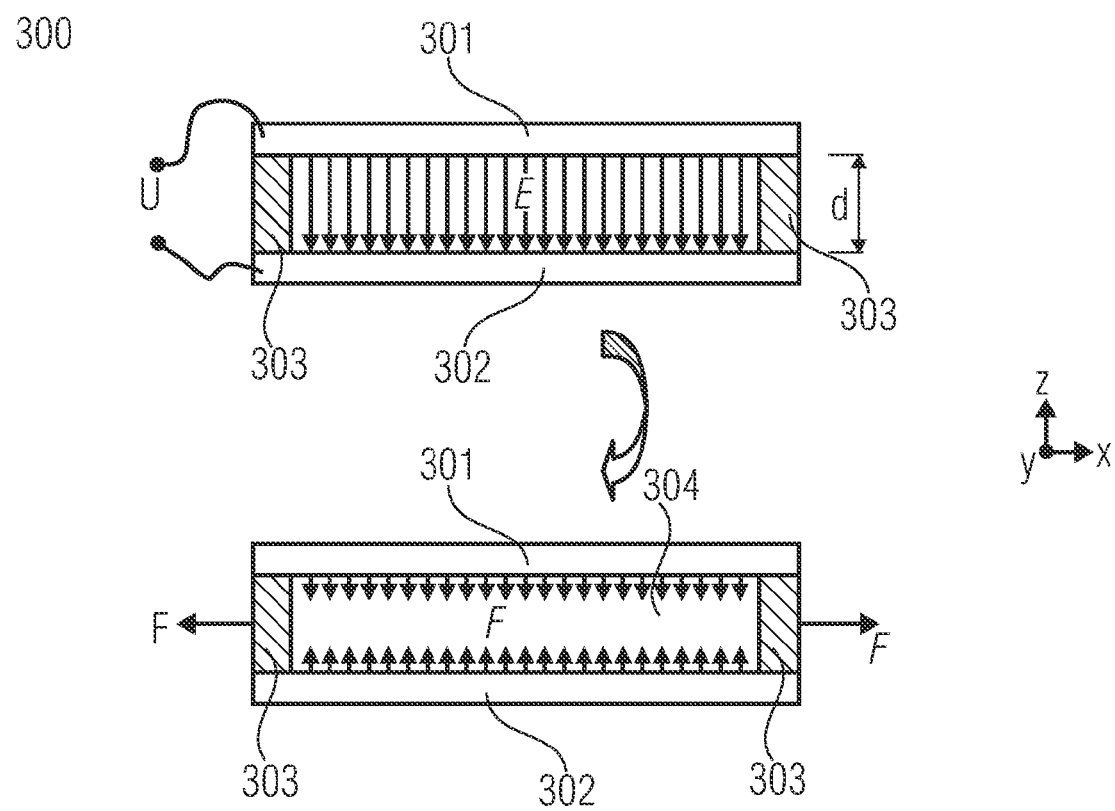
FIG. 1 is a schematic cross-section of a plate capacitor assembly indicating the acting forces for positive lateral contraction.

FIG. 1 shows the cross-section of a simple plate capacitor assembly 300. Here, electrodes 301 and 302 are arranged spaced apart from each other at a distance d using an electrically insulating material 303. The gap 304 between the electrodes can be filled with air, another gas or can be evacuated (vacuum) and has the permittivity ∈. If an electric voltage U is applied over the electrodes 301 and 302, an electrostatic field E will be formed. The electrostatic field exerts a vertical force $F_z$ on both electrode areas.

If the electrodes 301 and 302 are effected in a very stiff manner (e.g. by materials having a high elasticity module or by a sufficient thickness), i.e. they carry out only a very small movement, the area force Fz/A acts on the electrodes:

$$\frac{F_z}{A} = \frac{1}{2} \cdot U^2 \cdot \frac{\varepsilon}{d^2}$$

This area force can assume very high values. If, for example, the electrode plates are spaced apart from one another at a distance d=100 nm, and there is air between the plates ($\varepsilon = 8.85 \cdot 10{-}12 \, \text{AsV}^{-1}\text{m}^{-1}$), then, at an electric voltage of 10 V, an area force of 44 kN/m² is exerted on both electrodes. Producing plate gaps in the range of hundreds of nanometers is possible in a relatively simple manner with the sacrificial layer technologies known in microsystem technology.

Figure 2A:
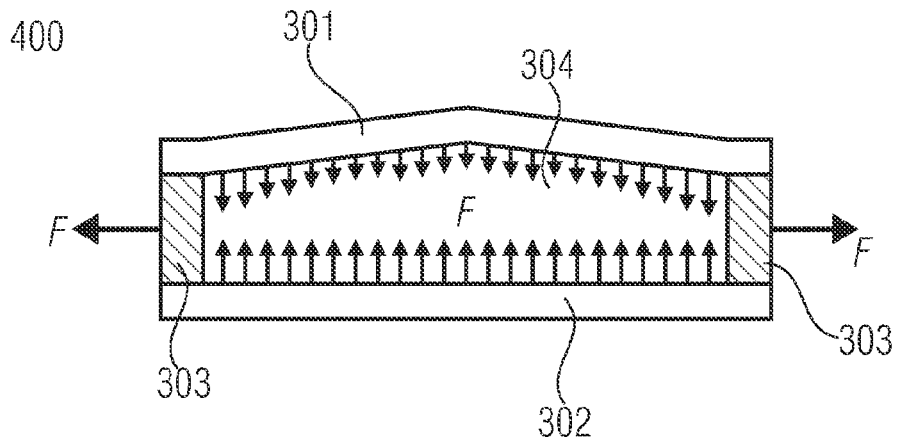
FIGS. 2a to 2c is a schematic cross-section of different plate capacitor assemblies having tilted electrodes indicating the acting forces for positive lateral contraction.

As a consequence of the vertically acting forces of the electrostatic field Fz, the horizontally acting reaction forces Fx result (FIG. 1). This effect is to be understood analogously to the effect of lateral contraction known in structural mechanics. The effect can be significantly increased by slightly tilting one or both electrodes. In the exemplary assemblies in FIGS. 2a-2c, the top electrode 301 or both electrodes 301 and 302 have been tilted by an angle α. The examples 300, 400, 500 and 600 can be compared to the effect of a positive lateral contraction.

Even for small tilting angles α, as shown in FIGS. 3a, 3b, horizontal forces Fx pointing away from each other result from the vertical force of the electrostatic field Fz. For angles α<45°, this "force conversion" can also be compared, to the effect of positive lateral contraction known from structural mechanics.

The above preliminary consideration can be continued for "geometries for negative lateral contraction". If the angle α is increased to more than 45° in geometries 700 and 800 (the plate capacitors of FIGS. 3a, 3b), then the vertical forces Fz will generate horizontal force components Fx pointing towards each other. This principle can be compared to the effect known as negative lateral contraction in structural mechanics.

For understanding "negative lateral contraction", planar rigid supporting structures (=bar structures wherein the bars are ideally rigid and cannot be deformed) can also be used. In the left-hand images of FIG. 4c, the vertical force Fz is converted into reaction force components Fx acting towards the outside, corresponding to positive lateral contraction. In the right-hand drawing of FIG. 4c, by the setting angle of the top electrode (α>45°, see FIGS. 4a to 5), reaction forces Fx pointing towards each other are generated, which is referred to as "negative lateral contraction". This could be shown based on the equilibrium of forces (or force and momentum equivalence), which is, however, not easily possible in this specific case, since this is an under-determined equation system. The proof of the negative lateral contraction has been performed by means of FEM calculations.

Figure 4A:
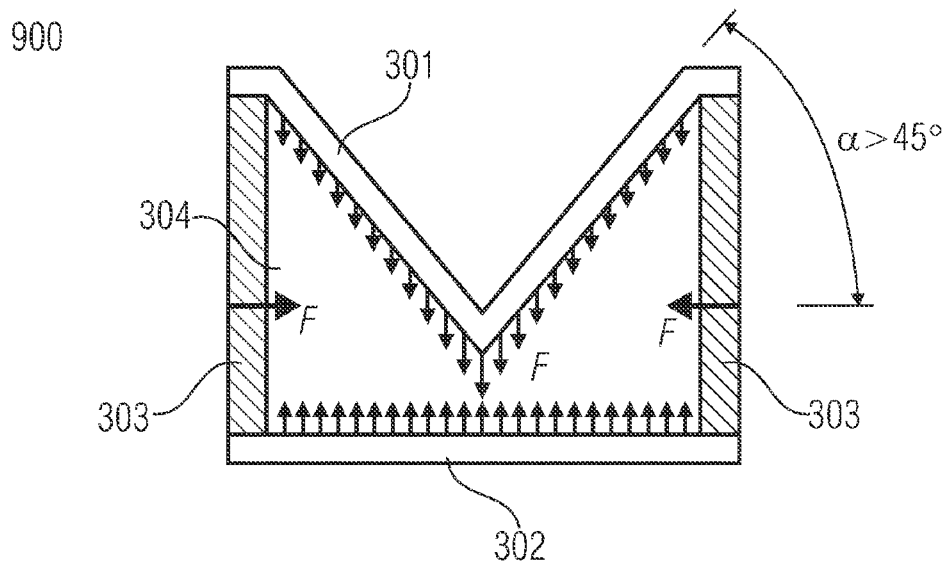
FIGS. 4a and 4b is a schematic cross-section of "plate" capacitor assemblies having tilted electrodes indicating the acting forces for negative lateral contraction.
Figure 4B:
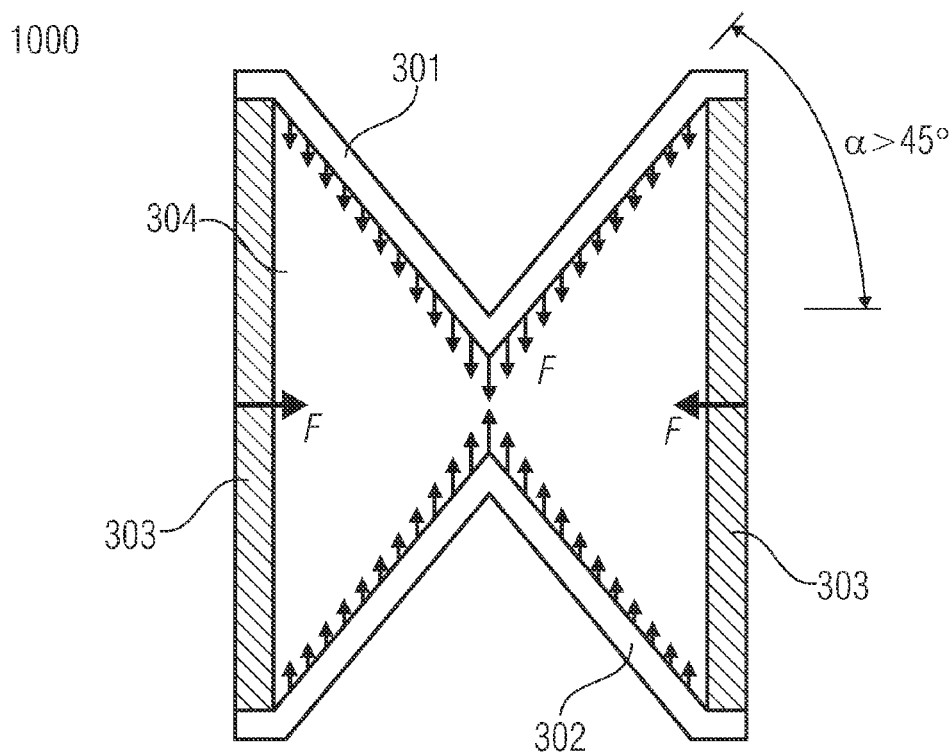
Figure 4C:
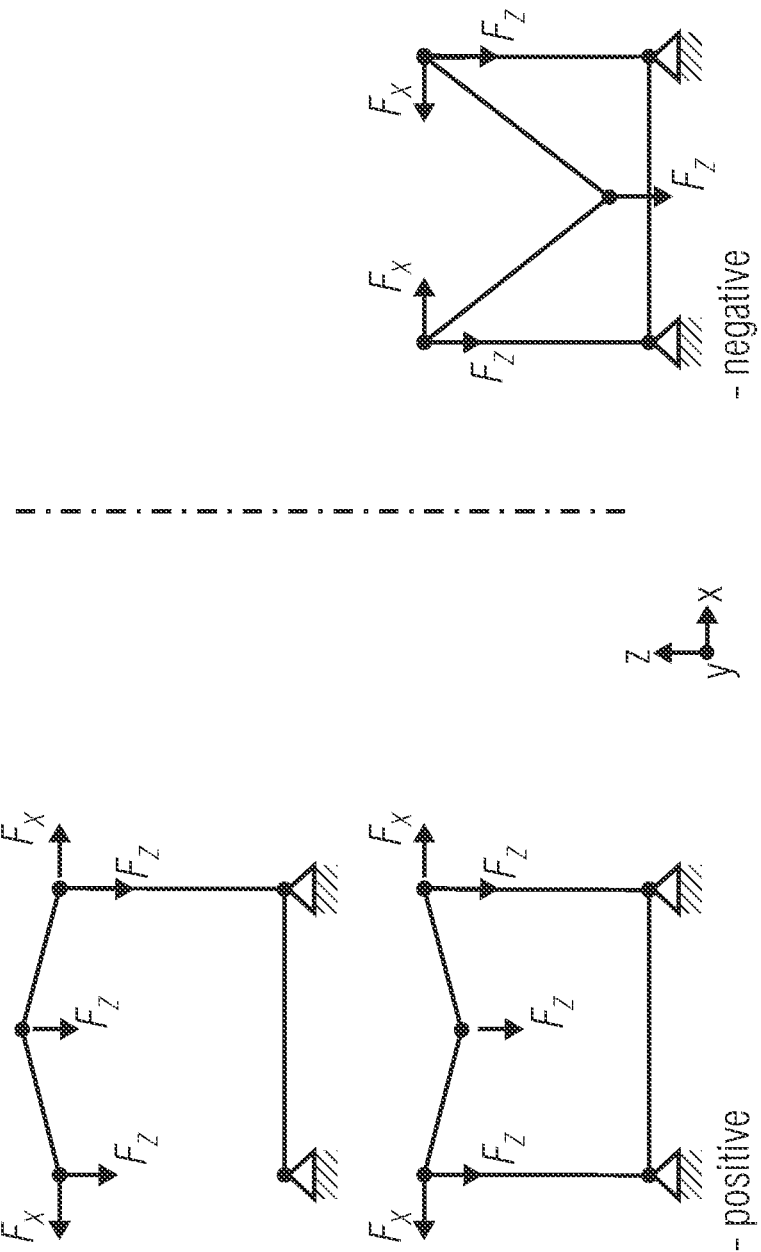
FIG. 4c are schematic force diagrams for illustrating the occurrence of negative lateral contraction.
Figure 5:
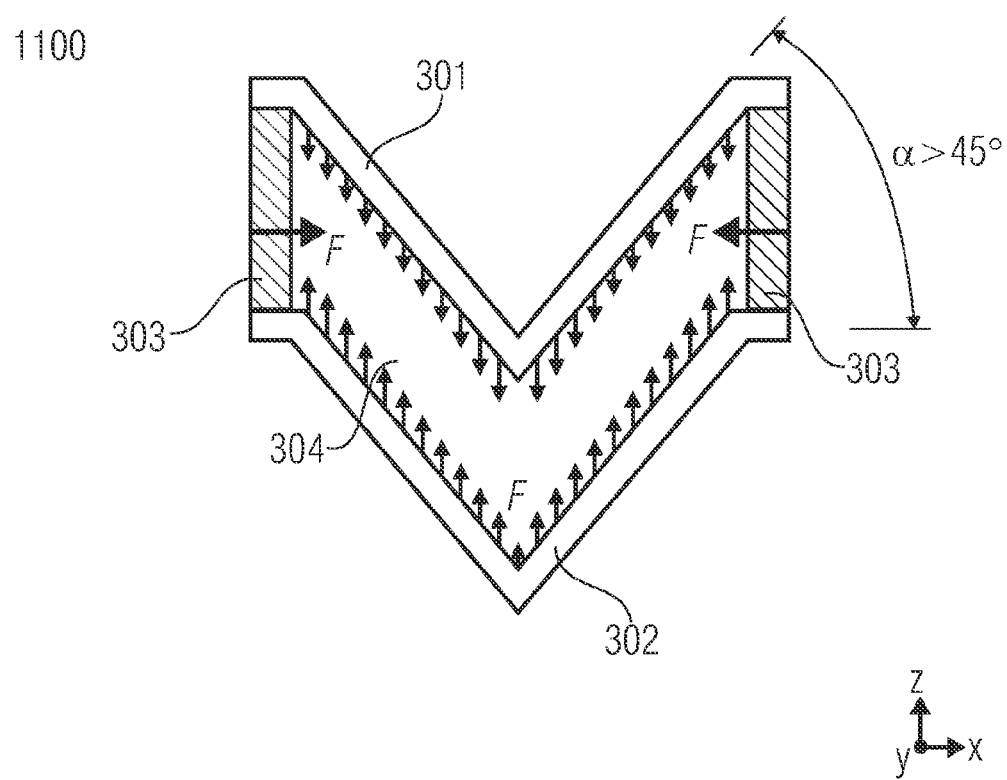
FIG. 5 is a schematic cross-section of a "plate" capacitor assembly having tilted electrodes indicating the acting forces for negative lateral contraction.

However, the large angle α is unfavorable for two reasons: geometries 900 and 1000, as shown in FIGS. 4a, 4b, can only be produced very poorly using sacrificial layer technology, and higher drive voltages are necessitated due to electrode gaps that are on average larger. A remedy is provided by the geometry shown in FIG. 5. This geometry again can be generated on a pre-structured substrate using the sacrificial layer technology.

The above-discussed plate capacitors are provided on or within a deformable element, such as a cantilevered beam or a cantilevered plate, according to embodiments discussed below, to obtain the desired deformation by the resulting lateral forces.

With the above-discussed plate capacitor geometries, it has been shown how the forces $F_z$ resulting from the electrostatic field can be converted to horizontally acting forces $F_x$. The main idea of subsequent embodiments for actuators is the usage of the horizontally acting forces to be able to actively bend beams and plates. For this, the plate capacitors are mounted on or within a cantilever or a deformable element.

FIGS. 6a, 6b show a cantilevered beam as an example of a deformable element (top view 1200 and cross-section 1300). Here, an insulating material 303 and an electrically conductive material 301 are deposited above an electrically conductive beam 1201. The insulating material 303 can be laterally structured, for example by a sacrificial layer technology, so that a thin cavity 304 is formed between the electrodes 1201 and 301. The cavity has the thickness of the dielectric sacrificial layer and thus defines the plate gap of the capacitor. If an electric voltage is applied between the electrodes 1201 and 301, a lateral strain on the surface of the beam will result from the vertical forces of the electrostatic field. As a consequence of the surface strain, the beam will be deflected (in analogy to the above-described bimorph or monomorph principle). If, as is shown in 6a, 6b, regular lateral geometries are used, the surface strain will be approximately constant and a spherical deformation profile w(x) results.

In other words, FIGS. 6a and 6b show a micromechanical device having an electrode 301 and a deformable element 1201 exemplarily implemented as a cantilevered beam or plate in the present case, which could, however, also be implemented differently, as is also the subject matter of the figures described below, and an insulating spacer layer 303, wherein the electrode 301 is fixed to the deformable element 1201 via the insulating spacer layer 303, and wherein the insulating spacer layer 303 is structured in several spaced-apart segments along a lateral direction 305 coinciding with the x direction in FIGS. 6a and 6b, which are illustrated in a shaded manner in FIGS. 6a and 6b, so that by applying an electric voltage between the electrode 301 and the deformable element 1201, lateral tensile or compressive forces result that bend the deformable element along the lateral direction 305, here the positive or negative z direction. Here, as shown in FIG. 6b, the segments can each comprise a longitudinally extending direction running transversally to the lateral direction 305. In the embodiment of FIGS. 6a and 6b, the segments are implemented in a stripe-shaped manner. The same obviously also applies to the gaps 304 between the same.

The deformable element 1201 does not necessarily have to be a plate or a beam. An implementation has a bowl, membrane or bar is also possible. In particular, the deformable element 1201, as in the case of FIGS. 6a and 6b, can be suspended and clamped such that the same remains unbent by applying the electric voltage U along a lateral direction, here the y direction, perpendicular to the lateral direction 205. However, the following embodiments will also show that the deformable element can be suspended and clamped such that the same bends in the same direction as along the lateral direction 305 when the electric voltage U is applied between the electrode and the deformable element along the lateral direction perpendicular to the lateral direction 305. The result is a bowl- or helmet-shaped bending, in which, for example, the direction 305 corresponds to the radial direction and the above-mentioned common direction of the bending points along the thickness of the insulating layer 303 from the electrode 301 to the deformable element 1201.

As is indicated by the coordinate system in FIGS. 6a and 6b, the micromechanical device can be formed in a substrate, such as a wafer or a chip, such that the electrode 301 is fixed above or below the deformable element 1201 in a substrate thickness direction, i.e. the z direction, so that by the bending of the deformable element 1201 the same is bent out of a substrate plane corresponding, for example, to the resting position of the deformable element 1201, namely in the bending direction pointing in the opposite direction of z in the case of FIGS. 6a and 6b. However, subsequently alternative embodiments will be described, according to which the micromechanical device can also be formed in a substrate such that the electrode 301 is laterally fixed to the deformable element, so that by bending the deformable element the same is bent within the existing substrate plane.

The height of the deflection of the beam or the plate or the deformable element 1201 can be actively varied by changing the electric voltage. The underlying physical principle can also be explained by the functional chain (=conversion of the physical quantities) in FIG. 7.

Figure 7:
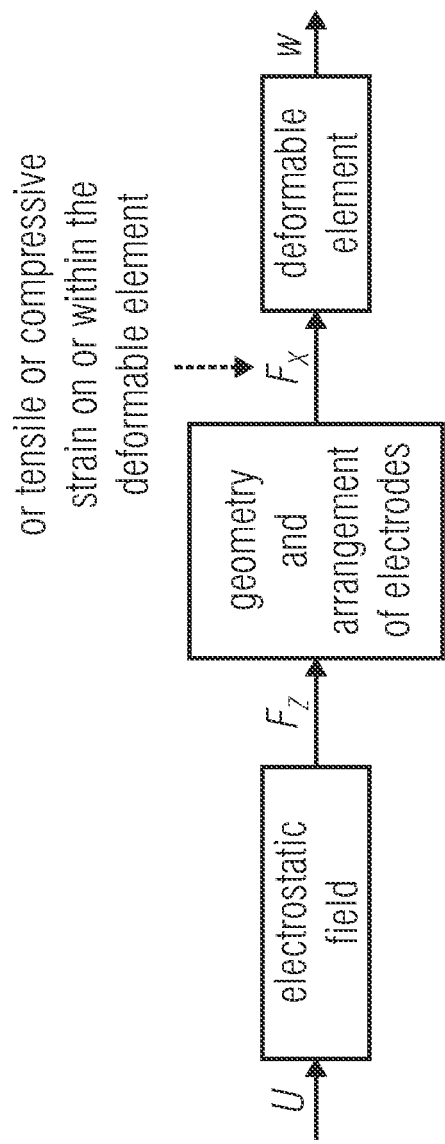
FIG. 7 is a block diagram of a simplified functional chain of the physical quantities acting in the micromechanical device of FIGS. 6a and 6b.

As is shown in FIG. 7, the electric voltage U generates an electrostatic field which again has the effect that the electrode 301 and the deformable element 1201 are attracted towards each other along the thickness direction or the z axis with the force $F_z$, wherein again the geometry and assembly of electrode 301, deformable element 1201 and insulating layer 303 has the effect that tensile or compressive forces $F_x$ are generated on or within the deformable element or between the electrode 301 and the deformable element 1201 which effect a bending w in the deformable element. For a better understanding, it is assumed below that the deformable element 1201 is a beam or a plate, wherein all these specific embodiments can also easily be generalized.

As explained above, converting the vertical forces $F_z$ into laterally acting forces $F_x$ can be significantly increased when one or both electrodes are tapered (=tilted). The greater force conversion is combined with a higher deflection of the beams or plates. Accordingly, lower electric drive voltages are necessitated for the same deflections.

FIG. 8 shows an embodiment where the top electrode 301 has been tilted. This geometry can be generated, for example, by pre-structuring the sacrificial layer for generating the cavity 304 already in its layer thickness before the electrode 301 is deposited.

FIG. 8 shows that the electrode 301 can be formed in a planar manner and between the segments of the insulating layer 303, in a manner curved away from the deformable element 1201. In the embodiment of FIG. 8, as was also the case in the preliminary considerations with respect to FIGS. 1-5, the electrode 301 is shaped such that the same has a V-shaped cross-section in a plane between the segments of the insulating layer 303, which is spanned by the lateral direction 305 and a thickness direction of the insulating spacer layer 303, i.e. the xz plane. The curvature could, however, also be implemented differently, in particular without edges running laterally to the direction 305 or with a differentiable curve along the direction 305. In the case of FIG. 8, the electrode 301 comprises, in each gap portion between the segments of the insulating layer 303, two planar portions running towards each other from immediately adjacent segments of the insulating layer 303 and increasingly running away from the deformable element 1201 to meet at an angle of 180°−2*α, wherein the definition of α of FIG. 2b or 3a has been used, namely such that α states the angle of these two planar portions with respect to the plane of the insulating layer 303. Thus, for each gap 304, an edge in the layer-shaped electrode 301 results, which runs in the center between the segments of the insulating layer 303. The angle α is, for example, between 1° and 45°, each inclusive of the same.

An embodiment where the surface of the bottom electrode or the beam material 1201 has been pre-structured is shown in FIG. 9. FIG. 9 shows that also the surface of the deformable element 1201 facing the electrode 301 can be formed in a curved manner between the segments of the insulating layer 303, namely as shown in FIG. 9 for example, facing the electrode 301. However, the surface could also face away from the top electrode, as was the case in FIG. 2b. Basically, all nine combination options are possible, according to which the electrode 301 can be planar, curved towards the deformable element 1201, curved towards the electrode 301 or away from the same. Six of the options were shown in FIGS. 1a-3b. As is also the case in FIG. 9, which corresponds to the example of FIG. 2c, the surface of the deformable element 1201 facing the electrode 301 between the segments of the insulating layer 303 can be formed such that the same runs parallel to the layer-shaped electrode 301. The insulating spacer layer can be planar. If the same has a bend, it is smaller than the sectional bend or curvature of the electrode 301 and/or the respective surface of the deformable element 1201.

Figure 10:
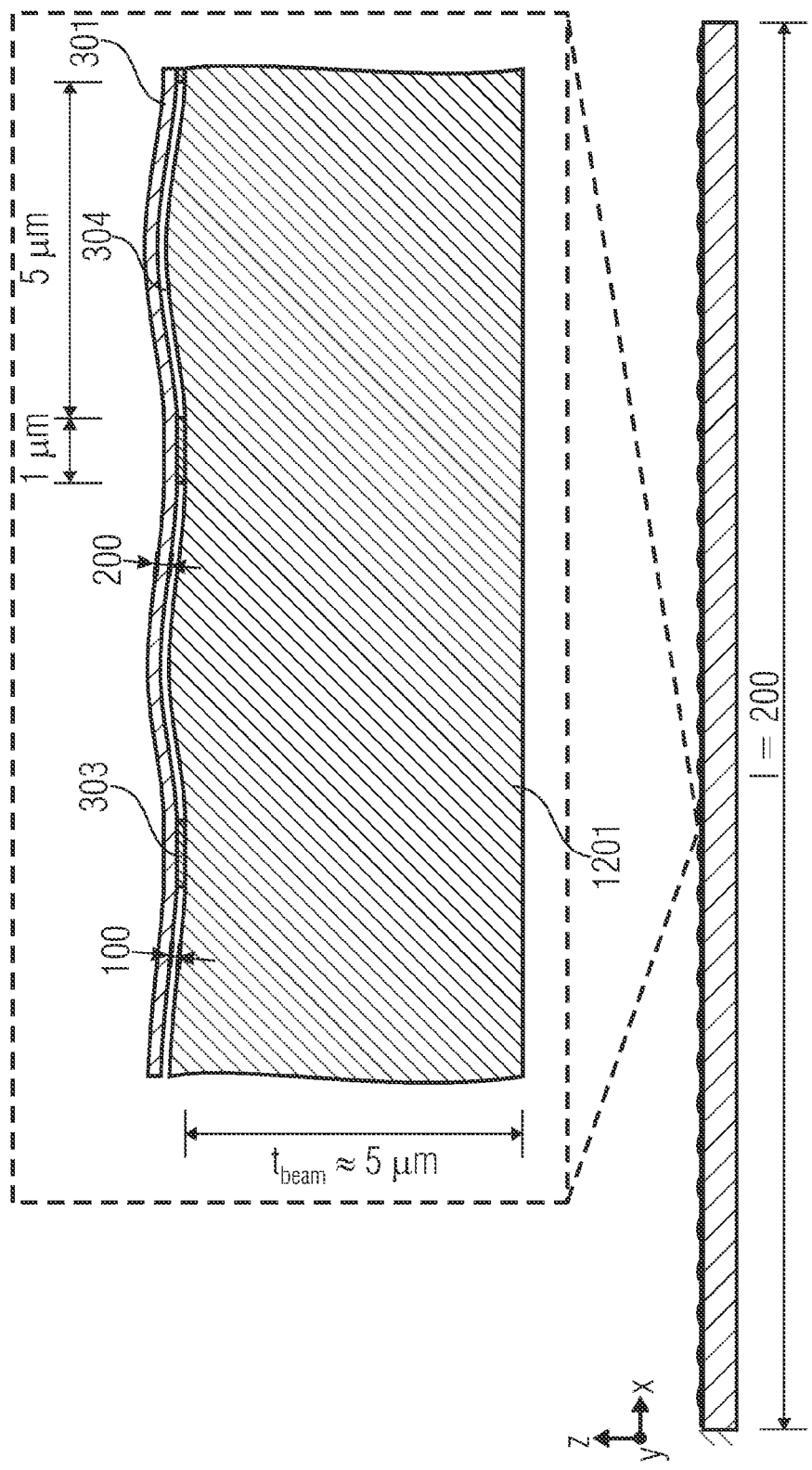
FIG. 10 is a dimensioned drawing of a micromechanical device in the form of a cantilever, for which a simulation has been performed.

In order to be able to estimate the order of magnitude of the above-described effects, the embodiment 1500 (in FIG. 9) has been examined with the help of a finite element analysis. For this the non-optimized geometry in FIG. 10 has been used:

A cantilevered beam of silicon having a length of 200 μm and a thickness of approx. 5 μm represents the bottom electrode 1201. The surface of the beam has been pre-structured such that an angle of slope α of 5° results.

An insulating layer 303 of silicon dioxide having a thickness of 100 nm is on the beam.

The top electrode 303 is 200 nm thick and also consists of silicon.

The gap between the electrodes is 100 nm. The individual electrode segments have a length of 5 μm.

For simplicity's sake, the following area loads independent of the deflection of the electrodes have been applied between the boundary layers:

Boundary layer between 1201 and 304:

$$\frac{F_z}{A} = \frac{1}{2} \cdot U^2 \cdot \frac{8{,}85 \cdot 10^{-12} \frac{As}{Vm}}{(100 \text{ nm})^2}$$

Boundary layer between 304 and 301:

$$\frac{F_z}{A} = -\frac{1}{2} \cdot U^2 \cdot \frac{8{,}85 \cdot 10^{-12} \frac{As}{Vm}}{(100 \text{ nm})^2}$$

Figure 11:
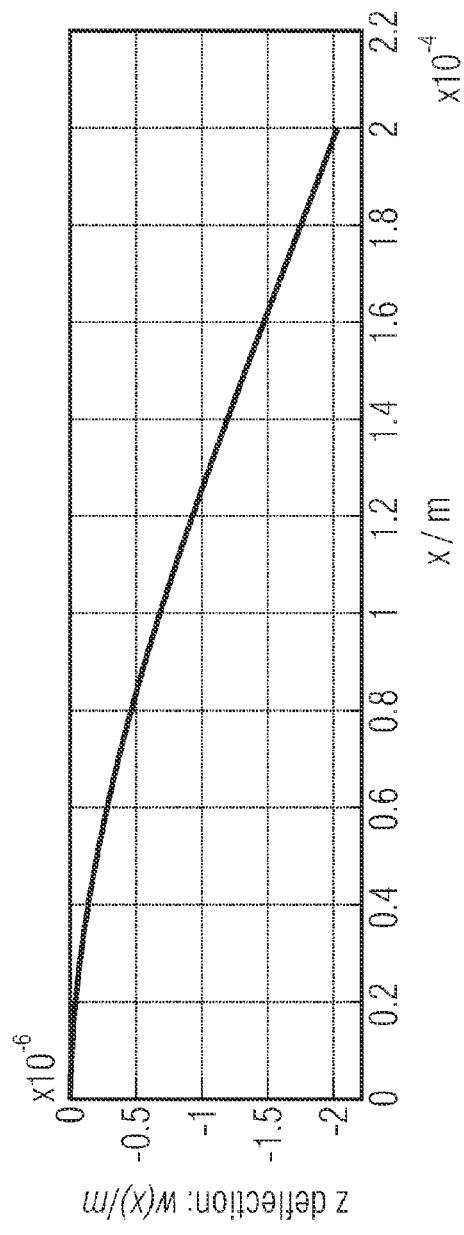
FIG. 11 is a graph showing the z deflection of the beam of FIG. 10 in dependence on the location x at U=50 V.

With the help of the finite element model, the deflection of the beam has been calculated. An exemplary deformation profile of the whole beam at an electric voltage of 50 V is shown in FIG. 11 (x=0 is the suspension location).

Figure 12:
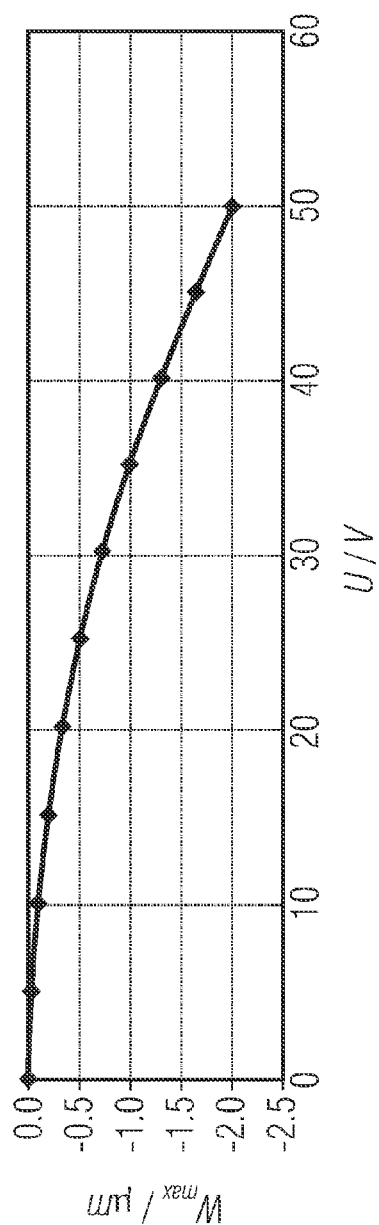
FIG. 12 is a graph showing the maximum deflection of the beam at the beam end of FIG. 10 in dependence on the applied electric voltage U.

The maximum deflection at the end of the beam in dependence on the applied electric voltage is shown in FIG. 12.

If an approximately spherical deformation profile is taken as a basis, an "equivalent layer voltage" σ can be estimated from the maximum deflection wmax of the beam, which needs to have a 200 nm-thick layer on a 5 μm-thick beam so that the same experiences a comparative bend:

$$\sigma = \frac{E_{Balken}}{1 - v_{Balken}} \cdot \frac{t^2_{Balken}}{6 \cdot t_{Film}} \cdot \frac{2 \cdot w_{max}}{l^2} \text{ mit:}$$

$E_{beam}$ and $v_{beam}$ are the elasticity module and the lateral contraction number of the beam, wherein the ratio of these elastic material values is isotropic for (100)-oriented silicon:

$$\frac{E_{Balken}}{1 - v_{Balken}} = 180{,}5 \text{ GPa},$$

$t_{beam}$ corresponds to the thickness of the beam ($t_{beam}$≈5 μm), $t_{film}$ corresponds to the thickness of the layer which will bend the beam due to the mechanical (comparative) stress ($t_{film}$=200 nm) and l corresponds to the length of the beam (l=200 μm).

Figure 13:
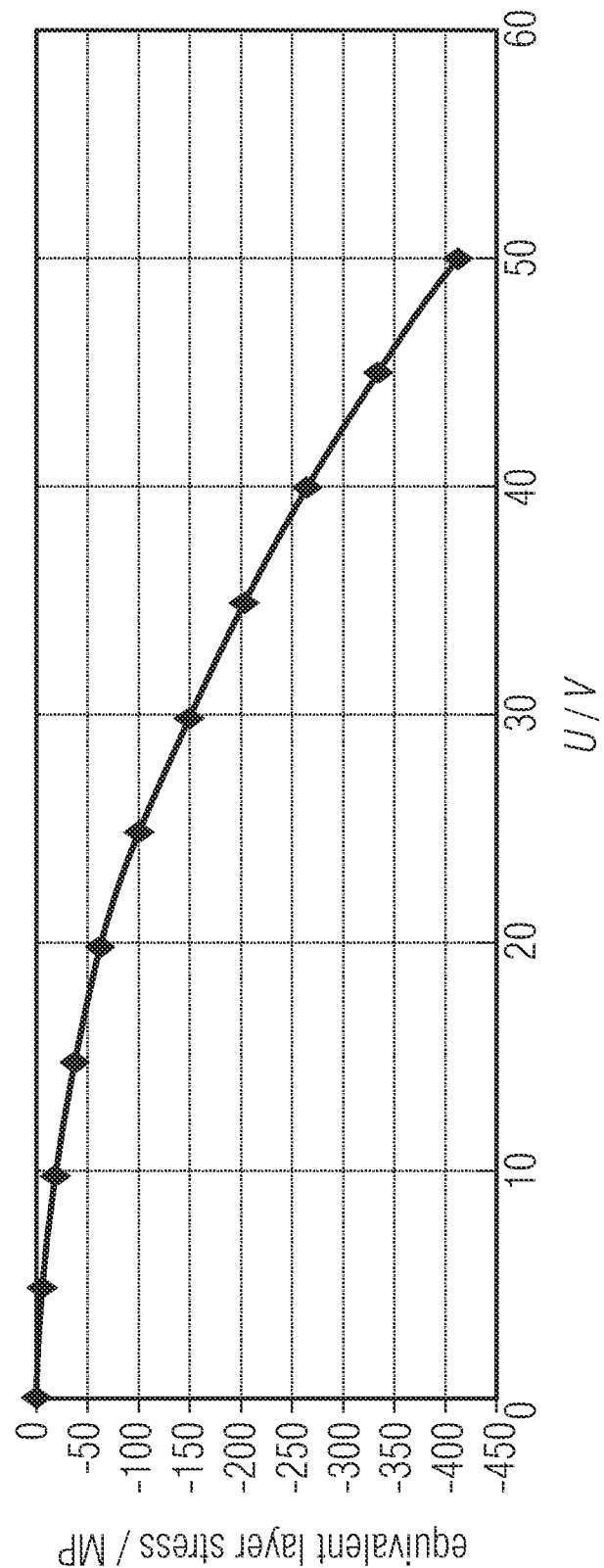
FIG. 13 is a graph showing the "equivalent layer stress" of a 200 nm thick layer in dependence on the applied electric voltage U at electrodes of the cantilever of FIG. 10, which would result in a comparable deflection $w_{max}$ of the beam.

The equivalent layer stress calculated for the example in dependence on the electric voltage is shown in FIG. 13:

1. The characteristic curve illustrates that already at low electric voltages high equivalent layer stresses (here compressive stress in the MPa range) can be generated with the geometry of FIG. 10. Thus, the effect is significant.

2. The curve of the exemplary characteristic curve also shows that the usage of plate capacitors for the bimorph or monomorph bending of plates or beams can be compared to the usage of electrostrictive materials. With electrostrictive materials, the actively generatable material strain or material stress depends in a square manner to the electric field or the electric voltage (→σ~$U^2$). In other words, an electrostrictive material can be substituted by the usage of plate capacitor geometries shown in FIG. 10 on or within actively deflectable cantilevers or other deformable elements. Since standard materials can be used for producing the deflectable structure or the deformable element, the above embodiments enable the usage of an effect comparable to the electrostrictive effect without having to use a material having high electrostrictive material coupling.

In this computing example, the individual segments of the top electrode 301 have been deflected in the z direction by less than 30 nm at an electric voltage of 50 V. Thus, the movement of the electrodes has not yet reached the above-described unstable pull-in region. At the same time (due to the force conversion of the inventive structures) an overall deflection of the beam of more than 2 μm can be observed. Thus, the overall deflection is much larger than the maximum movement of the electrodes and even significantly higher than the gap of the electrodes.

Thus, the above as well as the following embodiments solve the above-described "dilemma" of the pull-in effect, which so far has occurred in conventional electrostatically deflectable actuators.

Thus, the embodiments presented above allow the usage of electrostatic fields for deflecting microstructures, wherein the overall deflection can be significantly larger than the gaps of the electrodes. This has not been possible so far. Thus, very small electrode gaps and hence also low electric voltages can be used for deflecting the microstructures. Thus, high drive efficiency is enabled.

Thus, the above embodiments also have the advantage that electrostatically deflectable microstructures have low power consumption since electric current only flows at the time of changing the electrostatic field, which is a great advantage compared to thermomechanically, piezomagnetically or magnetostrictively bimorph- or monomorph-deflectable beams or plates.

The small electrode gaps between electrode 301 and deformable element 1201 can be produced relatively easily by using the known sacrificial layer technology. Semiconductor-compatible "standard materials" can be used for producing the structures.

Actively bimorph- or monomorph-deflectable beams or plates can be produced as a deformable element without using electroactive or magnetoactive material. Thus, the problem of using materials having high piezoelectric, electrostrictive, piezomagnetic or magnetostrictive material couplings in solved, which may actually not be used in semiconductor-compatible production processes.

The common piezoelectric materials, also having ferroelectric characteristics (such as PZT or BaTiO3) have a hysteresis in the characteristic curve of the material strain compared to the electric field strength. If microstructures are deflected with these materials, the characteristic curve of the device (deflection in dependence on the control voltage) also has a hysteresis function. Thus, the behavior of piezoelectrically deflectable microstructures is not determined. On the assumption that the mechanically strained components of the electrostatically, bimorph- or monomorph-deflectable microstructures of the embodiments presented and still to be presented are not plastically deformed, such a microsystem has no hysteresis. An advantageous, determined device behavior can be assumed.

A single disadvantage is that in plate capacitors having very small electrode gaps, charge carriers can jump directly from one electrode to the opposite electrode. This effect is known as "field emission" and reduces the maximally usable electric voltage due to the electric current flowing through the same. The strength of this disadvantageous effect depends on the used electrode materials. This disadvantageous effect can be limited in its extent by selecting the electrode materials for the electrode 301 and the deformable element 1201 in a suitable manner or by additionally taking other measures, as they will be presented below, such as providing thin insulating layers on the surfaces of the electrode or the deformable element 1201 facing each other, or at least on one of the same.

Before an exemplary production process for a micromechanical device according to the above embodiments will be described below, it should be noted that the deformable element 1201 can consist of a conductive material, i.e. can be conductive itself, can be made locally conductive, such as by doping, or can be coated with a conductive material, such as with a metal coating, such as on the side facing the electrode 301. The deformable element can consist of a semiconductor material or another suitable material. The insulating layer is also hardly limited with respect to the choice of material. Advantageously, the same has a high rigidity and a high electric resistance Like the deformable element, the electrode 301 can consist of a conductive material, can be made locally conductive or can be coated with a conductive material.

As will be shown in the following discussion of an exemplary production method, the deformable element might correspond to a thinned region of a substrate, such as a semiconductor substrate, wherein a merely local, e.g. one-sided or two-sided suspension, optionally also in the form of respective spring elements, can be realized in that an opening extending along a circumference of the deformable element that is continuous in the thickness direction separates respective portions of the circumference from the otherwise rigid substrate. Alternatively, the deformable element could, however, also have freedom of movement by being arranged above a respectively large recession in the substrate, for example by lateral etching.

An exemplary process flow for producing the inventive structures is shown in FIG. 14. Here, the process is exemplarily started with a BSOI (bonded silicon on insulator) wafer 1550 (step a), wherein the SOI layer 1552 (top layer or device silicon) consists of silicon with suitable doping for sufficiently high conductivity. Instead of a BSOI wafer, obviously also another SOI wafer could be used. Even variations with other types of wafer are easily possible. As is shown, the wafer 1550 comprises a layer stack having a buried oxide layer 1554 and a carrier substrate 1556 below the SOI or the semiconductor substrate. As a first process step b) a silicon oxide layer 1558 is applied, for example by means of deposition (with the help of CVD deposition or thermal growth) whose thickness will later define the electrode gap. In the following step c) a suitable conductive material (e.g. an aluminum alloy, amorphous silicon or amorphous titanium aluminide), which will later define the electrode 301, is deposited, wherein the material is indicated by 1560. Subsequently, by suitable photolithographic process steps, small holes 1562 are introduced into the topmost material layer 1560 (e.g. by reactive ion etching (RIE) for the later sacrificial layer etching (step d)). The distance, the arrangement and the size of the holes is selected, for example, such that the insulating regions 303 remain due to the sacrificial layer etching (cf. step B). Subsequently, a suitable rear-side lithography is performed on the rear side of the BSOI wafer, so that in step e) the handling or supporting silicon (=lowest layer or substrate of the BSOI wafer 1556) can be etched by wet chemical methods (TMAH or KOH etching), but also possibly by deep reactive ion etching (DRIE) over a suitable resist or hard mask. A large region 1564 results, defined by the rear-side holes in a mask not shown in FIG. 14e having thin, cantilevered membranes above the cavity 1564. In the subsequent step f) etching of one or several open trenches 1566 is performed for the edge of the cantilever (or another microstructure to be deflected). The etching mask necessitated for this can, however, also be applied prior to step e) and etching the SOI layer 1552 can be performed by RIE, DRIE or possibly also purely chemically (e.g. by XeF2 gas). In the release step g) sacrificial layer etching of the uppermost SiO2 layer 1558 is performed. However, the buried oxide layer 1554 is also etched, so that the trenches 1566 become continuous openings. FIG. 14h shows a top view in which the structure of the deformable element is shown more clearly as a cantilever or a cantilevered beam or plate. Here, a suitable etching solution flows through the etching holes 1562 introduced in step d) and undermines or hollows out the top electrode layer 301 or 1562 to form the gaps 304. Theoretically, wet chemical methods (e.g. with BOE) can be used for this, which is, however, not advisable due to the strong surface forces of liquids and the accompanying mechanical stress of the thin exposed structures (so-called sticking effects can occur). As a good alternative, SiO2 sacrificial layer etching with the help of vaporous hydrogen fluoride (vapor HF) is known and can be used for isotropic lateral etching of the top electrodes 301. This vapor HF etching is to be performed by a respectively selected etching period such that the insulating material 303 or 1558 is maintained at a sufficient width.

The "basic process" presented above and in FIG. 14 can be adapted or improved by the following extensions or amendments:

Instead of the depositions b) and c), a multiple BSOI wafer (BSOI-SOI wafer) can be used. Thus, the top electrode 301 also consists of silicon, the layer necessitated for sacrificial layer etching is the top $SiO_2$ layer within the multiple BSOI wafer and the cantilever or the microstructure to be deflected is realized by the central silicon layer. The advantage of this approach is that the mechanically stressed elements can be produced from single crystalline silicon. Single crystalline silicon is well known (and "popular") in microactuator engineering due to its excellent mechanical rigidity.

bent electrodes 301 but also the production of the complex, e.g. sinusoidal electrode geometries (see FIGS. 15 and 16 below) can be realized by an appropriately produced pre-structuring of the SOI layer 1560. For this, prior to step b) the top silicon layer (SOI) is structured using wet or dry chemical methods and structured via grayscale lithography or possibly nanoimprint methods. Particularly the angle of 54.7° shown in the inventive examples (e.g. in 1100 in FIG. 5) can be generated by TMAH etching in single crystalline, 100-oriented silicon.

Additionally, the top sacrificial layer 1558 can also be structured by a suitable formative method prior to the deposition of the top electrode 301 in step c) in order to produce further complex electrode geometries. For example, a sinusoidal electrode geometry can be enabled by merging silicon dioxide at a high temperature which is above the glass transition temperature. For this, steps are etched into the $SiO_2$ layer, e.g. by a suitable dry etching method. When heating these rectangular $SiO_2$ steps above the glass transition temperature, the material increasingly starts to flow and strives to minimize its surface due to energetic conditions. When the step distance and height as well as the heating period are suitably selected, the energetically favorable minimum surface corresponds to a sinusoidal curve.

The following embodiments 1600 to 2100 (in FIGS. 15 to 20) for electrostatically deflectable beams cover only some, but not all possible geometry variations, but serve for further illustration. First, however, the following should be noted.

Figure 15:
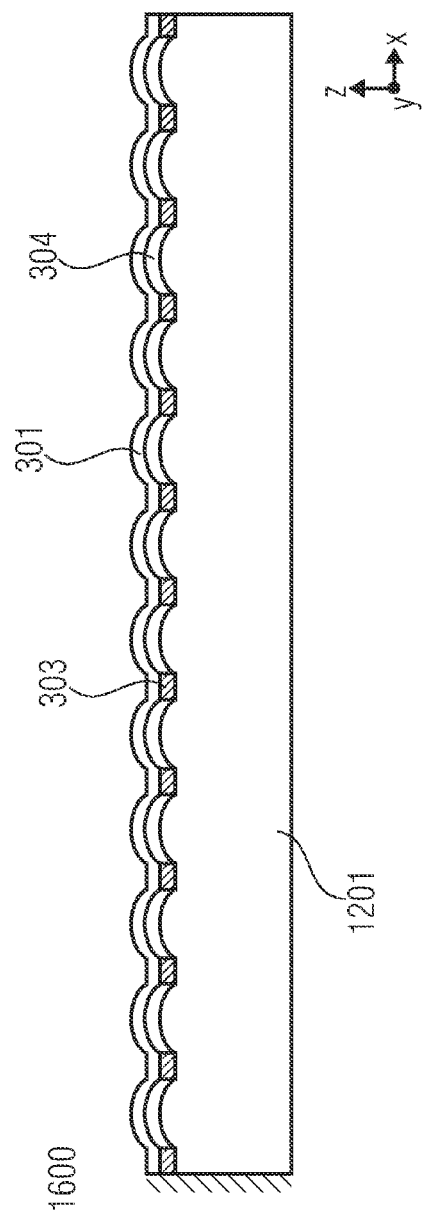
FIG. 15 is a schematic cross-section of a micromechanical device in the form of an electrostatic bimorph-deflectable and one-side clamped cantilever according to a further embodiment.
Figure 16:
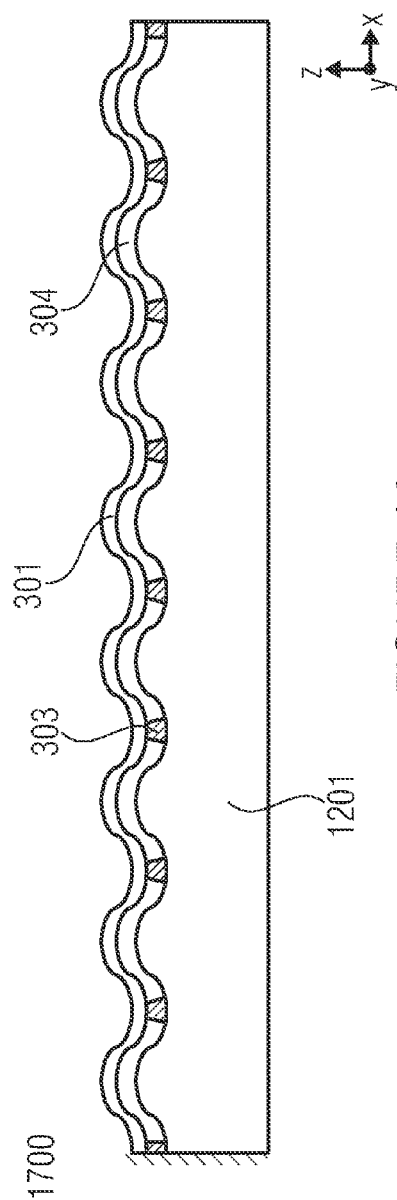
FIG. 16 is a schematic cross-section of a micromechanical device in the form of an electrostatic bimorph-deflectable and one-side clamped cantilever according to a further embodiment.

For example, as is shown in FIG. 15 and also pointed out above, it is possible for the curvatures of the electrode 301 and/or the side of the deformable element 1201 facing the same between the segments of the insulating layer 303 to be less V-shaped but in fact rounded. As is shown in FIG. 16, in the area portions of the segments of the insulating layer 303 itself it is not necessitated to implement the electrode 301 and the side of the deformable element 1201 facing the same in a planar manner. Rather, the corrugation of the electrode 301 and/or the side of the deformable element 1201 facing the same can extend continuously across several segments of the insulating layer 303 and its gaps 304. The insulating layer 303 or its segments can, however, as is shown in the embodiments, be formed in a common plane, i.e. in a planar manner, so that for each curvature of the electrode 301 and/or the side of the deformable element 1201 facing the same also an oppositely designed curvature exists at the positions of the segments of the insulating layer 303.

Figure 2B:
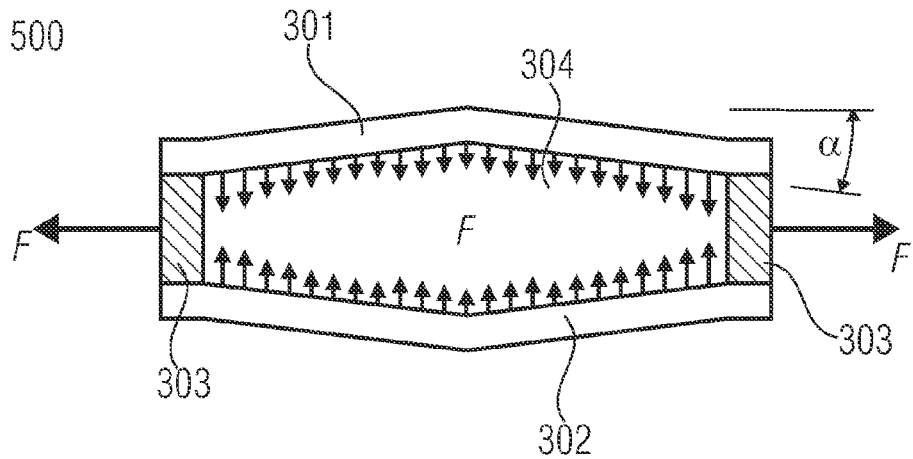
Figure 2C:
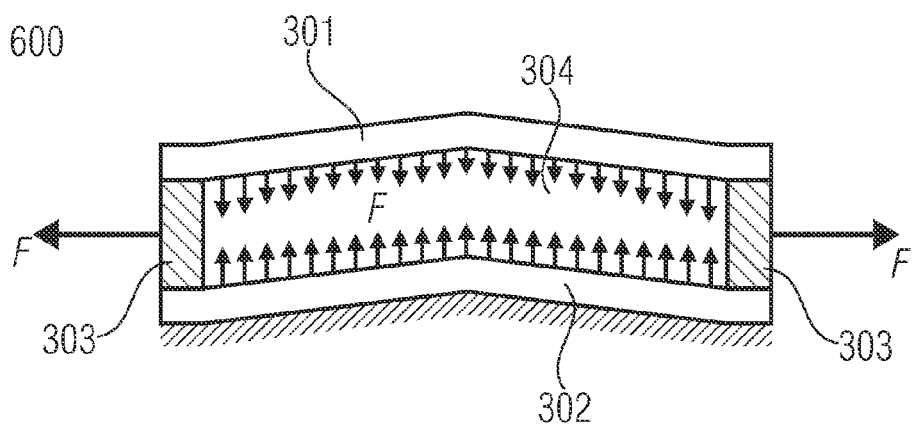
Figure 17:
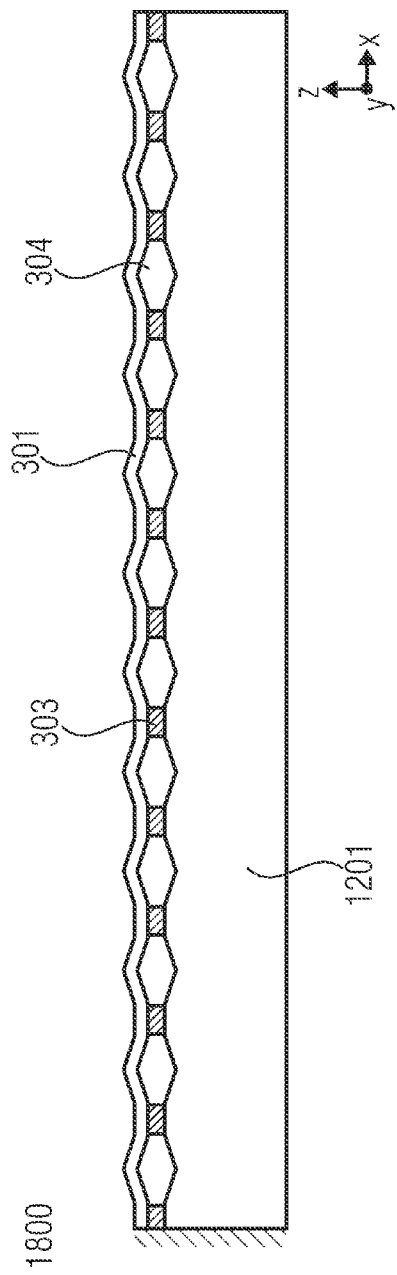
FIG. 17 is a schematic cross-section of a micromechanical device in the form of an electrostatic bimorph-deflectable and one-side clamped cantilever according to a further embodiment.
Figure 18:
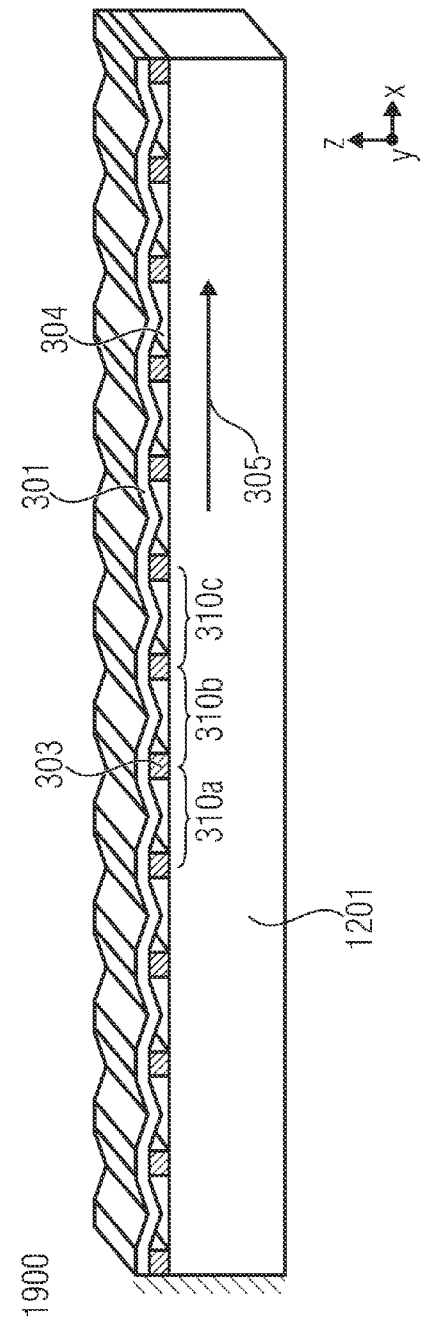
FIG. 18 is a schematic three-dimensional view of a micromechanical device in the form of an electrostatic bimorph-deflectable and one-side clamped cantilever according to a further embodiment.

FIG. 17 shows, as has already been mentioned above, that corresponding to the preliminary considerations in FIG. 2b, the exemplary V-shaped curvatures of the electrode 301 in FIG. 17 and the surface of the deformable structure 1201 facing away from the same can be implemented pointing away from each other. FIGS. 18 and 19 show further options for micromechanical devices 1900 or 2000 corresponding to the implementations of FIG. 3a or 3b with respect to the curvature of the top electrode 301 or the side of the deformable structure 1201 facing the same. FIG. 20 shows another micromechanical device 2100 where the portions between the segments of the insulating layer 303 are formed according to the implementation of FIG. 5, so that, by applying a voltage between the electrode 301 and the deformable element 1201, deformation of the deformable element 1201 in the direction of the z axis, i.e. towards the top in FIG. 20, results, namely due to a lateral contraction of the individual portions between the segments of the insulating layer 303.

With respect to the above description, the following should be pointed out. The previous embodiments all show that the periodic portions exemplarily designated in FIG. 18 as three portions with 310a, 310b and 310c and extending between the immediately adjacent segments of the insulating layer 303 were all structured equally, i.e. with respect to the selection of the implementation of, for example, one of FIGS. 1a-5, to the spacing of the segments in the direction 305 up to the dimensions of the cross-sections of the gaps 304. However, this is not necessarily so. Across the individual portions 310a-310c, dimensions or implementations with respect to the curvature of the electrode 301 or the surface of the deformable element 1201 facing the same can also be varied. FIG. 18 is exemplarily shown as a three-dimensional drawing and it becomes clear from this figure that the individual segments of the insulating layer 303 are completely separate from one another and also remain separate at the edge or lateral outer circumference of the deformable element 1201, so that the gaps 304 are open at the ends lateral to the direction 305 or at the ends opposing each other laterally to the direction 305.

Figure 21A:
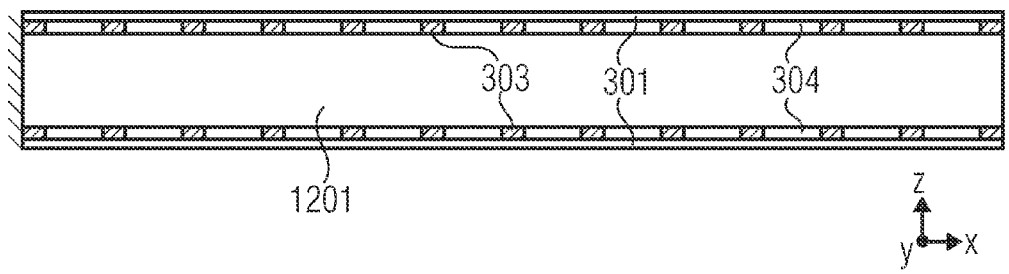
FIGS. 21a to 21c are schematic cross-sections of a micromechanical device in the form of an electrostatically bimorph-deflectable and one-side clamped cantilever according to a further embodiment.

Additionally, it should be pointed out that in the above-described embodiments the periodic plate capacitor assemblies were arranged only on one of the main sides of the deformable element 301. However, it is also possible for these periodically recurring plate capacitor assemblies to be arranged on the top and the bottom of the deformable element or above and below the neutral phase of the deformable element. This is shown in FIG. 21a. If, as is shown in FIG. 21a, an electrostatic actuator for generating lateral compressive stress is mounted on the top and the bottom of the deformable element 1201, i.e. the individual portions between the segments of the insulating layer 303 correspond to the implementations for positive lateral contraction, the deformable element 1201 or the beam or the plate can be deflected in both directions, i.e. in FIG. 21 towards the top or the bottom (or also vibrating in a resonant manner) depending on how the electrode 301 is addressed. The same applies when the plate capacitors at the top and the bottom are implemented for a lateral tensile stress or correspond to the implementations for negative lateral contraction.

In the case of FIG. 21a, the beam 1201 bends towards the top when a voltage is applied between the top electrode 301 and the deformable element 1201, and towards the bottom when this voltage is applied between the bottom electrode 301 and the element 1201, while no voltage is applied to the respectively different electrode pair. However, it would also be possible for the plate capacitor assemblies on the top of the deformable element 1201 to be implemented for tensile stress or negative lateral contraction and on the bottom for lateral compressive stress or positive lateral contraction. In this case, deflection of the deformable element could be amplified or the deflection could be increased with the same electric drive voltage. In this case, a voltage would be respectively applied both between the top electrode 301 and the deformable element 1201 and between the deformable element 1201 and the bottom electrode 301. The opposite configuration would, of course, also be possible, according to which the capacitor arrangements at the top are implemented for positive lateral contract and at the bottom for negative lateral contraction.

Figure 21B:
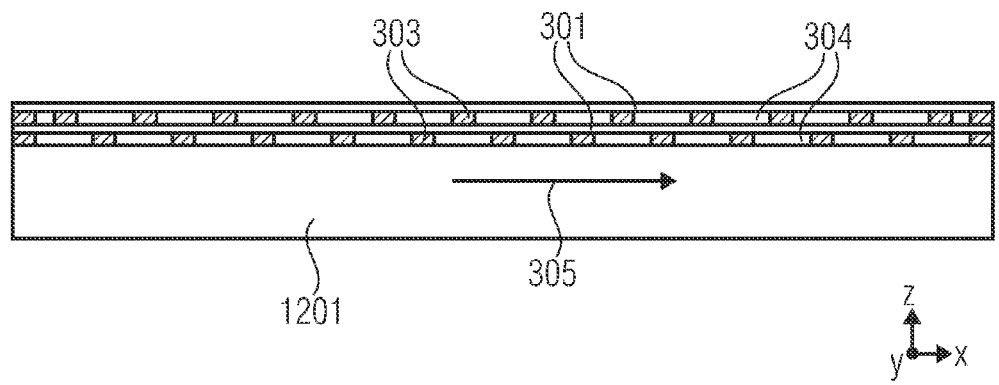
Figure 21C:
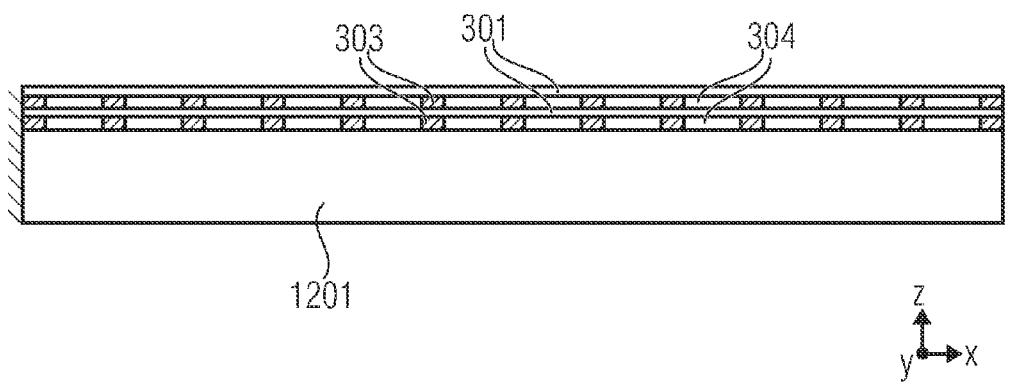

Additionally, it would be possible to stack several planes of plate capacitor arrangements or assemblies on top of each other so as to result in a multiple actuator for increasing the curvature effect. The options for this are shown in FIGS. 21b and 21c. Both figures show that a further electrode 301 exists apart from the first electrode 301, which is fixed to a side of the first electrode 301 facing away from the deformable element via a further insulating spacer layer 303, wherein the further insulating spacer layer 303 is also structured into several spaced-apart segments along the lateral direction. In FIG. 21b, the segments of the further electrode 301 are positioned laterally in gaps of the segments of the first electrode 301, while in the case of FIG. 21c the segments of the two insulating layers 303 are oriented laterally to one another, so that they oppose one another across the first electrode 301, as well as the respective gaps 304 between the same.

The implementation according to FIG. 21b, according to which the actuator elements are each arranged offset by half a raster width compared to the underlying actuator elements, reduces the mechanical interaction of the actuator layers. In the implementation according to FIGS. 21b and 21c, for bending, a voltage is applied simultaneously both between the electrode 301 on the one hand, and between the first electrode 301 and the deformable element 1201 on the other hand, whereby the curvature effect as described can be increased.

Previous embodiments were characterized in that a beam or a plate can be bent out of the plane and hence be deflected in the z direction due to the horizontal structure of the electrostatic drives. This has been illustrated, among others, by the schematic coordinate systems, wherein the x-y plane was parallel to the substrate plane. The reason for this was the relatively simple production of the small electrode gaps with the help of a thin sacrificial layer.

Figure 22A:
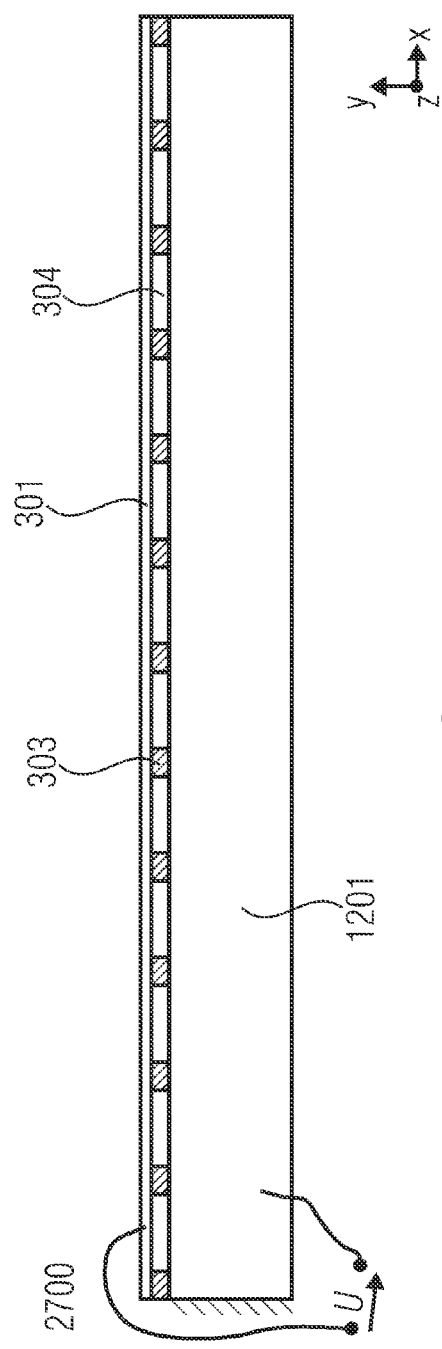
FIG. 22a is a schematic cross-section of a micromechanical device, here exemplarily in the form of an electrostatically bimorph-deflectable and one-side clamped cantilever for deflection within a plane according to an embodiment.
Figure 22B:
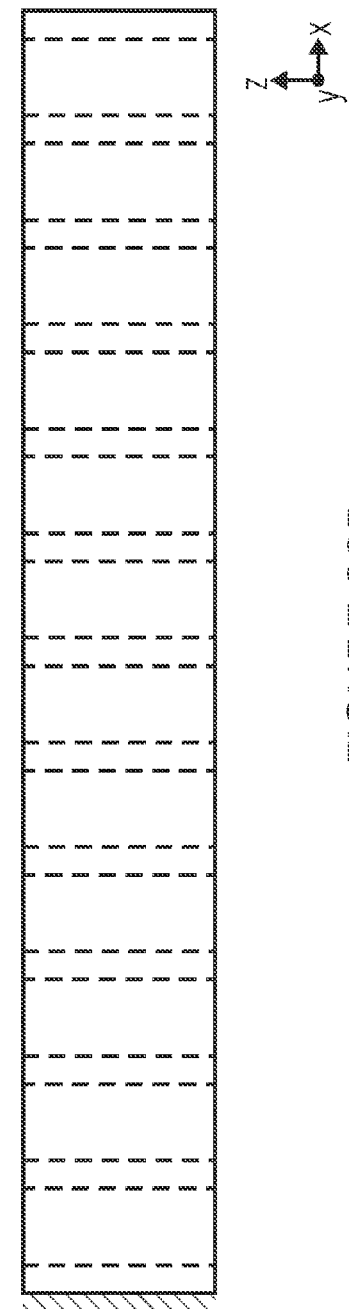

However, basically it is also possible to build the structures in a tilted manner, as is shown in FIG. 22. Here, the electrode areas 301 and 1201 are arranged orthogonally to the substrate plane. In this way, microcomponents can also be deflected within the chip plane (e.g. in the y direction in FIG. 22).

Thus, deflection of the deformable element 1201 in the plane of the substrate in which the same is formed is possible with the micromechanical device of FIG. 22. A possible production method will be described below.

A bimorph or monomorph deflection of microstructures with in a plane has so far only been possible using thermal excitation (e.g. [19] or with the hot arm principle: [29]). As far as is known, the electro- or magnetoactive effects cannot be used here, since it is difficult to deposit respective materials having the necessitated layer characteristics, e.g. on the side wall of beams. Compared to thermomechanical excitation, the electrostatically monomorph- or bimorph-deflectable actuators have low power consumption. Thus, energy-efficient monomorph or bimorph deflection of microstructures can be enabled within the chip plane. This has not been possible so far.

In the following, an exemplary production process will be described for the embodiment of FIG. 22 with deflection within a chip plane.

Although producing these structures is not as easy as for FIGS. 1-21c, it is not impossible using technologies common for microsystems. In particular by the increasing minimization of the minimum structure widths in microelectronics, it can be expected that the lateral structure widths in the range of 100 nm will become usable also in microsystem technology. Currently, minimum structure resolutions of approx. 1 μm are common in microsystem technology.

FIG. 23 shows an exemplary simplified process flow of the inventive vertically structured structures. Here, small holes 1570 are introduced into the device silicon 1552 of a suitable wafer (e.g. BSOI wafer) using deep reactive ion etching (DRIE) (step b)). The holes 1570 serve as segments of the insulating layer 303 or as the locations of the same. In the subsequent step c), the small holes 1570 are filled with silicon oxide or another insulating material, for example with the help of CVD deposition or thermal growth. After that, by structuring with sufficiently high lateral structure resolution, the gap 304 between the electrodes 301 and 1201 can be etched using, for example, DRIE technology. In this step d), it is also possible to simultaneously etch the contour 1574 of the microstructures to be deflected (e.g. the edge of a beam) with DRIE. The opening 1574 continuous in the substrate thickness direction defines not only the contour of the deformable element but also the deflectable path of the deformable element, which is why the opening 1574 in FIG. 3d turns out to be more spacious. FIG. 23e shows the final state of FIG. 23d in a sectional view. As can be seen, it can happen that the electrode and the deformable element 1201 including the insulating spacer layer 303 in between are formed only in the SOI layer 1552 of the wafer or the substrate, wherein the buried oxide layer 1554 and the carrier substrate 1556 can here be removed locally to release the movement of the deformable element 1201. However, it can also be the case that only the buried oxide layer 1554 is removed, whereas the carrier substrate 1556 remains below the deformable element. After all, it does not necessarily have to be an SOI wafer either.

As is illustrated in FIG. 24a, due to the lateral structuring (and subsequent etching) it is possible to form any shapes of the gaps 304, but also any shapes of the top electrode 301. Thus, all embodiments shown above with deflection in the z direction can be produced. Additionally, the combinations shown in FIGS. 15-21c as well as multiple layer actuators as well as combination of actuators for generating lateral tensile or compressive strain are possible above and below the neutral fiber and can be implemented without any additional effort.

The process flow shown in FIG. 24 illustrates that it is suitable for in-plane deflection of microstructures of any complexity. This is illustrated in FIG. 24 on the basis of an annular beam. This beam is firmly clamped at one end. If the electrostatic actuators are mounted outside the neutral fiber (close to the edge) of the beam, the radius of the annular beam changes due to a controllable electric voltage. The free end of the beam performs a lateral movement within the chip plane.

Any other shapes of a microstructure deflectable in this manner are, however, also possible.

In the following, embodiments will be described where the above embodiments are used in specific applications. Here, the structures 1200-2100 shown so far are used within actively deflectable microdevices. The following section shows the usage of the above-shown electrostatically deflectable beams and plates based on several examples. These examples are, of course, not complete, but are to illustrate the diversity of usage of the above-shown micromechanical devices or variations thereof.

Figure 25A:
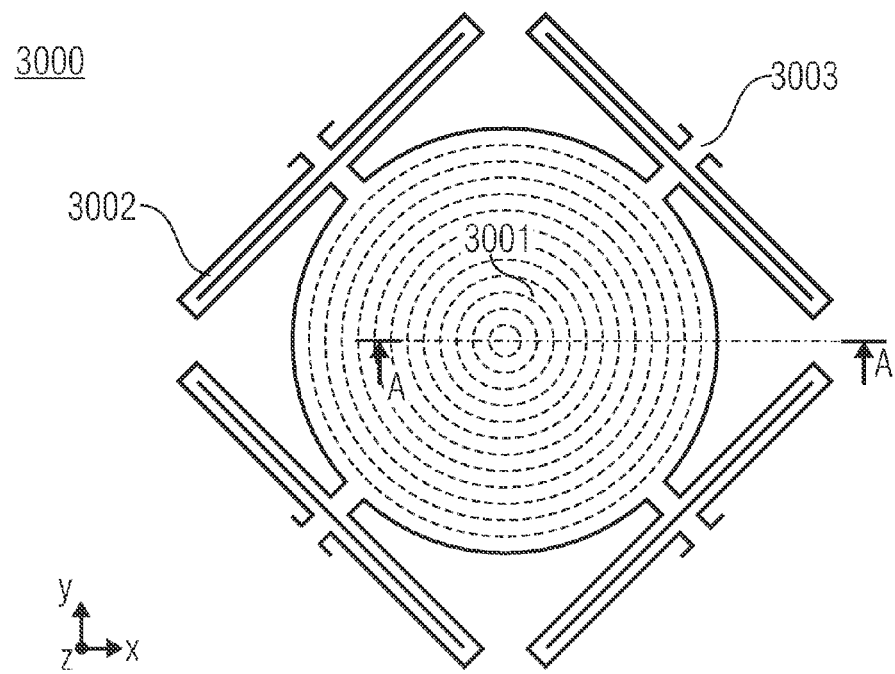
FIG. 25a is a top view of a micromechanical device according to a further embodiment in the form of a circular mirror plate connected to a stationary frame by four spring elements, with the option of actively bending the mirror plate, for example to obtain active focus variation.

In the embodiment of FIG. 25, for example, a micromechanical device similar to the one of the above-described embodiments is used to result in an actively bendable micromirror for active focus variation. A mirror plate having a round contour serves as the deformable element, which is suitably suspended, wherein on a rear of the same segments of an insulating spacer layer are formed in a circular manner and concentrically to one another and to the contour of the mirror plate, via which an electrode is fixed to the rear of the mirror plate. Analogously to the above-described embodiments, a lateral direction exists, namely the radial direction along which the spacer layer is structured and along which the mirror plate can be bent, depending on the implementation of the plate capacitor portions for positive or negative lateral contraction as a concave or collecting mirror or a convex mirror.

Figure 25B:
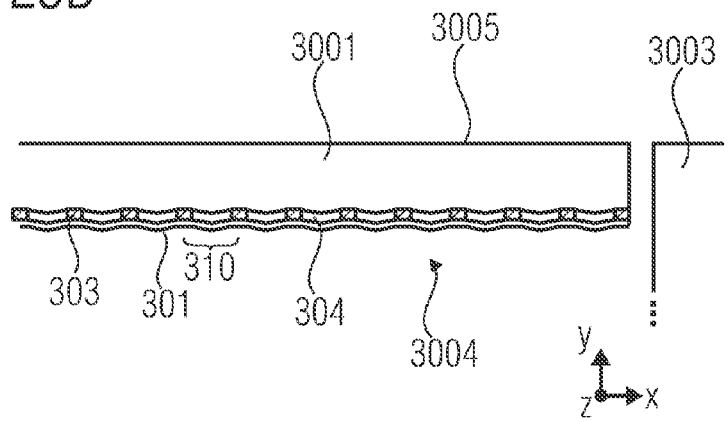
FIG. 25b is a side sectional view along the sectional plane A-A of FIG. 25a in the non-deflected state of the mirror plate.
Figure 25C:
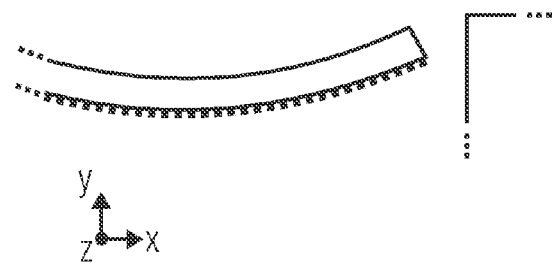
FIG. 25c is a side sectional view along the sectional plane A-A of FIG. 25a in the deflected state of the mirror plate.

FIG. 25 shows exemplarily an embodiment of an electrostatically actively bendable micromirror for active focus variation. In this figure, the thin black lines are open, etched trenches defining the geometry of the solid body (between the lines). The circular mirror plate 3001 is connected to a stationary frame 3003 via four elastic spring elements 3002. On the bottom side 3004 of the mirror plate, exemplarily the structure 1500 is mounted (see FIG. 25b). Applying an electric voltage between the two electrodes 301 and 3001 of the electrostatically deflectable structure effects a lateral compressive strain on the bottom side 3004 of the plate. As a consequence of the lateral compressive strain, the plate is bent in a bowl shape, which is shown in FIG. 25c. If the lateral geometries of the individual plate capacitor segments 310 are small compared to the overall measure of the plate 3001 and additionally equally distributed, an approximately homogenous radially acting surface compressive strain on the bottom 3004 of the plate 3001 can be assumed. Due to this homogenous surface strain, an approximately spherical deformation of the plate 3004 is obtained.

If a reflection layer is deposited on the surface 3005 of the plate, the structure 3000 can be used for active focus variation of light. Here, changing the focal length of the concave mirror is achieved by changing the electric voltage.

Possible extensions of the example of FIG. 25 are the following:

When structures generating lateral tensile strain by the electric voltage are used and are mounted on the bottom of the mirror plate 3001, the mirror plate experiences a helmet-shaped bend. The helmet-shaped bend might possibly also be used for active focus variation of light using a suitable optical system.

All inventive structures 1200 to 2100 can basically also be mounted on the top of the mirror plate. However, it is a disadvantage that these inventive structures (except 1200) have a surface topology due to the bent electrode segments 301. Depending on the used wavelength of the light to be focused, this surface topology can result in mostly undesirable deflection and scattering effects in the reflected light beam. Accordingly, if the structures are to be arranged on the surface of bendable mirror plates, it can be advantageous if a further planarization layer is deposited on the top electrode 301 in the structures 1300 to 2100. This can be performed, for example, by depositing a suitable thin layer and planarization using the method of chemical-mechanical polishing (CMP) known in microsystem technology.

It is also possible to generate local regions having compressive and tensile strain of different heights on top or below the mirror plate using a segmented arrangement of the structures 1200 to 2100 or by a segmentation of at least one of the electrodes 301 or 1201 and respective electric wiring. By this, the mirror plate is bent to different extents at different locations. With this principle, a micromirror is obtained for specific (not only purely defocusing) influencing of the wavefront of light (so-called adaptive optical mirror=AO mirror).

With reference to FIG. 26, an embodiment will be described below, according to which a micro tilting mirror for spatially deflecting light with the help of the above embodiments is obtained for a micromechanical device. In this embodiment, the deformable element forms a spring by which the mirror plate is suspended in a tiltable manner. Bending the spring element or the deformable element leads to the tilting.

Figure 26A:
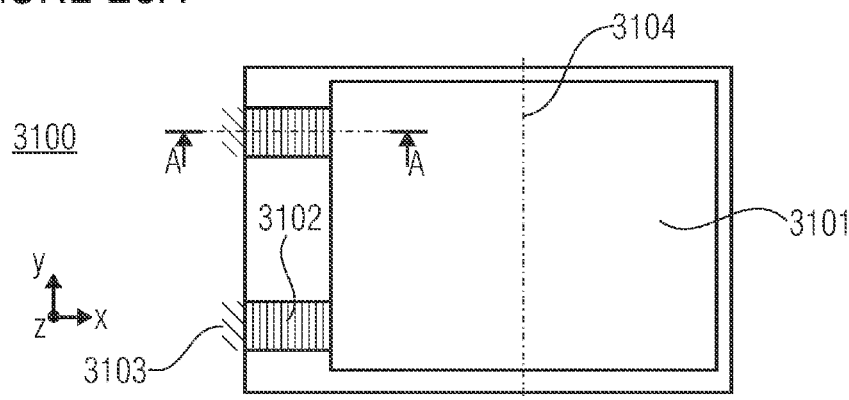
FIG. 26a is a schematic top view of a micromechanical device in the form of a rectangular mirror plate connected to a stationary frame by two beam-shaped spring elements which are also actively bendable, according to an embodiment.
Figure 26B:
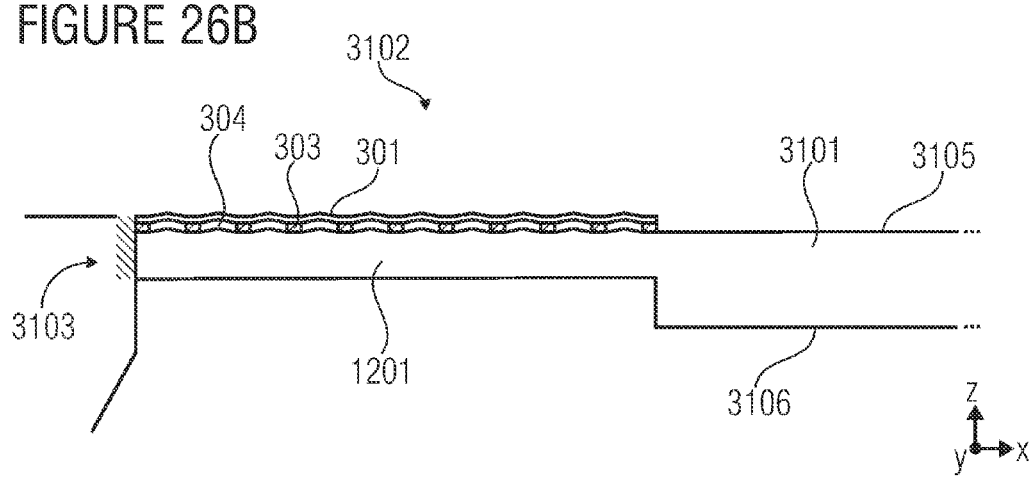
FIG. 26b is a schematic side sectional view along the sectional plane A-A of FIG. 26a in the non-deflected state.
Figure 26C:
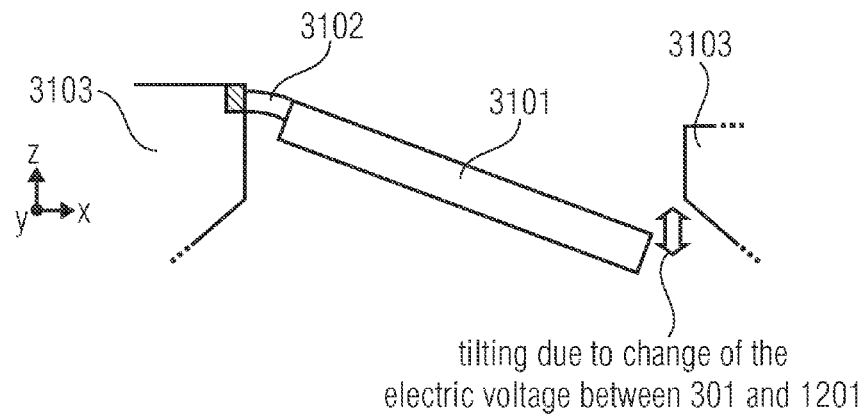
FIG. 26c is a schematic side sectional view along the sectional plane A-A of FIG. 26a in the deflected state.

The simple option for actively tilting plates using bimorph- or monomorph-deflectable beam structures is shown in FIGS. 26a-26c. Here, the (possibly rectangular) mirror plate 3101 is connected to a stationary frame 3103 via one or several beam-shaped spring elements 3102. Again, the forces of the electrostatic field of the structures 1200 to 2100 are used (here exemplarily the structure 1500). For this, the structures are mounted on, within or on the bottom of the beam-shaped spring elements 3102. The tensile or compressive strain generated by the electric voltages again results in an active bending of the spring elements 3102. As a consequence, the plate 3101 mounted on the spring element is tilted, as is shown in FIG. 26c. If this plate has a suitable mirroring layer on the top side 3105 and/or the bottom side 3106, the same can be used for spatially deviating light (e.g. one-dimensional light scan or beam positioning within a plane). Deflection of the mirror can be performed quasi-statically but also in a resonant oscillating manner.

The option of an electrostatically bimorph- or monomorph-tiltable mirror plate shown in FIG. 26 has the disadvantage that there is no central rotation axis. This means that the rotation axis of the tilting mirror does not coincide with a symmetry axis of the mirror plate 3104. The subsequent implementations of micro tilting mirrors for spatially deviating light have a central rotation axis.

It should further be noted that, as is shown in FIGS. 26b and 26c, the spring element or the deformable element has a reduced thickness compared to the mirror plate 3101, so that the mirror plate 3101 is stiffer and hence more resistant against deformation and, on the other hand, the spring element or the deformable element can be more easily deformed. However, this is not absolutely necessitated.

With the resonant drive, the voltage is applied between the electrode 301 and the deformable element 1201 in the form of an alternating voltage having a frequency that is defined in the range of the mechanical resonance frequency of the spring-mass system from the weight of the plate 3101, the spring and its restoring force in the form of the deformable elements 1201.

Figure 27:
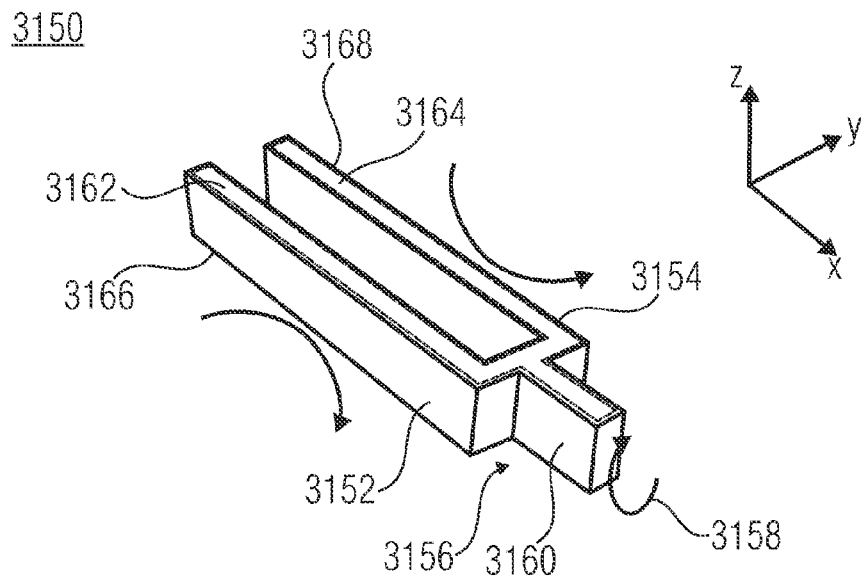
FIG. 27 is a schematic diagram for generating a torque using a parallel beam structure with bendable beams according to an embodiment.

A possible structure for generating the torque necessitated for tilting (mirror) plates using monomorph- or bimorph-deflectable parallel beam structures is shown in FIG. 27. Regarding the principle, here reference is also made to [18]. Here, a structure according to one of the above embodiments having actively adjustable material strain is deposited on each control circuit part 3152 and 3154 of the parallel beam structure 3150. If the extent of the actively adjustable material strains of the active layers of the beam is different (such as in FIG. 27, example 1, shown by different signs of the strain), a torque 3158 is generated at the joint 3156 of both beams.

In other words, FIG. 27 shows a parallel beam structure 3150 that can be used for suspending tiltable plates, such as paraxial to a mirror axis of the plate. The beam structure 3150 has two beams 3152 and 3154 arranged parallel to each other. At one end of these beams 3152 and 3154 along their extension direction, the same are connected to each other at a joint 3156, in order to be either connected to the structure to be tilted not shown in FIG. 27 via a common connecting beam 3160, or directly to the structure to be tilted. At the opposite ends, the beams 3152 and 3154 are firmly connected to the frame, which is also not shown in FIG. 27. On their top 3162 or 3164 and/or their bottom 3166 or 3168, i.e. on sides connecting the side areas of the beams 3152 and 3154 facing each other and facing away from each other, the beams 3152 and 3154 are provided with one of the above structures of segments of the insulating layer 303 and the electrode, so that one of the beams 3152 is bendable in the opposite z direction like the beam 3152 in FIG. 27, and the other one in the opposite direction, i.e. the z direction, in FIG. 27 the beam 3154, by applying a respective voltage. By mutually bending the beams, the torque 3158 results, and hence also a rotation of the suspended element, such as a mirror plate.

Figure 28:
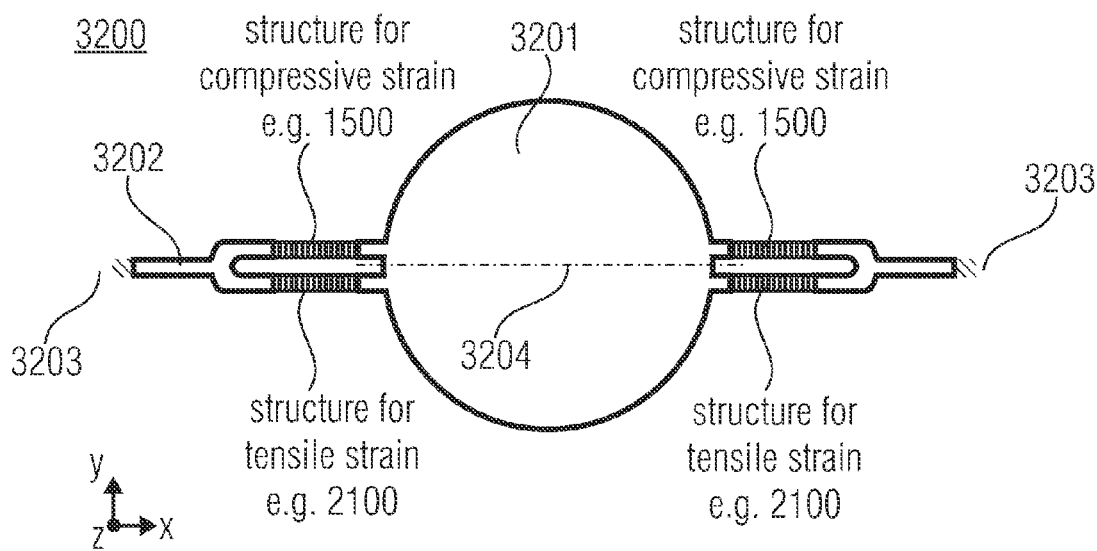
FIG. 28 is a schematic top view of a micromechanical device in the form of a circular mirror plate connected to a stationary frame by two Y-shaped spring elements which are themselves actively bendable, according to an embodiment.

With the parallel beam structures 3150 with structures 1200 to 2100 shown in FIG. 27, an actively deflectable tilting mirror as is shown in FIG. 28 can be realized. In the electrostatically deflectable tilting mirror of FIG. 28, the mirror plate 3201, which is, for example, circular, is connected to the stationary frame 3203 via two Y-shaped flexible parallel beam structures 3202 (=Y-shaped spring elements) corresponding to the structure 3156 in FIG. 27. Electrostatically, monomorph- or bimorph-deflectable plate capacitor drives are above, within and/or on the bottom side of each beam of the spring elements 3202. By changing the electric voltage, the mirror plate can be tilted out of the plane, wherein the tilting axis 3204 coincides with the central symmetry axis of the mirror plate 3205, wherein the mirror plate 3201 is suspended at opposite sides along this axis 3204 via the Y-shaped spring elements 3202.

Figure 29:
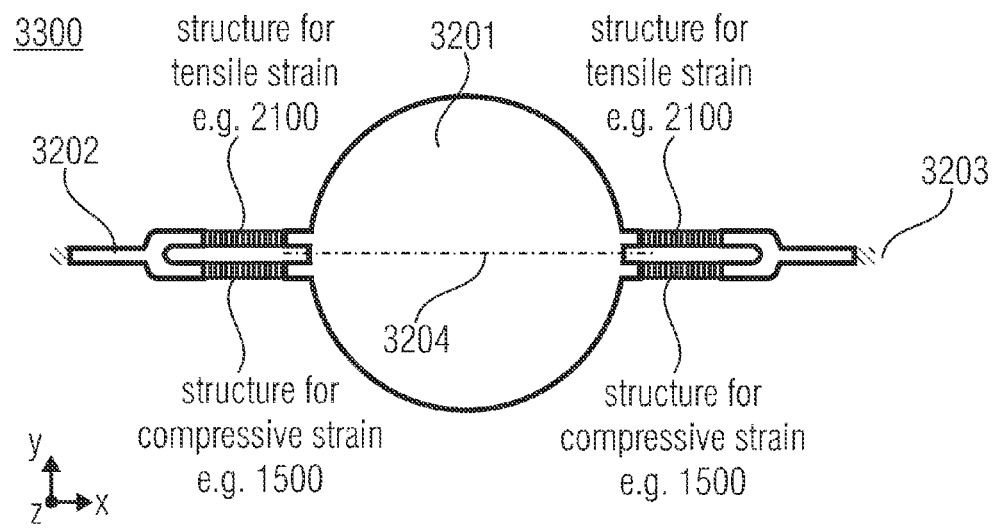
FIG. 29 is a schematic top view of a micromechanical device in the form of a circular mirror plate connected to a stationary frame by two Y-shaped spring elements which are themselves actively bendable, according to a further embodiment.
Figure 30:
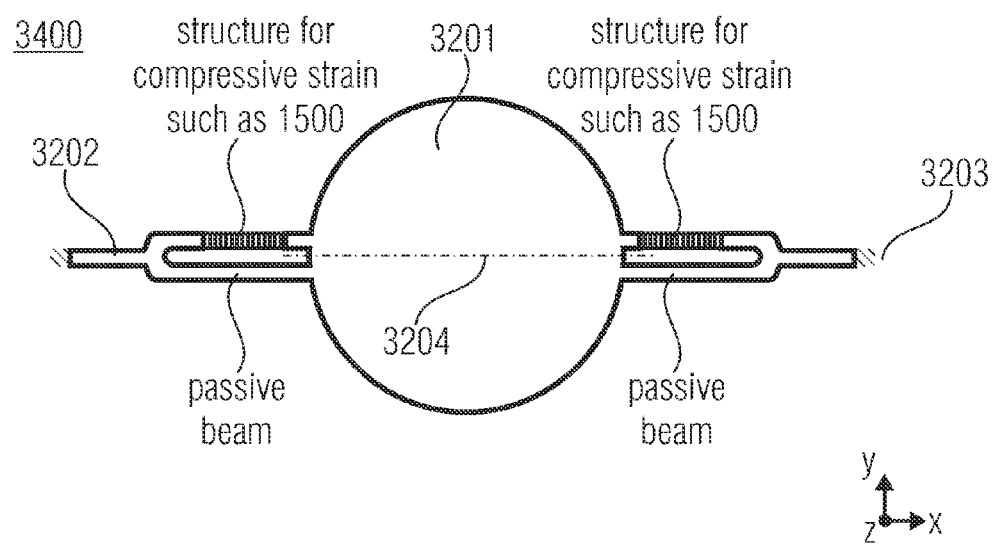
FIG. 30 is a schematic top view of a micromechanical device in the form of a circular mirror plate connected to a stationary frame by two Y-shaped spring elements which are themselves actively bendable, according to a further embodiment.
Figure 31:
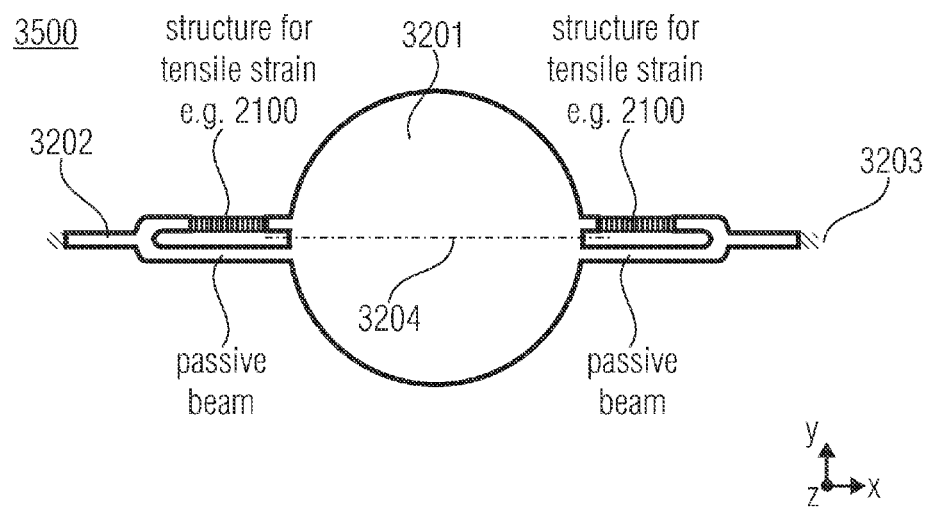
FIG. 31 is a schematic top view of a micromechanical device in the form of a circular mirror plate connected to a stationary frame by two Y-shaped spring elements which are themselves actively bendable, according to a further embodiment.

The example 3200 in FIG. 28 has two sub-actuator types generating tensile or compressive stress. Additionally, further combinations are possible: exchanging the inventive, electrostatically deflectable cantilevers 1200 to 2100 is possible, which is shown in FIG. 29. Additionally, it is also possible to use only one side of the Y-shaped suspension of the mirror plate, which is shown in FIGS. 30 and 31.

Additionally or alternatively, it is possible to provide the structures for compressive or tensile strain generation on the rear, i.e. on the side facing away from the mirror.

Figure 32:
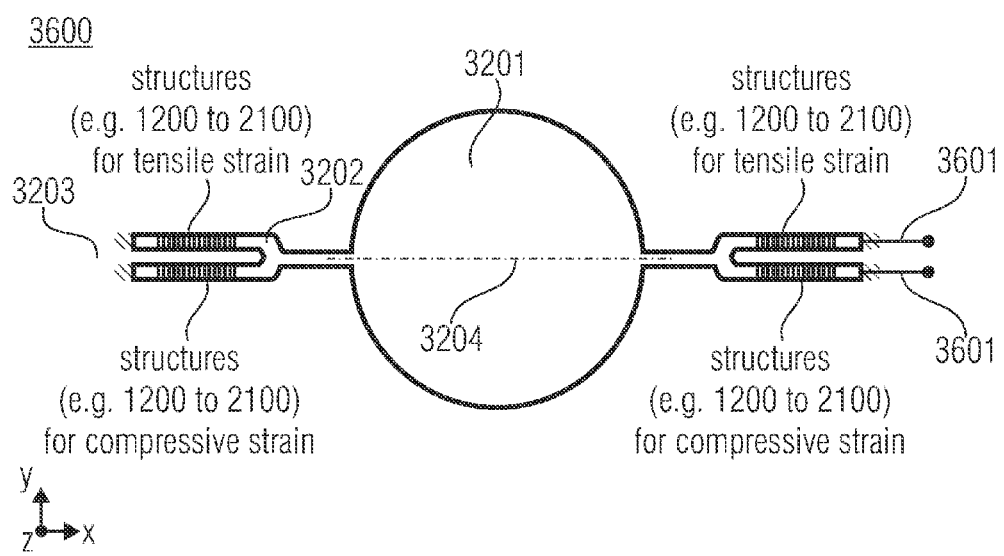
FIG. 32 is a schematic top view of a micromechanical device in the form of a circular mirror plate connected to a stationary frame by two Y-shaped spring elements which are themselves actively bendable, according to a further embodiment.

It can be useful to turn the Y-shaped suspension 3202 of the mirror plate shown in FIGS. 28-31 by 180°, so that electrically contacting the electrostatic actuators can be realized more easily. In FIG. 32, this is shown exemplarily for all the combinations 3200 to 3500 discussed above. Here, the electric wiring of the top electrodes 301 of the electrostatic drive can be realized by a conductive trace 3601 which is routed to the stationary frame via the beam structure. The second contact plane 1201 can be realized by a respective conductive substrate for all actuators together.

Figure 45:
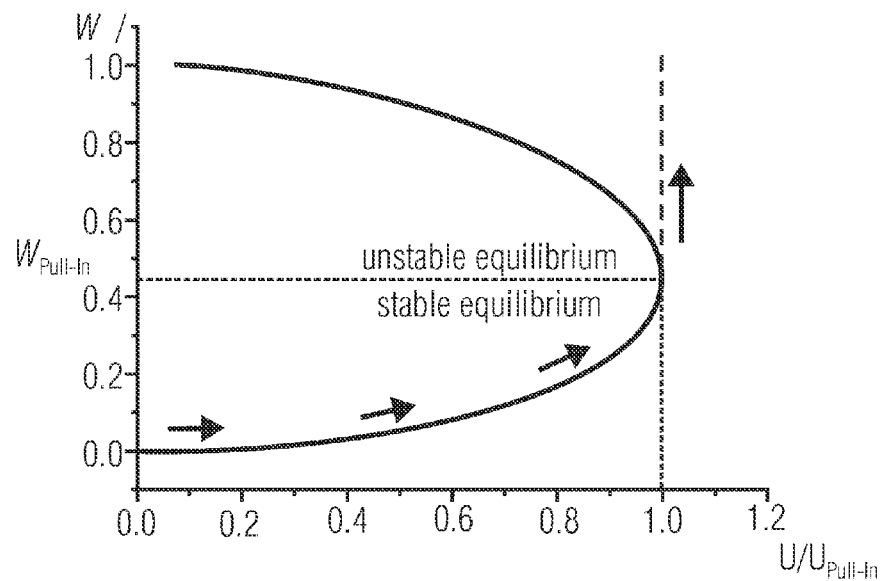
FIG. 45 is a graph showing the basic curve of the normalized deflection of a beam or a plate according to FIG. 44 in dependence on the normalized electric voltage.
Figure 46:
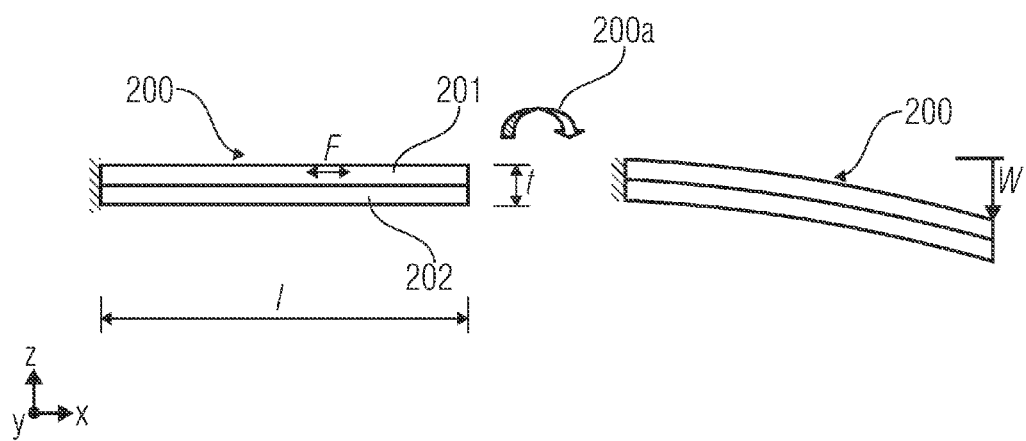
FIG. 46 is a schematic cross-sectional view of a cantilevered beam or a plate deflected by a lateral strain in at least one layer.

As was already shown with respect to FIG. 45, the maximum deflection with support in monomorph- or bimorph-deflected plates and beams is quadratically dependent on their structure length l. Large deflections can only be obtained with long beams. In the embodiments of electrostatically deflectable tilting mirrors presented above, the lateral spatial requirement is disadvantageous due to the necessitated lateral dimensions of parallel beam structures 3202. A micro tilting mirror having a more compact drive will be presented in the following section.

Figure 33:
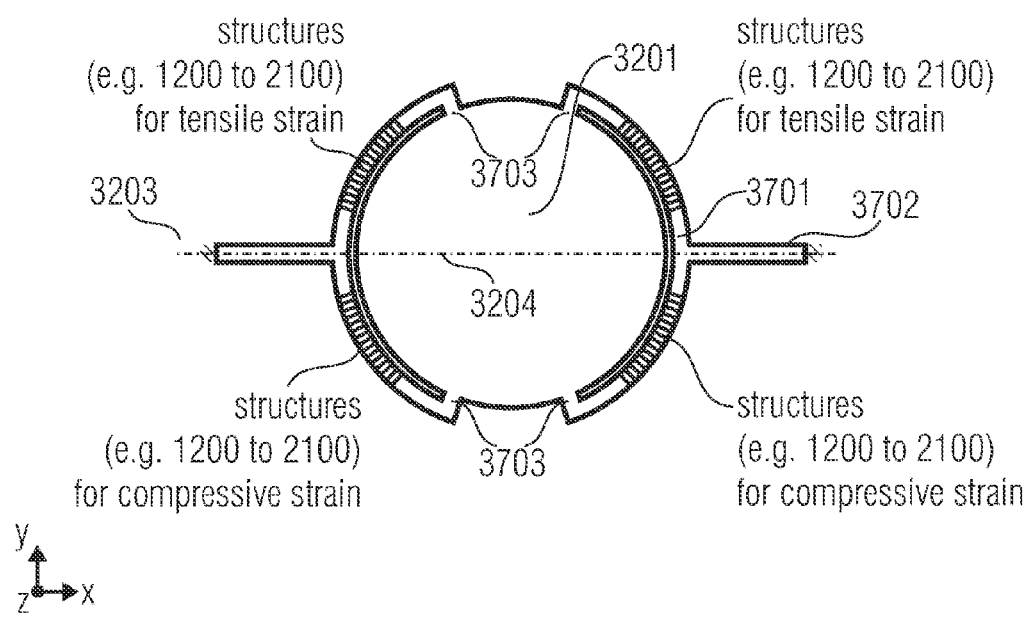
FIG. 33 is a schematic top view of a micromechanical device in the form of a circular mirror plate connected to a stationary frame by two Y-shaped spring elements which are themselves actively bendable, according to a further embodiment.

A possible embodiment for a micro tilting mirror for spatial deflection of light, where the electrostatic actuator components are placed on (in or below) sprint elements, which have an effect in a distributed manner at the edge of an exemplary round mirror plate, is shown in FIG. 33. This embodiment is known as "distributed springs". Placing actuator components on the distributed springs was already the subject matter of a patent application and is explained extensively in patent application DE 102008049647. Here, again, the electrostatically actively deflectable monomorph or bimorph beam structures 1200 to 2100 have been used for deflecting the mirror plate.

In the embodiment of FIG. 33, here an exemplary circular mirror plate 3201 is suspended via torsion springs running along the tilting and mirror axis 3204, wherein, however, the torsion springs 3702 do not immediately have an effect at points along the circumference of the mirror plate 3201, which lie on the tilting axis, but at points 3703 distant from the axis 3204 along the circumference. So-called distributed springs 3701, each implemented in a beam shape and formed according to an actively bendable structure according to one of the above embodiments of FIGS. 1-22, lead from the torsion springs 3702 to these points 3703 along the circumference. Simultaneously applying voltage to the structures effects tilting of the mirror 3201 around the axis 3204, when tensile strain generation structures are used on a lateral side and compressive strain generation structures on the other lateral side relative to the axis 3204 for the distributed springs 3701, as is shown in FIG. 33. Thus, the distributed springs 3701 lead in a beam shape along the circumference of the plate 3201 from the respective torsion spring 3702 extending along the axis 3204 to the points 3703 distant from the axis along the circumference of the plate 3201.

Figure 34:
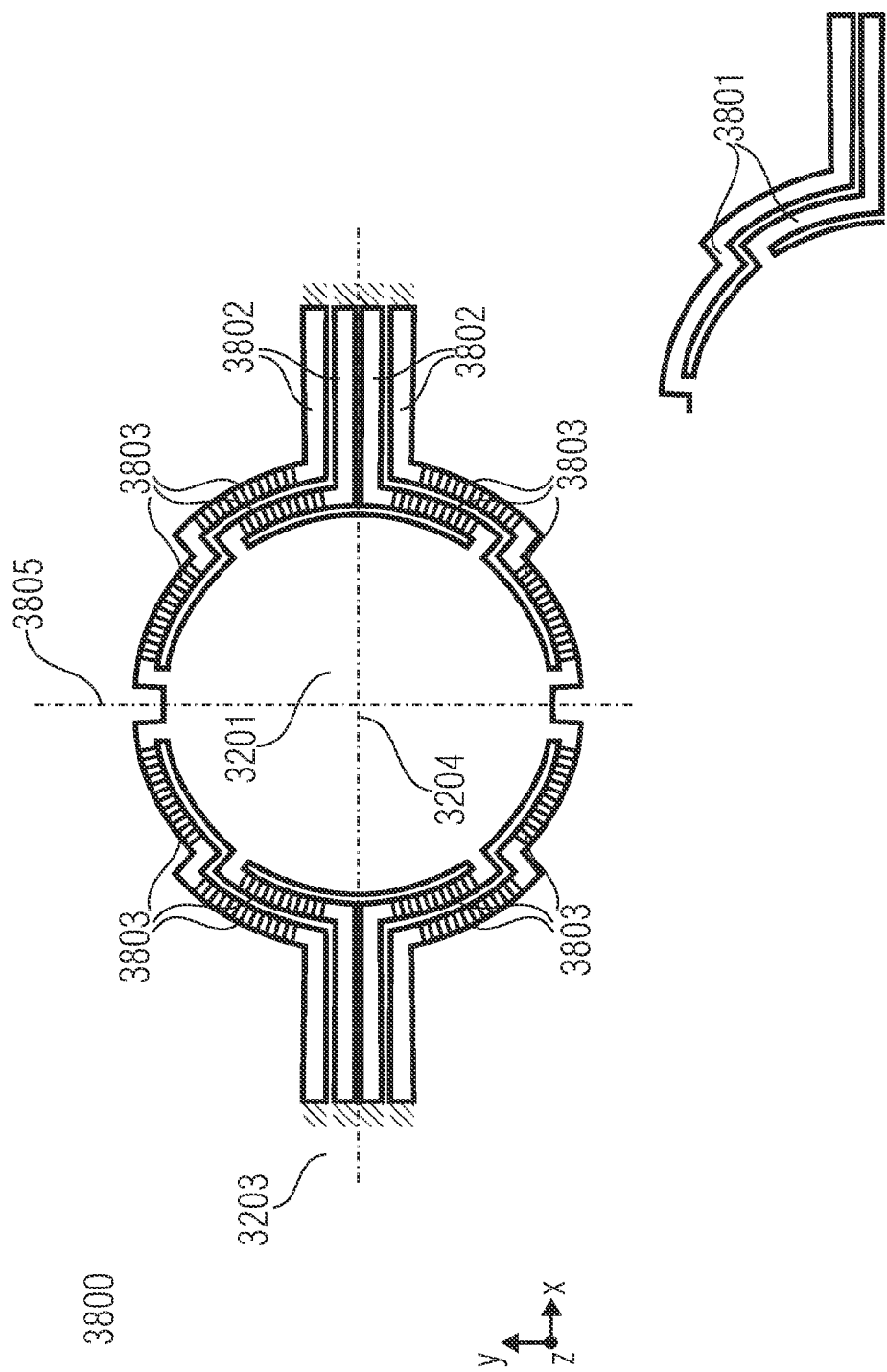
FIG. 34 is a schematic top view of a micromechanical device in the form of a circular mirror plate connected to a stationary frame by two Y-shaped spring elements which are themselves actively bendable, according to a further embodiment.
Figure 35:
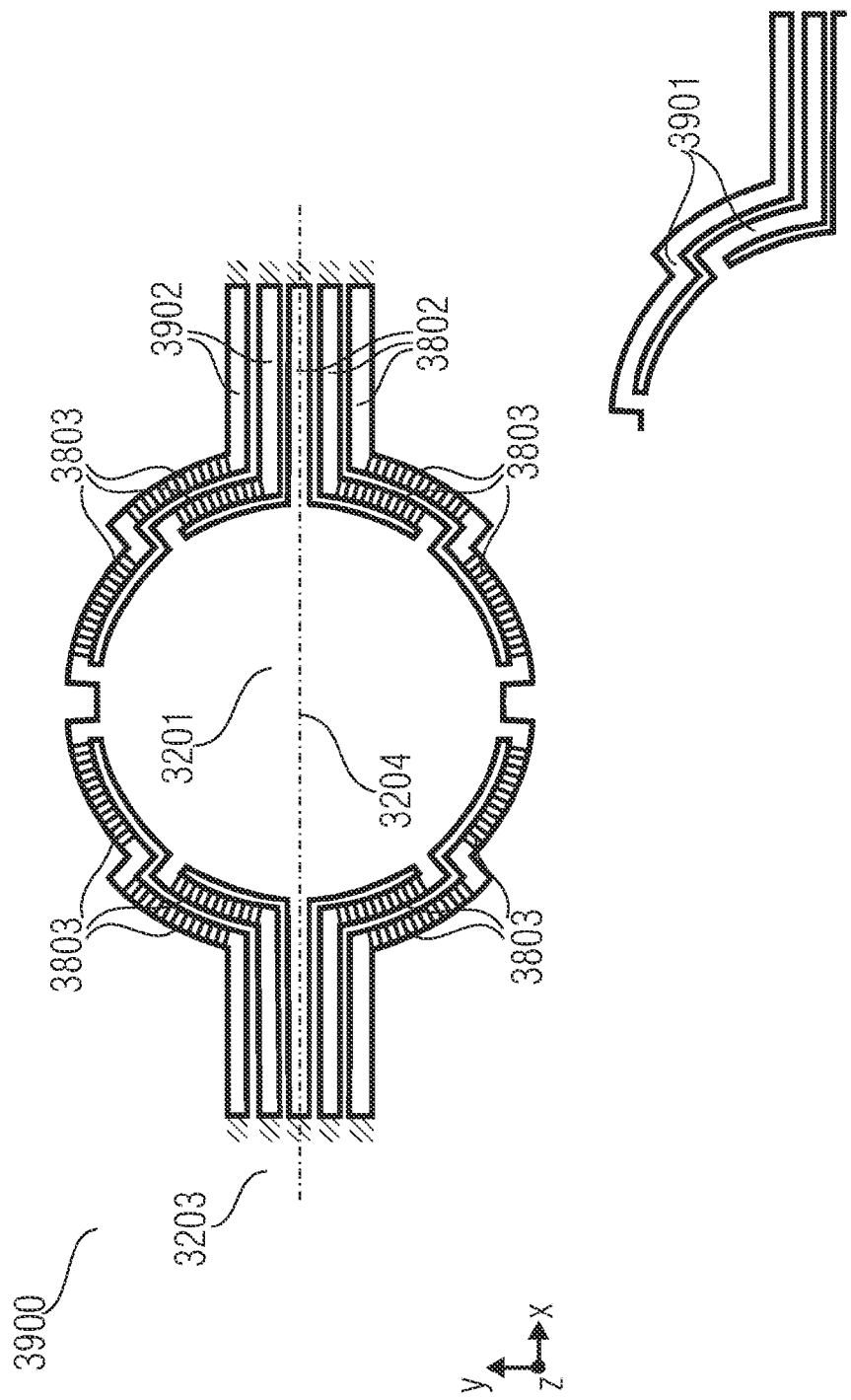
FIG. 35 is a schematic top view of a micromechanical device in the form of a circular mirror plate connected to a stationary frame by two Y-shaped spring elements which are themselves actively bendable, according to a further embodiment.

Two further embodiments of a circular mirror plate, where the electrostatic actuator components 3803 can be placed at at least one of 12 possible locations in or below the distributed springs 3801 or 3901 according to the above embodiments, are shown in FIG. 34 and FIG. 35.

The embodiments of FIGS. 34 and 35 show clearly that already in the embodiment of FIG. 33 the distributed springs do not have to originate from a common torsion axis, but that each distributed spring can have its own torsion axis. In the case of FIGS. 34 and 35, for example, the mirror plate 3201 is suspended mirror-symmetrically to an axis 3805 which runs perpendicular to the tilting axis 3204 and also represents a symmetry axis of the mirror plate 3201 via eight distributed springs 3803 which have an effect at eight different locations symmetrical to the tilting axis 3204 along the circumference of the mirror plate 3201 and extend along the circumference of the mirror plate 3201 from the locations of effect along the circumference of the mirror plate 3201 towards the tilting axis 3204 to extend from there via the torsion springs 3802 to the suspension 3203, wherein a respective torsion spring 3802 running parallel to the tilting axis 3204 is allocated to each distributed spring 3803. Thus, all in all, the eight distributed springs 3082 have twelve portions which can comprise structures for compressive strain or tensile strain generation according to one of the structures 1200-2100, and, as has already been mentioned, either on the front or the rear or both. The tilting principle in the embodiments of FIGS. 34 and 35 is otherwise the same as in the embodiments according to FIG. 33. For the distribution of possible drive structures according to 1200-2100 of the above embodiments onto the above-mentioned twelve possible portions of the distributed springs 3803 offers in particular the following combinations are advantageous:

Actuators for tensile strain are disposed above the torsion axis 3204 and actuators for compressive strain are arranged only below the torsion axis 3204.

As above, only tensile and compressive strain exchanged or arrangement turned by 180°.

Only actuators for tensile strain are arranged only above or only below the torsion axis 3204.

Only actuators for compressive strain are arranged only above or only below the torsion axis 3204.

In the following, examples of micro tilting and lifting mirrors are described. In particular, an embodiment of a tilting mirror is described which can be used simultaneously as a lowering mirror having a translation movement in the z direction or substrate thickness direction. Such a mirror is shown in FIG. 36.

Here, the exemplary rectangular mirror plate (3201) is mounted on two □-shaped spring elements 4001 and 4004. Up to 16 pieces of the inventive, electrostatically bimorph-deflectable structures (1200 to 2100) are on, in or below the □-shaped spring elements. An actively adjustable lateral strain in these structures has the effect of an S-shaped curvature of the beams of the □-shaped spring elements (see section A-A in FIG. 36b), whereupon the edge of the mirror plate experiences a deflection in the z direction. If a spring element (e.g. 4004) is deflected, the mirror plate will be tilted around its rotation axis 3204. An oscillating movement of this mirror plate can also be effected by alternatingly deflecting both spring elements 4001 and 4004. If both □-shaped spring elements are deflected simultaneously, the whole mirror plate is lifted. The plate can hence be used as a lifting mirror.

Figure 36A:
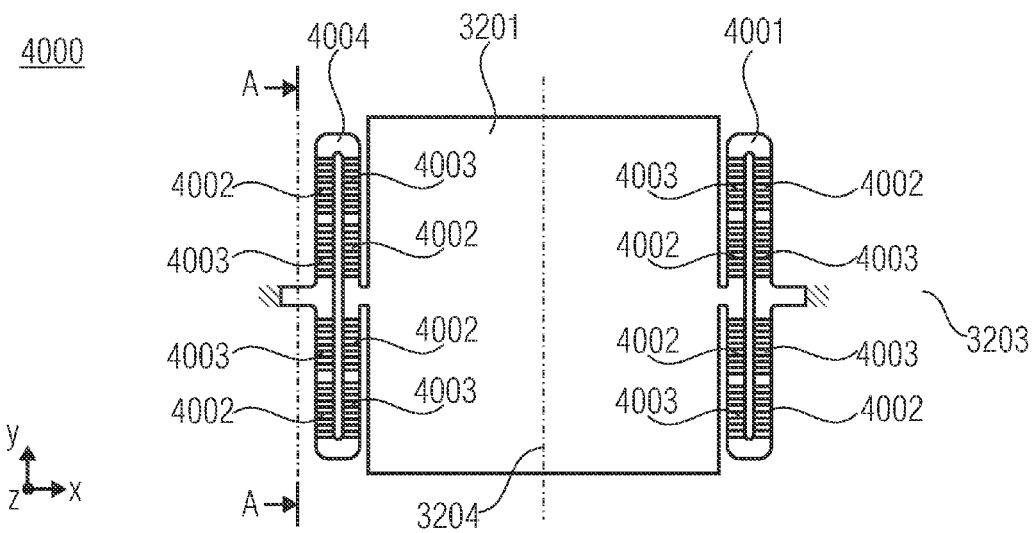
FIG. 36a is a schematic top view of a micromechanical device in the form of a rectangular mirror plate connected to a stationary frame via □-shaped springs, which are themselves provided with actively bendable portions, according to an embodiment for tilting and translation of the mirror plate.
Figure 36B:
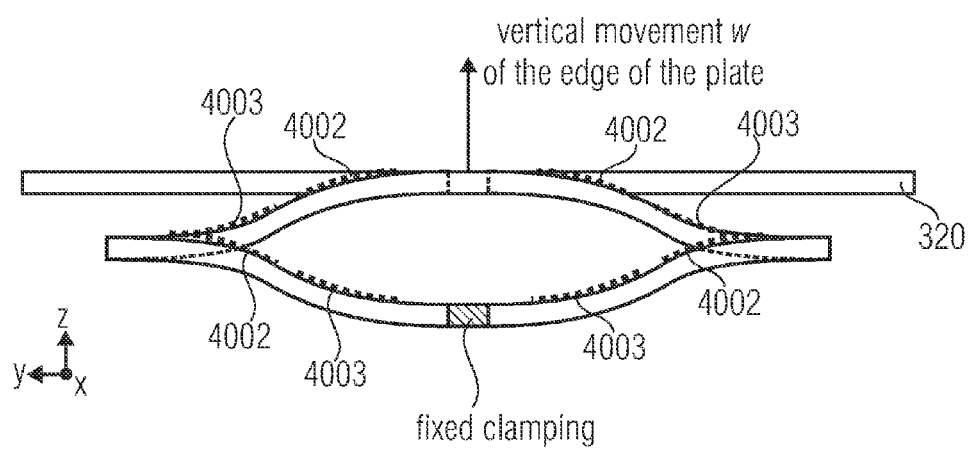

In other words, the embodiment of FIG. 36 shows a mirror plate 3201 suspended at opposite sides along the circumference of the same, via □-shaped spring elements 4001 and 4004. Each □-shaped spring element 4001 and 4002 has two halves, each comprising U-shaped spring portions facing each other with the open side of the U. The two halves are connected to the mirror plate 3201 and the suspension 3203 at the open ends of the Us. Deflecting the mirror plate 3201 from its resting position at the point at which a respective spring element is connected to the edge of the mirror plate 3201 causes a curvature of the U-shaped halves of the spring elements, as is illustrated in FIG. 36*b*. At each U-shaped half 4005, four sequentially arranged portions result from the connecting point 4006 along the edge of the plate 3201 to the suspension location 3203, which alternately experience opposite curvatures or curvatures in opposite directions, as can be seen in FIG. 36*b*. Two of these four portions are at a leg 4007 of the U-shaped halves 4005 and the other two at the other leg 4008 of the U-shaped half 4005. As already mentioned above, the legs 4007 and 4008 are connected to one another in the closed section of the Us via a connecting section 4009. Due to the opposite bends, structures for generating opposite tensions, namely compressive and tensile tensions provided with different reference numbers in FIG. 36, namely with the reference number 4002 for structures for generating compressive strain and 4003 for structures for generating tensile strain are arranged alternately along the four portions. In this way, the mirror plate 3201 is suspended via a total of four such U-shaped halves 4005, two of which respectively form one of the spring elements 4001 and 4004.

Again in other words, FIG. 36 shows a rectangular mirror plate 3201 connected to a stationary frame 3203 via □-shaped springs 4001 and 4004, wherein in FIG. 36 again exemplarily the bending structures are placed on the □-shaped springs at the above-mentioned 16 possible locations.

If the electrostatic drive elements 4002 and 4003 on one of the □-shaped spring elements are interchanged, the edge of the mirror plate is moved in the negative z direction. This is shown exemplarily in FIG. 37 for the spring element 4001. With this arrangement, the mirror plate experiences tilting around the rotating axis 3204 when the electrostatic drives of both spring elements 4001 and 4004 are used or controlled simultaneously. The tilting angle is approximately twice as large compared to the arrangement in FIG. 26 with the same drive voltage of the electrostatic drives. A lifting movement of the mirror plate is, however, no longer possible with this arrangement.

Figure 37:
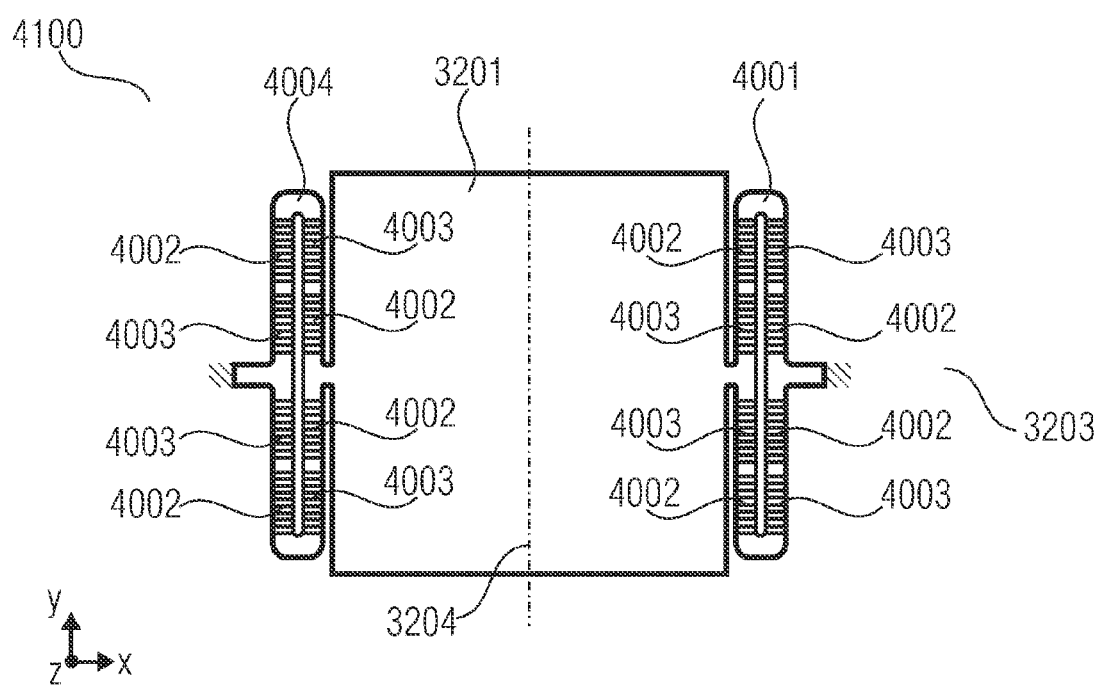
FIG. 37 is a schematic top view of a micromechanical device in the form of a rectangular mirror plate connected to a stationary frame via □-shaped springs, which are themselves provided with actively bendable portions, according to a further embodiment for tilting the mirror plate.

The embodiments of micro tilting mirrors presented in FIGS. 36 and 37 can also be extended for spatial two-dimensional deviation of light. For this, the assembly shown in FIG. 38 can be used. In this example, the mirror plate 3201 has been connected to the stationary frame via four □-shaped spring elements (4001, 4004, 4201 and 4202). Depending on the deflection of the □-shaped individual spring elements, the mirror plate can be tilted around both torsion axes 3204 and 4203. Simultaneous tilting around both axes (for beam positioning within a plane) but also a lifting movement (as a phase-shifting optical element) of the mirror plate due to the simultaneous deflection of all □-shaped spring elements is also possible.

Figure 39:
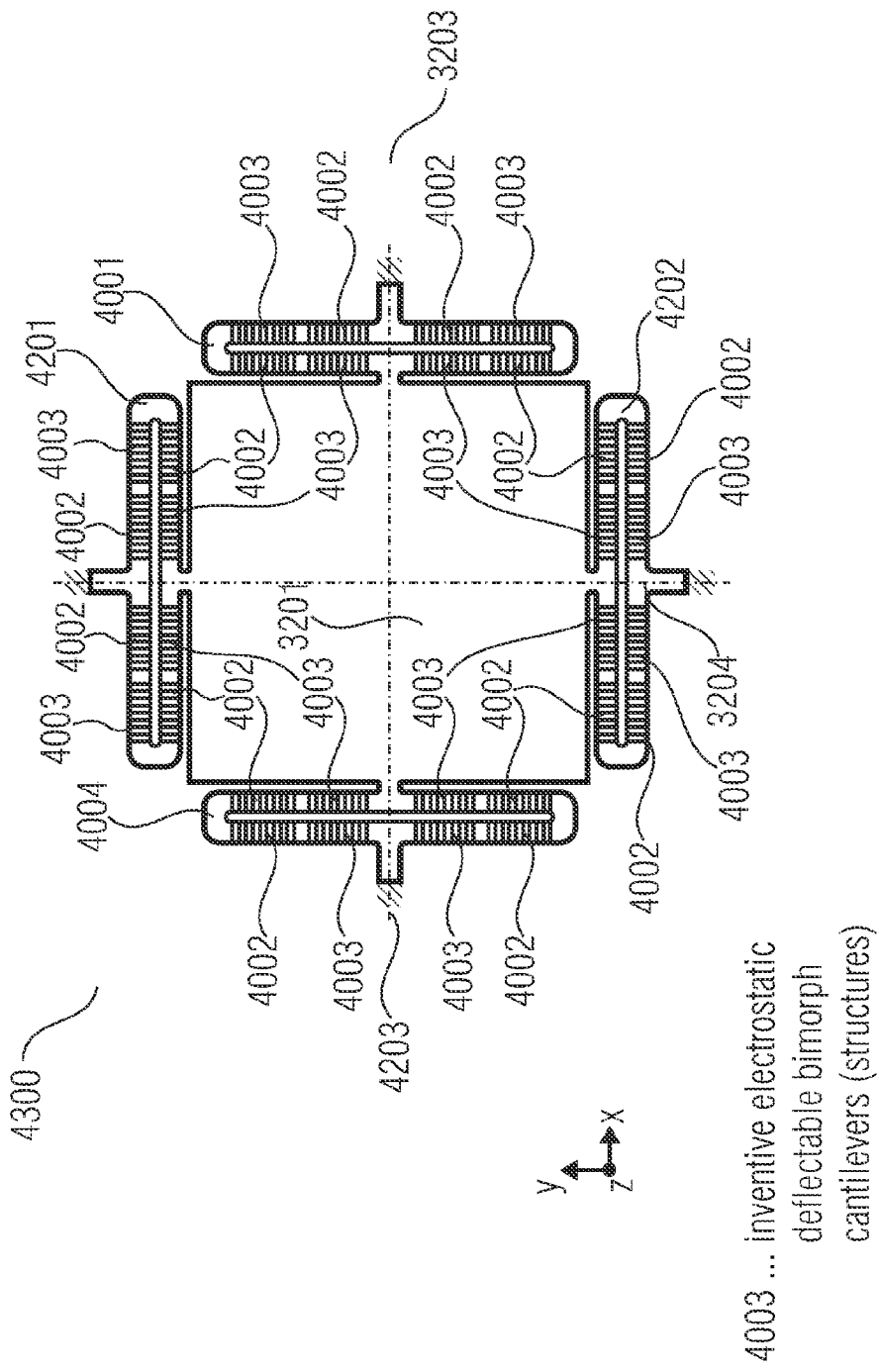
FIG. 39 is a schematic top view of a micromechanical device in the form of a rectangular mirror plate connected to a stationary frame via □-shaped springs, which are themselves provided with actively bendable portions, according to a further embodiment for tilting and translation of the mirror plate.

Analogously to the above-discussed exchange of electrostatic actuator components, here almost doubling the titling angle is possible. This is illustrated in FIG. 39.

Figure 38:
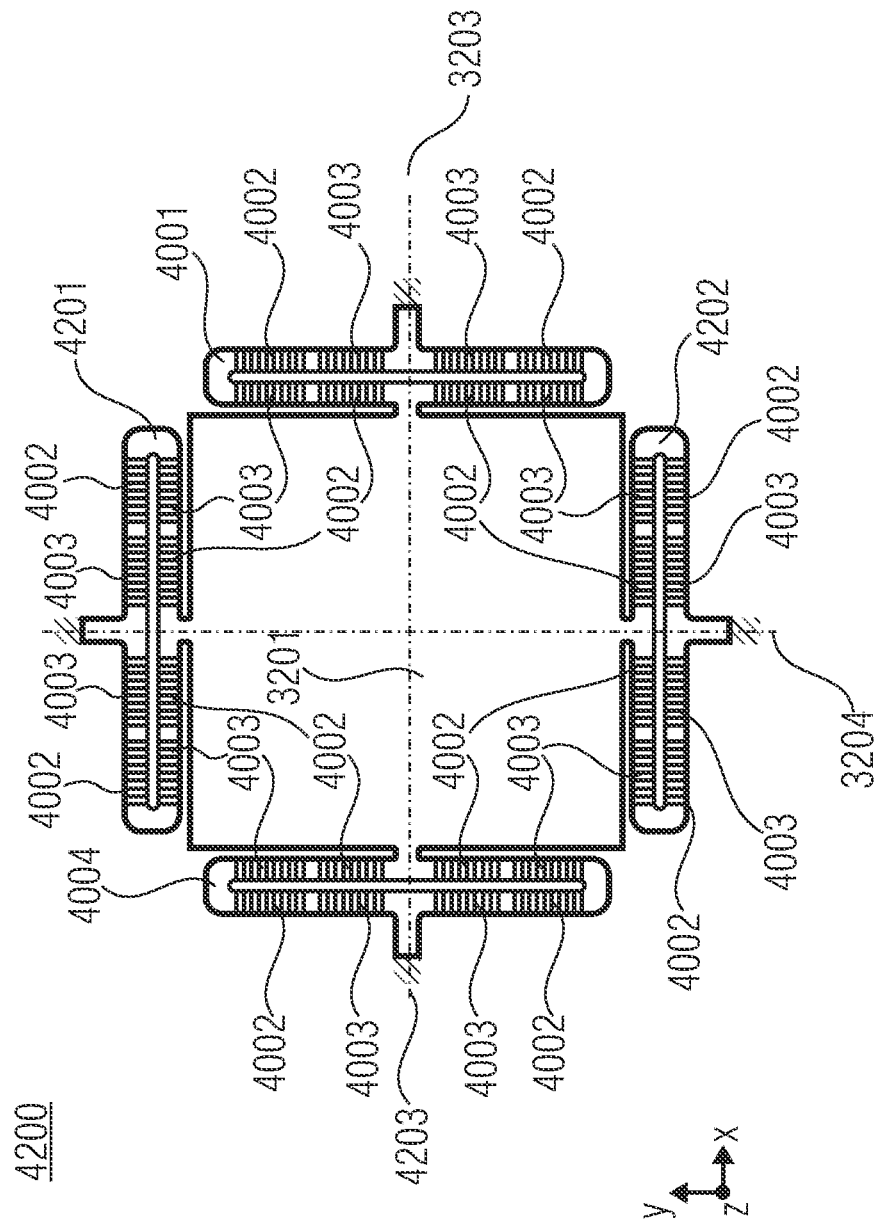
FIG. 38 is a schematic top view of a micromechanical device in the form of a rectangular mirror plate connected to a stationary frame via □-shaped springs, which are themselves provided with actively bendable portions, according to a further embodiment for tilting and translation of the mirror plate.

As in FIGS. 36 and 37, the different reference numerals 4002 and 4003 in FIG. 38 are also to indicate the structures generating different tensile or compressive stresses, namely reference numeral 4002 for structures generating compressive strain and reference numeral 4003 for structures generating tensile strain.

Thus, FIGS. 38 and 309 each show a rectangular mirror plate 3201 connected to a stationary frame 4203 via four □-shaped springs 4001, 4004, 4201 and 4202, wherein here exemplarily additionally to the □-shaped springs the tensile or compressive strain-generating structures 4002 and 4003 are placed at the 32 locations possible here.

Figure 40:
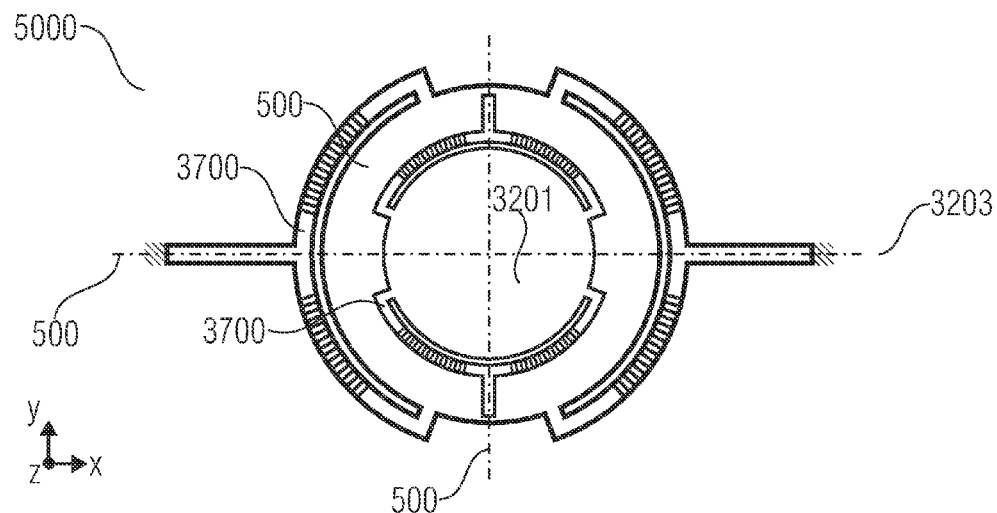
FIG. 40 is a schematic top view of a micromechanical device according to an embodiment in the form of a gimbally suspended 2D tilted mirror assembly, where the inner mirror plate is connected to a stationary frame via a movable frame, and the inner mirror plate is able to perform a tilting movement around an axis and the movable frame a tilting movement around an axis arranged rectangular thereto.

The last described embodiments for drive principles, base elements and also production technologies or substrate can also be combined. A possible combination is, for example, the arrangement of two tiltable mirror plates gimbal-suspended to each other to allow two-dimensional deviation of light. In the example of FIG. 40, exemplarily, the basic structure 3700 was used here twice. Basically, all tilting mirrors described above can be used, wherein with the help of the gimbal suspension the same can be combined in order to be used as a 2D tilting mirror.

Figure 41:
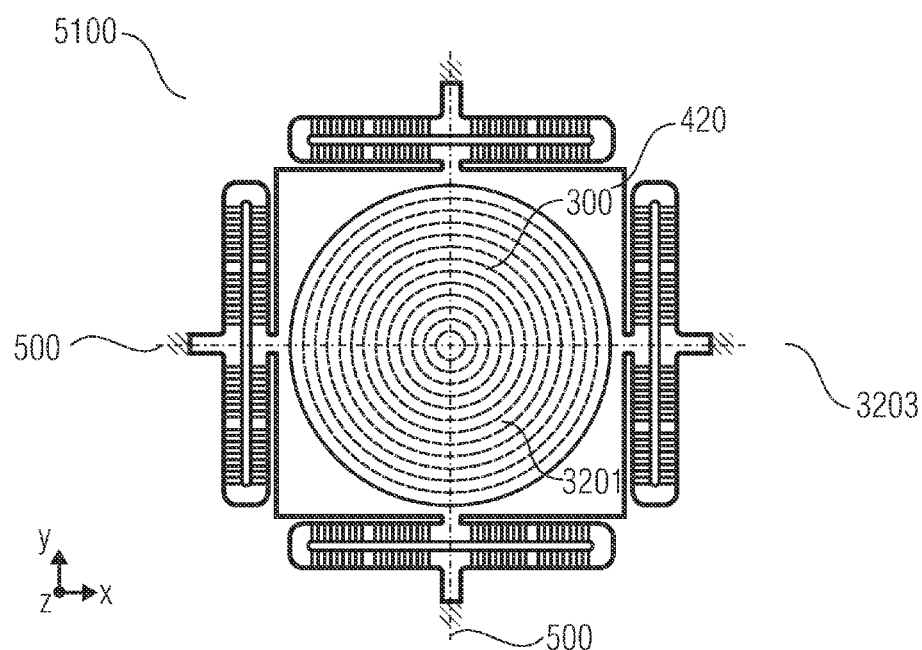
FIG. 41 is a schematic top view of a micromechanical device according to an embodiment in the form of an actively bendable mirror plate with 2D tiltability.

A combination of a focusing mirror with a bendable mirror plate as described with reference to FIG. 25 can also be combined with the tilting mirrors described above or also with the arrangements 4000 or 4200 that can be used as lifting mirrors. An exemplary combination assembly is shown in FIG. 41.

In particular, FIG. 40 shows a gimbal-suspended 2D tilting mirror assembly wherein the inner mirror plate 3201 is connected to the stationary frame 3203 via a movable frame 5003. The inner mirror plate 3201 can effect a tilting movement around the axis 5002 and the moving frame a tilting movement around the axis 5001. FIG. 41 shows a combination of an electrostatically actively bendable mirror plate 3201 for beam focusing 3000 and the 2D tilting mirror assembly 4200.

Figure 42:
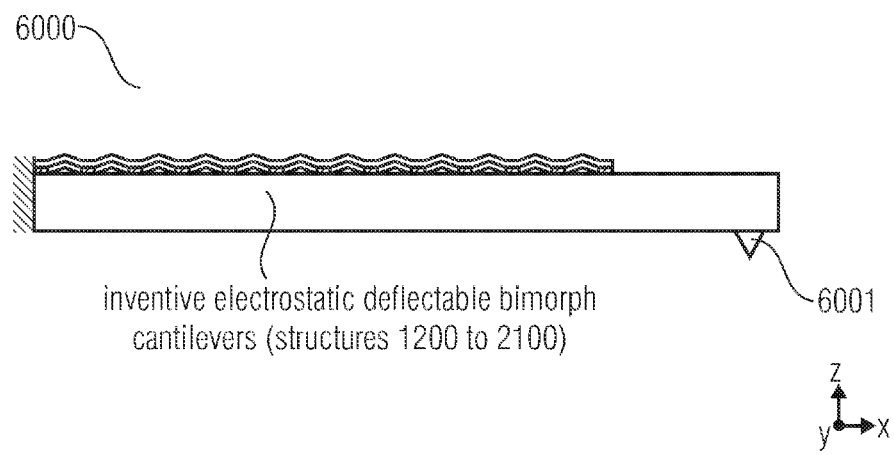
FIG. 42 is a schematic cross-sectional view of a micromechanical device according to an embodiment in the form of an AFM cantilever for AFM with dynamic excitation or a non-contact mode or an intermitting mode.
Figure 43:
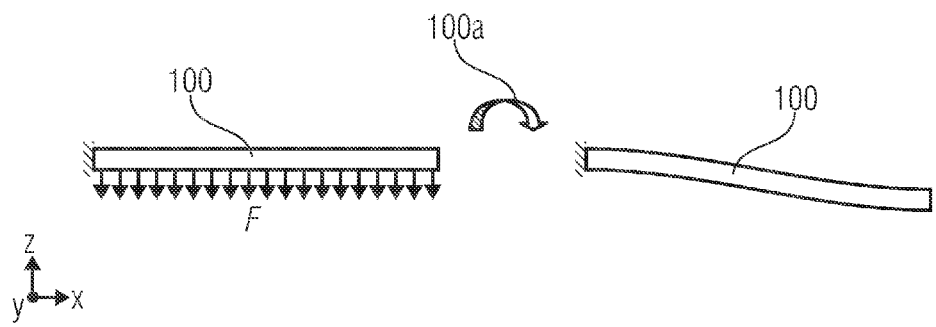
FIG. 43 is a schematic cross-sectional view of a cantilevered beam or a plate deflected by a vertically effective force.
Figure 44:
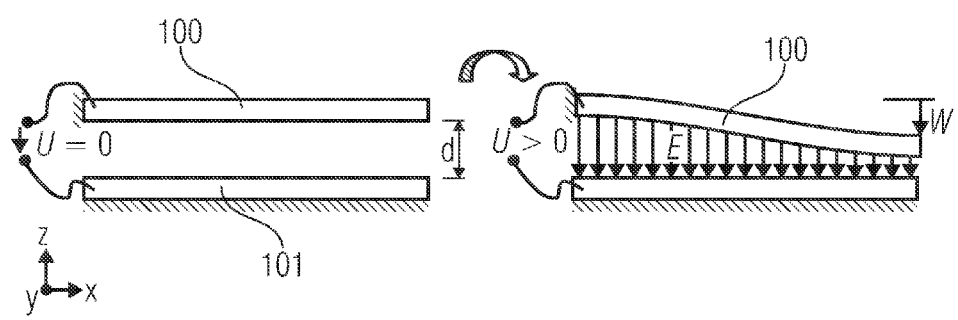
FIG. 44 is a schematic cross-sectional view of a cantilevered beam or a plate deflected by the force of an electrostatic field.

For atomic force microscopy (AFM), commonly thin beams (leaf springs) having a measuring tip are used for material analysis (surface roughness, domains having the same electric polarization). For these measurement methods, measurement modes exist in which the cantilever having the measuring tip is actively deflected or operated in a resonant oscillating mode. Deflecting the beam can also be performed by the above-described electrostatically monomorph- or bimorph-deflectable cantilevers. FIG. 42 shows an option for using the electrostatically deflectable cantilevers for atomic force microscopy. In this example, exemplarily the structure 1500 is supplemented by the measuring tip 6001 necessitated for AFM.

Finally, FIG. 42 shows an embodiment illustrating that the above-described embodiments can also be used for atomic force microscopy, namely as AFM cantilevers (cantilever=cantilevered beam).

Thus, the above embodiments show, among other things, an electrostatically deflectable micromechanical member wherein an electrode 301 is arranged at a small distance 304 above a beam or a plate 1201, in order to be able to actively bend the beam or the plate 1201 by laterally acting tensile or compressive forces, wherein the low electrode gap 304 is produced by an insulating material layer 303. The electrodes of the electrostatic drive can be laterally divided into several segments by laterally structuring the insulating layer 303. Lateral structuring can be embodied evenly, so that laterally acting and approximately constant tensile or compressive strain results from the laterally acting tensile or compressive forces. The electrode 301 and the insulating material layer 303 can also be arranged within or below or above and below the beam or plate 1201 to be actively bent. The electrode 301 can be arranged in a tilted manner with respect to the plane, as was the case in the embodiments for a device 1400 and 1900. The surface of the beam or the plate 1201 can also be tapered by respective structuring, wherein reference is made to the embodiments 1500, 1800, 2000 and 2100. The tilting angle is, for example, in a range between 50° and 60° and is, for example, in particular 54.7°.

The electrode 301 and/or the surface of the beam or the plate 1201 can also be implemented in a vertically wave-like shape, wherein reference is made to embodiments 1600 and 1700. The wave-like cross-section can be implemented to be sinusoidal, spherical or oval. However, the cross-section can also correspond to any function or can be described by any free form.

The electrode 301 and the insulating materials layer 303 can also be arranged in several sheets stacked upon each other on, within and/or below the beam or the plate 1201. In multiple actuators, the individual segments can be arranged offset to each other by half a structure.

Additionally, it is possible for the insulating material layer 303 to be also a sacrificial layer producing the gap of the electrode 301 by sacrificial layer etching. The gap between the electrode 301 and the beam or plate 1201 is, for example, between 100 nm and 5 µm.

The beam or the plate 1201 or the electrode 301 can be produced of a conductive material, for example a doped, single crystalline, amorphous or polycrystalline silicon, germanium, silicon germanium, silicon carbide or gallium arsenide. However, they can also consist of aluminum or an aluminum alloy, such as AlMgSi, AlTiSi, AlSiCu, of titanium, titanium aluminide or a titanium alloy.

The insulating layer 303 can again be formed of silicon oxide, silicon nitride, aluminum oxide, aluminum nitride, titanium oxide or titanium nitride.

On the surfaces of the electrodes 301 and 1201 facing each other, an additional electrically insulating, i.e. the electric layer, can be deposited to prevent or reduce the electric breakdowns caused by the possible field emission effects or to prevent, at a possible pull-in of the top electrode 301, the device from being irreversibly damaged. Here, the dielectric layer can consist of silicon oxide, silicon nitride, aluminum oxide, aluminum nitride, titanium oxide or titanium nitride. The gap 304 between the electrodes 301 and 1201 can be filled with a soft material, such as a polymer, a liquid or any gas or vacuum.

The electrostatically bendable beam or the electrostatically bendable plate can be used for deflecting microstructures, such as:

i. for tilting mirrors, lifting or lowering mirrors (=translation mirrors), but also for tilting mirror and lowering mirror arrays,
ii. for focusing mirrors, but also for any deformable mirrors for wavefront correction,
iii. for active compensation of the bending of mirror plates generated by intrinsic material tensions within tilting, lifting or lowering mirrors (+arrays),
iv. for actively adjustable lenses or lens arrays,
v. for dynamic excitation of leaf springs within an atomic force microscope assembly,
vi. for variable electric capacities (MEMS Varicap or MEMS Varactor) or for electric switches,
vii. for usage within a micromirror array in an active back plane (here: electro-optical circuit for addressing or selecting individual information channels),
viii. for acceleration or rotational speed sensors.

Generally, usage for micro positioning is possible.

Using the structures as a sensor detecting a bending state or deflection of a micro device by changing the electric capacitance between electrodes 301 and 1201 is also possible, in addition or as an alternative to the usage as an actuator.

However, the structure can also be used as a generator converting motion energy into electric energy, i.e. for so-called energy harvesting: for this purpose, a ground or a plate can be mounted on the beam, which is deflected by external motion energy or by airflow. Thereupon, the beam is bent, whereby the electrode gap 304 and hence the electric capacitance changes. At a deflected constant electric voltage between electrodes 301 and 1201, a current flow results due to the change of capacitance. Thereby, the electric energy can be tapped or can be used for supplying autonomous systems, for example.

However, the above structures can also be used for an actuator as an integrated element for mounting microelements, such as optical fibers, micromirrors and microlenses, mounted to the chip via hinges and used for setting, adjusting or positioning the microelements after singulation and mounting and connection technology.

The usage of such actuators can also provide that the same are used as cantilevered structures, without silicon chip or handling or carrier substrate, such as within mechatronic applications, such as for fine positioning.

The excitatory movement of the beam or plate can take place quasi-statically or in a resonant manner.

Combining or integrating the microactuators with an electronic circuit for their control can result in a respective system that can fulfill respective functions.

As described above, for example with reference to FIGS. 22-24b, it is also possible for the assembly to be structured in a vertical manner, i.e. by placing the actuators above or below the neutral fiber of the microstructure to be deflected. The usage of such a lateral deflectable structure is, for example, for:

i. an optical aperture, such as an iris aperture, an optical shutter or an aperture or shutter array,
ii. a shutter array used within transmissive displays,
iii. the drive of a gear or a linear drive (actuator).

A combination of the above microstructures would also be possible, so that a microstructure, such as a beam, can be deflected in a vertical direction, but also within a plane, wherein the usage of such a structure could be intended for three-dimensional positioning, such as as a micro gripper or for lateral positioning and at the same time for a vertical deflection of a beam with a measuring tip for atomic force microscopy, i.e. AFM with dynamic excitation.

On the other hand, some of the above embodiments also showed an electrostatically deflectable focusing mirror 3000, wherein an electrode 301, which is deposited at a low gap 304 in an electrically insulating manner by a laterally structured insulation layer 303 is on, in or below the conductive mirror plate 3001, and wherein the mirror plate is bent when an electric control voltage is applied. Generally, the same variation options result as described above in summary for the microdevice. The mirror plate can experience an approximately spherical or parabolic bend, for example to collect light at a central focal point. The mirror plate can also have a rectangular, circular, elliptical or any, such as a polygon-like, free form. The mirror plate can be connected to a stationary frame 3003 at one or at several points at the plate edge by suitable spring elements 3002. An additional planarization layer can be provided for the case that the electrodes 301 and 1201 are deposited on the front of the mirror plate and have a significant topology, such as bent electrodes. Chemical-mechanical polishing (CMP) can be used to level the deposited planarization layer. Such a focusing mirror can be used to specifically correct or arbitrarily deform or influence a beam profile. Thereby, electric segmentation of at least one of the two electrodes 301 or 1201 can be provided to be able to bend individual areas of the mirror plate to a locally different extent by several electrically separate control voltages. Such a device could be used as an adaptive optical mirror for specifically influencing the phase front of light waves.

Generally, such a focusing mirror 3000 can be used for
i. focusing laser beams when cutting, marking and welding materials,
ii. tracking the focus length in laser-based barcode scanners,
iii. zoom and focus applications in image-capturing and imaging systems, such as projectors, photo cameras, confocal microscopes and in optical coherence tomography and
iv. reading out multilayered optical data carriers,
v. concave mirror arrays within transmissive displays (in telescopic pixel displays).

Some of the above embodiments described electrostatically deflectable tilting mirrors 3100 to 3900 wherein the mirror plate 3101 or 3201 is mounted on at least one beam 3102, 3202, 3701, 3801 or 3901, wherein an electrode 301 is on, in or below this beam, which is mounted at a low distance 304 by a laterally structured insulating layer 303 in an electrically insulating manner, and the mirror plate is tilted when an electric control voltage is applied. Again, the variation options can be applied which have been described above with respect to the microdevice. The mirror plate can have a rectangular, circular, elliptical or any, such as a polygon-like, free form. The mirror plate 3201 can be connected to the stationary frame 3203 via at least one Y-like parallel spring structure 3202, as has been the case, for example, in the embodiment 3200. Additionally, electrostatic drives can be placed on, in or below the beams at two different positions on the Y-like parallel spring structures, wherein reference is made to the different assemblies 3200 to 3600. The mirror plate 3201 can also be connected to the stationary frame 3203 by several distributed, beam-like spring structures 3701, 3801 or 3901 and one or several torsion springs 3702, 3802 and 3902 guided in parallel, wherein reference is made to embodiments 3700, 3800 and 3900. The electrostatic drives on, in or below the beam of the distributed springs can be placed differently, wherein reference is made to the different assemblies according to 3200 to 3600. Such electrostatically deflectable tilting mirrors can, for example, be used for
i. data acquisition in 1D, 2D scanners and microscopy,
ii. data outputs in laser displays, laser printers, laser labeling or exposing machines.

Some of the above embodiments also related to electrostatically deflectable tilting, lowering and lifting mirrors 4000 to 4300, where a mirror plate 3201 is mounted on at least one beam 4001, 4004, 4201 and 4202, wherein an electrode 301 is on, in or below this beam, which is mounted at a low distance 304 in an electrically insulating manner by a laterally structured insulating layer 303, wherein the edge of the mirror plate is lifted or lowered when an electric control voltage is applied. The variation options that have been described above with respect to the microdevice can also be applied here. As was described above, an S-shaped curvature of the spring elements can be obtained by suitably arranging the electrostatic drives, so that the edge of the plate can be moved in one direction, such as the positive z direction as in the case of the embodiment 4000, or in the negative z direction as in the embodiment 4100. The usage of lifting or lowering a plate edge can be used, for example, for tilting a mirror plate, i.e. as a tilting mirror or for lifting or lowering the mirror plate, such as, e.g., as a translation mirror.

The mirror plate can have a rectangular, circular, elliptical or any, such as a polygon-like, free form. The usage of four spring elements is also possible, as was shown in the embodiments 4200 and 4300. With this, a two-dimensional tilting movement can be realized. The usage as a tilting mirror is, for example, possible for
i. data acquisition in 1D, 2D scanners and microscopy,
ii. data outputs in laser displays, laser printers, laser labeling or exposing machines.

The usage as a translation mirror is, for example, possible
i. in Fourier transform spectrometers, interferometers, lamellar grating interferometers,
ii. in confocal microscopes or
iii. in optical path length modulators.

Finally, an embodiment with electrostatically deflectable leaf springs 6000 has been described, wherein one electrode 301 is arranged at a small distance 304 above a beam 1201 in order to be able to actively bend the beam 1201 by laterally acting tensile or compressive forces, wherein the low electrode gap 304 is produced by an insulating material layer 303 and a measuring tip is located on the bottom of the beam. Here, the variation options which were described above with respect to the microdevice can also be applied. The beam can be cantilevered and connected to a stationary frame. The usage of such a leaf spring can, for example, take place in atomic force microscopes, such as for dynamic excitation.

It has been shown that the electrode 301 can be fixed in the substrate thickness direction of the substrate 1550 in which the micromechanical device can be formed, such as a BSOI wafer, above or below the deformable element 1201, so that by bending the deformable element 1201 the same is bent out of a substrate plane along which the substrate extends, i.e. into the substrate thickness direction. In this case, the spacer layer extends parallel to the substrate plane, like the electrode 301 and the deformable element 1201, when the same are formed in a planar manner. Alternatively, the device can be formed in the substrate (1550) such that the electrode 301 is fixed laterally to the deformable element, so that by bending the deformable element the same is bent within a substrate plane. In this case, the spacer layer is then perpendicular to the substrate plane, just like the electrode 301 and the deformable element 1201, when the latter are formed in a planar manner.

A micromechanical device according to each of the above embodiments can comprise, as is indicated by dotted lines in FIG. 6a, a driver circuit 340 for applying the voltage U to the micromechanical device, so that the micromechanical device acts as a micromechanical actuator as was described above. In the case that this is a micromechanical device of a sensor—such as an acceleration sensor or the like—with an electrode 301, a deformable element 1201 and an insulating spacer layer 303, wherein the electrode is fixed to the deformable element 1201 via the insulating spacer layer 303 and the insulating spacer layer 303 is structured into several spaced-apart segments along a lateral direction 305, so that by a deformation of the deformable element 1201 in the lateral direction a capacitance between electrode and deformable element changes, the indicated circuit 340 in FIG. 6a can be a detector circuit for detecting the capacitance between the electrode 301 and the deformable element 1201 of the micromechanical device. 340 could, however, also be a voltage source for applying a constant voltage between the electrode 301 and the deformable element 1201, so that due to an externally induced bending of the deformable element 1201a current flow is generated between the electrode 301 and the deformable element 1201 and hence an energy generator is formed.

As was described above, the deformable element 1201 can form a spring portion 3803 between a suspension location 3203 and a functional element 3201 of the micromechanical device, wherein the functional element can comprise a plate 3201 which is tiltably suspended around a tilting axis, and the spring portion can form a first distributed spring 3803 of the micromechanical device which extends opposite to a second distributed spring of the micromechanical device along a circumference of the plane from a torsion spring 3802 extending along the tilting axis—namely a respective one or a common one for the first and second distributed spring—of the micromechanical device to a mounting location at the circumference of the plate, namely symmetrical to the second distributed spring. Here, a further electrode can be provided which is fixed to the second distributed spring via a further spacer layer, such that in the first distributed spring the insulating spacer layer 303 is structured such that by applying an electric voltage (U) between the electrode and the deformable element lateral tensile or compressive forces result that bend the first distributed spring relative to the plate in a first normal direction, such as downwards or in the negative z direction, and wherein in the second distributed spring the insulating spacer layer 303 is structured such that by applying an electric voltage (U) between the electrode the deformable element lateral tensile or compressive forces result that bend the second distributed spring relative to the plate in a second normal direction opposing the first.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE AND SOURCES

[1] Conrad, H., Klose, T., Sander, T., Schenk, H., Lakner, H.: Actuating Methods of Quasistatic Micromirrors for Active Focus Variation. Proc. of the IEEE 2008 International Students and Young Scientists Workshop "Photonics and Microsystems", pages 7-11, 2008.

[2] Shao, Y., Dickensheets, D-L., Himmer, P.: 3-D MOEMS Mirror for Laser Beam Pointing and Focus Control. IEEE JOURNAL OF SELECTED TOPICS IN QUANTUM ELECTRONICS, VOLUME 10, No. 3, pages 528-535, 2004.

[3] Mescheder, U. M., Estan, C., Somogyi, G., Freudenreich, M.: Distortion optimized focusing mirror device with large aperture. Sensors and Actuators A, 130-131, pages 20-27, 2006.

[4] Applied, but not yet disclosed patent: "Mikromechanisches Element" (102010028111.5; IPMS: 10F51122-IPMS; Patentanwälte Schoppe u. a.: FH100405PDE)

[5] Conrad, H.: Konzeptionelle Untersuchungen eines elektrothermisch auslenkbaren mikromechanischen Membranspiegels zur aktiven Fokusvariation. Masterarbeit, HTW Dresden, 2007.

[6] Petersen, K. E.: Silicon Torsional Scanning Mirror. IBM J. RES. DEVELOP., Volume 24, No. 5, pages 631-637, 1980.

[7] Dauderstädt, U., Dürr, P., Sinning, S., Wullinger, I., Wagner, M.: Charging effects in micromirror spatial light modulators. J. Micro/Nanolith. MEMS MOEMS, Volume 7(2), pages 021011-1-021011-10, 2008.

[8] Manhart, S., Hupfer, W., Nikolov, S., Wuehrer, C., Vdovin, G. V., Sodnik, Z.: 50 mm MEMS Deformable Mirror. Adaptive Optical Systems Technology, Proc. of SPIE, Band 4007, pages 555-562, 2000.

[9] Mali, R. K., Bifano, T. G., Vandelli, N., Horenstein, M. N.: Development of microelectromechanical deformable mirrors for phase modulation of light. J. Opt. Eng., Volume 36(2), pages 542-548, 1997.

[10] Smits, J. G., Fujimoto, K., Kleptsyn, V. F.: Microelectromechanical flexure PZT actuated optical scanner: static and resonance behavior. J. Micromech. Microeng., Volume 15, pages 1.285-1.293, 2005.

[11] Kudryashov, A. V., Cherezova, T. Y.: Laser Beam Shaping by Means of Flexible Mirrors. Laser Beam Shaping Applications, pages 211-240, ISBN: 978-0-8247-5941-4, CRC Press, 2006.

[12] Singh, J., Teo, J. H. S., Xu, Y. u. a.: A two axes scanning SOI MEMS micromirror for endoscopic bioimaging. J. Micromech. Microeng., Volume 18, pages 025001, 2008.

[13] Todd, S. T., Jain, A., Qu, H., Xie, H.: A multi-degree-of-freedom micromirror utilizing inverted-series-connected bimorph actuators. J. Opt. A: Pure Appl. Opt., Volume 8, pages S352-S359, 2006.

[14] Yang, J. P., Deng, X. C., Chong, T. C.: A Self-sensing Thermal Actuator Incorporating Micromirror for Tracking Mechanism of Optical Drive. Sensors, Volume 2, Proceedings of IEEE, pages 900-903, 2004.

[15] GEHNER, A., SCHMIDT, J. U., WILDENHAIN, M., KNOBBE, J., WAGNER, M.: RECENT PROGRESS IN CMOS INTEGRATED MEMS AO MIRROR DEVELOPMENT. ADAPTIVE OPTICS FOR INDUSTRY AND MEDICINE, Proceedings of the Sixth International Workshop, pages 53-58, 2007.

[16] Sun, J., Guo, S., Wu, L., Liu, L., Choe, S., Sorg, B. S. and Xie, H.: 3D In Vivo optical coherence tomography based on a low-voltage, large-scan-range 2D MEMS mirror. Optics Express, Volume 18, Issue 12, pages 12.065-12.075, 2010.

[17] Schweizer, S.; Calmes, S.; Laudon, M.; Renaud, P.: Thermally actuated optical microscanner with large angle and low consumption, Sensors and Actuators 76 (1999), pp. 470-477.

[18] Brother Industries, Ltd.: Brother Develops Spectacle-type Wearable Retinal Imaging Display, Technical Report (2008), http://www.brother.com/en/news/2008/rid/

[19] Sehr, H., Evans, A. G. R., Brunnschweiler, A., Ensell, G. J. und Niblock, T. E. G.: Fabrication and test of thermal vertical bimorph actuators for movement in the wafer plane. J. Micromech. Microeng. 11, pages 306-310, 2001.

[20] Huang, Q.-A. und Lee, N. K. S.: Analysis and design of polysilicon thermal flexure actuator. J. Micromech. Microeng. 9, pages 64-70, 1999.

[21] Pyayt, A. L., Starkweather, G. K. und Sinclair, M.: A high-efficiency display based on a telescopic pixel design. Nature Photonics 2, pages 492-495, 2008.

The invention claimed is:
1. A micromechanical device, comprising
an electrode;
a deformable element; and
an insulating spacer layer,
wherein the electrode is fixed to the deformable element via the insulating spacer layer, and wherein
the insulating spacer layer is structured into several spaced-apart segments along a lateral direction, so that by applying an electric voltage between the electrode and the deformable element an area force acting in a thickness direction is applied to the electrode and the deformable element, as a consequence of which lateral tensile or compressive forces result that bend the deformable element along the lateral direction according to the bimorph principle.

2. The micromechanical device according to claim 1, wherein the segments each comprise a longitudinal extension direction running transversely to the lateral direction.

3. The micromechanical device according to claim 2, wherein the segments and the gaps between the same are stripe-shaped.

4. The micromechanical device according to claim 1, wherein a periodicity of the structuring of the insulating spacer layer is approximately constant in the lateral direction across an area via which the electrode and the deformable element oppose one another.

5. The micromechanical device according to claim 1, wherein the deformable element is a plate, a bowl, a membrane, a beam or a bar.

6. The micromechanical device according to claim 1, wherein the deformable element is suspended and clamped such that it remains unbent by applying an electric voltage along a lateral direction perpendicular to the lateral direction, or is bent also in a same direction as along the lateral direction.

7. The micromechanical device according to claim 1, which is formed in a substrate, wherein the electrode is fixed in a substrate direction above or below the deformable element, so that by bending the deformable element the same is bend out of the substrate plane, wherein the insulating spacer layer runs parallel to the substrate plane.

8. The micromechanical device according to claim 1, which is formed in a substrate, wherein the electrode is laterally fixed to the deformable element, so that by bending the deformable element the same is bent within a substrate plane of the substrate, wherein the insulating spacer layer runs transversely to the substrate plane.

9. The micromechanical device according to claim 1, wherein the electrode is a first electrode and the micromechanical device comprises a further electrode fixed to the side of the first electrode facing away from the deformable element via a further insulating spacer layer, wherein the further insulating spacer layer is structured into several spaced-apart segments along the lateral direction.

10. The micromechanical device according to claim 9, wherein the spacer layer is a first insulating spacer layer and the segments of the further insulating spacer layer are positioned laterally in gaps of the segments of the first insulating spacer layer.

11. The micromechanical device according to claim 1, wherein the electrode is a first electrode and the micromechanical device comprises a further electrode fixed to a side of the deformable element facing away from the first electrode via a further insulating spacer layer, wherein the further insulating spacer layer is structured into several spaced-apart segments along the lateral direction, so that by applying an electric voltage between the first electrode and the deformable element lateral tensile or compressive forces result that bend the deformable element along the lateral direction in a first direction, while by applying an electric voltage between the second electrode and the deformable element either the same of lateral tensile or compressive forces result that bend the deformable element along the lateral direction also in the first direction, or the other of the lateral or compressive forces that bend the deformable element along the lateral direction in a direction opposing the first.

12. The micromechanical device according to claim 1, wherein a thickness of the insulating spacer layer is between 100 nm to 5 µm, each inclusively.

13. The micromechanical device according to claim 1, wherein the deformable element is made of a conductive material, is made locally conductive or coated with a conductive material.

14. The micromechanical device according to claim 1, wherein the electrode is formed in a planar manner and respectively curved away from the deformable element between the segments.

15. The micromechanical device according to claim 1, wherein the electrode is formed in a planar manner and respectively curved towards the deformable element between the segments.

16. The micromechanical device according to claim 1, wherein the electrode is formed in a planar manner and respectively comprises a V-shaped cross-section in a plane between the segments, which is spanned by the lateral direction and a thickness direction of the insulating spacer layer.

17. The micromechanical device according to claim 1, wherein a surface of the deformable element facing the electrode is respectively formed curved away from the electrode between the segments.

18. The micromechanical device according to claim 1, wherein a surface of the deformable element facing the electrode is respectively formed curved towards the electrode between the segments.

19. The micromechanical device according to claim 1, wherein the electrode and a surface of the deformable element facing the electrode are respectively formed between the segments such that gaps therebetween comprise the same cross-section in a plane spanned by the lateral direction and a thickness direction of the insulating spacer layer.

20. The micromechanical device according to claim 1 comprising a driver circuit for applying the voltage to the micromechanical device, so that the micromechanical device acts as a micromechanical actuator.

21. The micromechanical device according to claim 1, wherein the deformable element forms a spring portion between a suspension location and a functional element of the micromechanical device.

22. The micromechanical device according to claim 21, wherein the functional element comprises a plate tiltably suspended around a tilting axis, and the spring portion forms a first distributed spring of the micromechanical device, which extends opposite to a second distributed spring of the micromechanical device along a circumference of the plate from a torsion spring of the micromechanical device, which extends along the tilting axis to a mounting location at the circumference of the plate, namely symmetrically to the second distributed spring.

23. The micromechanical device according to claim 22, further comprising a further electrode fixed to the second distributed spring via a further spacer layer, such that in the first distributed spring the insulating spacer layer is structured such that by applying an electric voltage between the electrode and the deformable element lateral tensile and compressive forces result that bend the first distributed spring relative to the plate in a first normal direction, and wherein in the second distributed spring the insulating spacer layer is structured such that by applying an electric voltage between the electrode and the deformable element lateral tensile and compressive forces result that bend the second distributed spring relative to the plate in a second normal direction opposing the first.

24. The micromechanical device according to claim 1, wherein the deformable element forms a spring portion between a suspension location and a functional element of the micromechanical device, wherein the function element comprises a plate tiltably suspended around a tilting axis, and the spring portion forms a first beam of an Y-shaped spring of the micromechanical device running parallel to the tilting axis, which extends parallel to a second beam of the Y-shaped spring of the micromechanical device, namely symmetrical to the tilting axis, wherein the micromechanical device further comprises a further electrode fixed to the second beam via a further spacer layer, such that in the first beam the insulating spacer layer is structured such that by applying an electric voltage between the electrode and the first beam lateral tensile or compressive forces result that bend the first beam relative to the plate in a first normal direction, and in the second beam the insulating spacer layer is structured such that by applying the electric voltage between the electrode and the second beam lateral tensile or compressive forces result that bend the second beam relative to the plate in a second normal direction opposing the first.

25. The micromechanical device according to claim 1, wherein the deformable element forms a spring portion between a suspension location and a functional element of the micromechanical device, wherein the functional element comprises a plate suspended at a suspension point along its circumference, and the spring portion forms one of four portions of a U-shaped spring of the micromechanical device, which extends from the suspension point along the circumference of the plate and back to the suspension location, wherein the U-shaped spring bends when the plate is deflected at the suspension point from a resting position plane at the four portions arranged serially along the U-shaped spring alternatively in one and then in the opposite direction relative to the resting position plane, wherein the micromechanical device further comprises further electrodes fixed to the other of the four portions via further spacer layers, namely such that in the first and third portion from the suspension location or the suspension point lateral tensile or compressive forces result by applying an electric voltage between the electrode and the respective portion that bend the respective portion relative to the plate in a first normal direction, and in the second and fourth portion from the suspension location or the suspension point lateral tensile or compressive forces result by applying an electric voltage between the electrode and the respective portion that bend the respective portion relative to the plate in a second normal direction opposing the first, wherein a further U-shaped spring is formed symmetrically to the U-shaped spring relative to a connecting line of suspension location and suspension point.

26. The micromechanical device according to claim 22, wherein the plate is suspended symmetrically to an axis perpendicular to the tilting axis or connecting line.

27. The micromechanical device according to claim 21, wherein the functional element comprises an optical element, such as a mirror, a dispersive element or a diffractive element or an AFM measuring tip.

28. The micromechanical device according to claim 1, wherein the deformable element is a plate and the segments form concentric circles, so that the lateral tensile or compressive forces resulting by applying the electric voltage between the electrode and the deformable element bend the plate in a helmet or a bowl shape.

29. The micromechanical device according to claim 28, wherein the plate is a mirror plate.

30. The micromechanical device according to claim 1, wherein the electrode is formed in a planar manner and respectively curved towards the deformable element between the segments; and
a surface of the deformable element facing the electrode is respectively formed curved away from the electrode between the segments; so that
the bending of the deformable element results due to a lateral contraction of portions of the deformable element between the segments of the insulating spacer layer in the thickness direction away from the deformable element.

31. The micromechanical device according to claim 1, wherein the electrode is a first electrode and the micromechanical device comprises a further electrode fixed to the side of the first electrode facing away from the deformable element via a further insulating spacer layer, wherein the further insulating spacer layer is structured into several spaced-apart segments along the lateral direction; and
wherein the spacer layer is a first insulating spacer layer and the segments of the further insulating spacer layer are positioned laterally in gaps of the segments of the first insulating spacer layer.

32. A sensor comprising a micromechanical device according to claim 1, further comprising a detector circuit for detecting the capacitance between the electrode and the deformable element of the micromechanical device.

33. An energy generator comprising a micromechanical device according to claim 1, further comprising a voltage source for applying a constant voltage between the electrode and the deformable element, so that due to an externally induced bending of the deformable element a current flow is generated between the electrode and the deformable element.

34. An energy generator according to claim 33, wherein a weight or a plate is mounted to the unfixed end of the deformable element.

* * * * *